(12) United States Patent
Lei et al.

(10) Patent No.: US 10,705,056 B2
(45) Date of Patent: Jul. 7, 2020

(54) METHOD FOR ANALYZING CEMENT INTEGRITY IN CASED WELLS USING SONIC LOGGING

(71) Applicant: SCHLUMBERGER TECHNOLOGY CORPORATION, Sugar Land, TX (US)

(72) Inventors: Ting Lei, Arlington, MA (US); Bikash Kumar Sinha, Cambridge, MA (US); Smaine Zeroug, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 9 days.

(21) Appl. No.: 15/575,108

(22) PCT Filed: May 18, 2016

(86) PCT No.: PCT/US2016/032963
§ 371 (c)(1),
(2) Date: Nov. 17, 2017

(87) PCT Pub. No.: WO2016/187240
PCT Pub. Date: Nov. 24, 2016

(65) Prior Publication Data
US 2018/0156759 A1    Jun. 7, 2018

Related U.S. Application Data

(60) Provisional application No. 62/163,336, filed on May 18, 2015.

(51) Int. Cl.
*G01N 29/44* (2006.01)
*E21B 47/00* (2012.01)
(Continued)

(52) U.S. Cl.
CPC ..... *G01N 29/4418* (2013.01); *E21B 47/0005* (2013.01); *E21B 47/14* (2013.01);
(Continued)

(58) Field of Classification Search
CPC ............ G01N 29/4418; G01N 29/265; G01N 29/043; G01N 29/07; G01N 29/11; E21B 47/0005; E21B 47/14; G01V 1/50
See application file for complete search history.

(56) References Cited

U.S. PATENT DOCUMENTS 3,909,775 A * 9/1975 Lavigne .................. G01V 1/46
367/32
4,289,023 A   9/1981 Rader
(Continued)

FOREIGN PATENT DOCUMENTS

WO  2014139593 A1  9/2014
WO  2015108639 A1  7/2015
WO  2016003549 A1  1/2016

OTHER PUBLICATIONS

"Isolating Potential Flow Zones During Well Construction", in American Petroleum Institute Recommended Practice 65—Part 2, first Edition, May 2010, 107 pages.
(Continued)

*Primary Examiner* — John Fitzgerald

(57) ABSTRACT

Methods are provided for identifying a cementation status of a multi-string cased wellbore utilizing sonic tools with monopole and/or dipole transmitters and with an array of sonic receivers axially displaced from the transmitter(s). The sonic tool is used to record waveforms. The waveforms are then processed to generate slowness and/or attenuation dispersions. The slowness and/or attenuation dispersions are projected onto a slowness and/or attenuation axis, and the results are compared to a data set of projected slowness and/or attenuation dispersions representing a plurality of
(Continued)

different multi-string cased wellbore cement status scenarios in order to select the scenario most closely associated with the results. The presence or lack of eccentering of a casing is similarly obtained where the data set includes projected dispersions representing properly centered and ec-centered casings.

25 Claims, 38 Drawing Sheets

(51) Int. Cl.
    *G01N 29/04*     (2006.01)
    *G01N 29/265*     (2006.01)
    *E21B 47/14*     (2006.01)
    *G01N 29/07*     (2006.01)
    *G01N 29/11*     (2006.01)
    *G01V 1/50*     (2006.01)
    *E21B 33/14*     (2006.01)

(52) U.S. Cl.
    CPC .......... *G01N 29/043* (2013.01); *G01N 29/07* (2013.01); *G01N 29/11* (2013.01); *G01N 29/265* (2013.01); *G01V 1/50* (2013.01); *E21B 33/14* (2013.01); *G01N 2291/0232* (2013.01); *G01N 2291/0422* (2013.01); *G01N 2291/0423* (2013.01); *G01N 2291/103* (2013.01); *G01N 2291/2636* (2013.01); *G01V 2210/63* (2013.01)

(56) References Cited

U.S. PATENT DOCUMENTS

| | | | |
|---|---|---|---|
| 4,594,691 A * | 6/1986 | Kimball | G01V 1/48 367/26 |
| 4,800,537 A | 1/1989 | Mount, II | |
| 4,896,303 A * | 1/1990 | Leslie | E21B 47/0005 367/30 |
| 5,278,805 A * | 1/1994 | Kimball | G01V 1/48 367/31 |
| 6,611,761 B2 | 8/2003 | Sinha et al. | |
| 6,941,231 B2 | 9/2005 | Zeroug et al. | |
| 7,095,676 B2 * | 8/2006 | D'Angelo | G01N 29/07 367/31 |
| 7,639,563 B2 | 12/2009 | Wu et al. | |
| 7,643,374 B2 | 1/2010 | Plona et al. | |
| 9,534,487 B2 * | 1/2017 | Zeroug | E21B 47/0005 |
| 9,784,875 B2 | 10/2017 | Zeroug et al. | |
| 9,829,597 B2 | 11/2017 | Zeroug et al. | |
| 10,138,727 B2 * | 11/2018 | Zeroug | E21B 47/0005 |
| 2002/0116128 A1 | 8/2002 | Sinha et al. | |
| 2003/0058739 A1 * | 3/2003 | Hsu | G01V 1/284 367/56 |
| 2003/0185100 A1 * | 10/2003 | D'Angelo | G01N 29/07 367/82 |
| 2005/0190651 A1 | 9/2005 | Plona et al. | |
| 2006/0039238 A1 * | 2/2006 | Mandal | G01V 1/48 367/31 |
| 2006/0120217 A1 * | 6/2006 | Wu | G01V 1/44 367/32 |
| 2006/0233048 A1 | 10/2006 | Froelich et al. | |
| 2006/0235617 A1 | 10/2006 | Sinha et al. | |
| 2006/0262644 A1 * | 11/2006 | Schoepf | G01N 29/11 367/35 |
| 2007/0206439 A1 * | 9/2007 | Barolak | E21B 47/0005 367/35 |
| 2009/0168597 A1 * | 7/2009 | Wu | E21B 47/0005 367/35 |
| 2013/0255937 A1 | 10/2013 | Barnes et al. | |
| 2013/0345983 A1 | 12/2013 | Guo | |
| 2014/0052376 A1 | 2/2014 | Guo et al. | |
| 2015/0003203 A1 | 1/2015 | Froelich | |
| 2015/0198732 A1 * | 7/2015 | Zeroug | E21B 47/0005 367/35 |
| 2015/0219780 A1 * | 8/2015 | Zeroug | E21B 47/0005 702/6 |
| 2017/0167241 A1 | 6/2017 | Wu et al. | |
| 2018/0142545 A1 * | 5/2018 | Lei | G01N 29/265 |
| 2018/0149019 A1 * | 5/2018 | Bose | G01V 1/50 |
| 2019/0055830 A1 * | 2/2019 | Skataric | G01V 1/282 |

OTHER PUBLICATIONS

Ekstrom, M. P., "Dispersion estimation from borehole acoustic arrays using a modified matrix pencil algorithm", 29th Asilomar Conference on Signals, Systems, and Computers, Pacific Grove, California, U.S.A., 1995, pp. 449-453.

Hayman, A. J. et al., "High Resolution Cementation and Corrosion Imaging by Ultrasound", presented at the 1991 SPWLA 32nd Annual Logging Symposium, 1991, 25 pages.

Lang, S. et al., "Estimating slowness dispersion from arrays of sonic logging waveforms", Geoophysics, 1987, 52(4), pp. 530-544.

Liu, Y. et al., "Acoustic Guided Waves in Cylindrical Solid-Fluid Structures: Modeling with a Sweeping Frequency Finite Element Method and Experimental Validation", AIP Conference Proceedings, 2017, 36, 8 pages.

Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.

Pistre, V. et al., "A New Modular Sonic Tool Provides Complete Acoustic Formation Characterization", 2005 SEG International Exposition and Annual Meeting Proceedings, SEG Houston, Texas, U.S.A., 2005, pp. 368-372.

Van Kuijk, R. et al., "A Novel Ultrasonic Cased-Hole Imager for Enhanced Cement Evaluation", IPTC 10546, presented at the International Petroleum Technolgy Conference, Doha, Qatar, 2005, 14 oages.

Search Report and Written Opinion of related International Patent Application No. PCT/US2016/032961 dated Sep. 26, 2016, 8 pages.

Search Report and Written Opinion of related International Patent Application No. PCT/US2017/020311 dated Jun. 15, 2017, 21 pages.

Search Report and Written Opinion of related International Patent Application No. PCT/US2016/032965 dated Aug. 16, 2016, 17 pages.

Xie et al., "Testing and validating machine learning classifiers by metamorphic testing", The Journal of Systems and Software 84 (2011), pp. 544-558.

* cited by examiner

METHOD FOR ANALYZING CEMENT INTEGRITY IN CASED WELLS USING SONIC LOGGING

RELATED APPLICATIONS

The present application claims the benefit of U.S. Provisional Application Ser. No. 62/163,336, filed on May 18, 2015 and entitled "METHOD FOR ANALYZING CEMENT INTEGRITY IN CASED WELLS USING SONIC LOGGING" (Docket No. IS15.0603 US PSP), which is hereby incorporated by reference herein in its entirety.

This application is related to:

A PCT Application claiming the benefit of U.S. Provisional Application Ser. No. 62/163,336, filed on May 18, 2016, and entitled "METHODS FOR ANALYZING CEMENT QUALITY IN MULTI-STRING CASED WELLS USING SONIC LOGGING", which is hereby incorporated by reference herein in its entirety;

A PCT Application claiming the benefit of U.S. Provisional Application Ser. No. 62/163,243, filed on May 18, 2016, and entitled "METHOD FOR ANALYZING CEMENT INTEGRITY IN CASING STRINGS USING MACHINE LEARNING", which is hereby incorporated by reference herein in its entirety; and U.S. Provisional Application Ser. No. 62/303,152 filed on Mar. 3, 2016 and entitled "WELL INTEGRITY ANALYSIS USING SONIC MEASUREMENTS OVER DEPTH INTERVAL", which is hereby incorporated by reference herein in its entirety.

TECHNICAL FIELD

The subject disclosure relates to well logging in the oil and gas field. More particularly, the subject disclosure relates to analyzing cement integrity in cased wells.

BACKGROUND

Production wells that are not being used are properly plugged to avoid any oil and gas reservoir fluids from migrating uphole and possibly contaminating other formations or fresh mud aquifers. The process of plugging and abandoning of oil and gas wells requires new technologies to confirm that there is no fluid path in the second cement annulus between the outer casing and formation. Even though existing ultrasonic measurements (50 to 500 kHz) provide a reliable way to diagnose imperfect cement in the first annulus, there are no commercially available measurements that would reliably detect the presence of imperfect cement in the second annulus that might impair hydraulic isolation between the hydrocarbon bearing and adjacent layers of earth.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods and systems are provided for detecting the presence or lack thereof of cement imperfections in multi-string cased wellbores from sonic slowness and attenuation dispersion measurements. In certain embodiments, methods and systems are provided for detecting whether the casings in a multi-string cased wellbore are well cemented or not. In other embodiments, methods and systems are provided for detecting whether the casings are eccentered or not.

Illustrative embodiments of the present disclosure involve utilizing sonic tools with monopole and/or dipole transmitters coaxially placed in the inner casing of a multi-string cased wellbore and with an array of sonic receivers axially displaced from the transmitter(s) to obtain sonic data. The sonic data is processed to generate slowness and/or attenuation dispersions. The slowness and/or attenuation dispersions are projected onto a slowness and/or attenuation axis. The results are compared to a data set of projected slowness and/or attenuation dispersions representing a plurality of different multi-string cased wellbore cement status scenarios in order to select the scenario most closely associated with the processed results.

In one embodiment, a data set of slowness projections is generated for a plurality of scenarios such as (a) well-bonded casings, (b) an inner casing that is uncemented with an outer casing that is well-cemented, (c) an inner casing that is well-cemented with an outer casing that is uncemented, and (d) both inner and outer casings being uncemented. The slowness projections for each of those scenarios is sufficiently distinct such that a slowness projection generated from processed data from a sonic tool may be compared to the data set to identify which scenario is represented in the data.

Similarly, in addition to the above scenarios, additional scenarios may be provided such as (e) casings with cement in both annuli, but with a rotary slip at the interface between the outer casing and the outer cement annulus, (f) casings with cement in both annuli, but with a slip at the interface between the outer cement annulus and the formation, and (g) casings with cement in both annuli, but with slips at both the interface between the outer casing and the outer cement annulus and at the interface between the outer cement annulus and the formation. Again, slowness projections for each of these scenarios are distinct from the others such that a slowness projection generated from processed data from a sonic tool may be compared to the data set to identify which scenario is represented in the data. In one aspect, the data set of slowness projections may be generated utilizing a model of the formation or from information already known about the formation.

In another embodiment, a data set of attenuation projections is generated for some or all of the same scenarios previously discussed with respect to the slowness projections. The attenuation projections for each of these scenarios are distinct from the others such that an attenuation projection generated from processed data from a sonic tool may be compared to the data set to identify which scenario is represented in the data.

In certain embodiments, the slowness and/or attenuation projections may be displayed in chart form using different colors with different dispersion modes. Particularly, with respect to the attenuation projections where the different modes can have overlapping attenuation ranges, the use of color may be helpful in distiguishing amongst the scenarios and in visually comparing the results obtained from the sonic tool to the chart.

In other embodiments, data set of slowness and/or attenuation projections are generated for casing scenarios related to centering (or eccentering) of the casings so that determinations can be made from processed data gathered from a sonic tool as to whether the wellbore has a centered or eccentered casing.

Additional aspects, embodiments, objects and advantages of the disclosed methods may be understood with reference to the following detailed description taken in conjunction with the provided drawings.

BRIEF DESCRIPTION OF THE DRAWINGS

FIGS. 30a and 30b are respectively data sets shown in chart form generated by projecting the slowness and attenuation dispersions respectively for the scenarios of FIGS. 2a, 4a, 6a, 8a, 10a, 12a, and 14a.

FIGS. 31a and 31b are respectively data sets shown in chart form generated by projecting the slowness and attenuation dispersions respectively for the scenarios of FIGS. 16a, 18a, 20a, 22a, 24a, 26a, and 28a.

FIGS. 36a and 36b are respectively data sets shown in chart form generated by projecting the slowness and attenuation dispersions respectively for the scenarios of FIGS. 32a and 33a.

FIGS. 37a and 37b are respectively data sets shown in chart form generated by projecting the slowness and attenuation dispersions respectively for the scenarios of FIGS. 34a and 35a.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
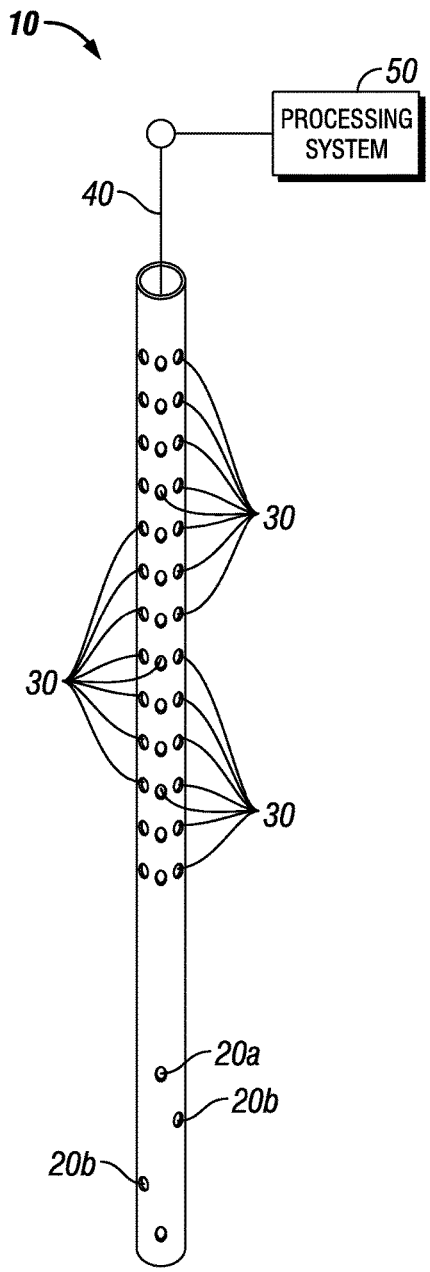
FIG. 1 is a schematic of a sonic logging tool.

FIG. 1 shows a schematic of a sonic logging tool 10 that can be used to analyze cement integrity in a cased wellbore traversing a formation. In one embodiment, the sonic logging tool may include one or more monopole sources (transmitters) 20a for generating acoustic waveforms that travel into the casing and the formation, one or more sets of dipole sources (transmitter pairs) 20b for generating acoustic waveforms that travel into the casing and the formation, and an array of receivers 30 that record the waveforms to obtain sonic data. The array of receivers may include receivers spaced along the vertical axis of the tool and at different distances from the sources. The array of receivers may also include receivers azimuthally displaced about the tool. Some sonic tools, such as the SONIC SCANNER of Schlumberger Technology Corporation of Sugar Land, Tex., provides such monopole and dipole transmitters with an array of eight receivers spaced azimuthally around the tool at each of thirteen axial locations thereby providing a total of 104 receivers. The transmitters are configured as piezoelectric sources having a bandwidth typically ranging from a 0.5 to 20 kHz, and the receivers are configured as hydrophone receivers.

The sonic logging tool in FIG. 1 is a wireline logging tool 10. The logging tool 10 is lowered into the wellbore on a wireline 40. The wireline 40 can be used to communicate with a processing system 50 at a surface location. The processing system 50 can be used to control operation of the wireline logging tool 10 and/or process data acquired by the wireline logging tool (e.g., according to the methods described herein).

According to one aspect, an acoustic source in a fluid-filled wellbore generates headwaves as well as relatively stronger wellbore-guided modes. A monopole source generates primarily the lowest-order axisymmetric mode, also referred to as the Stoneley mode, together with compressional and shear headwaves. In contrast, a dipole source primarily excites the lowest-order flexural wellbore mode together with compressional and shear headwaves. The headwaves are caused by the coupling of the transmitted acoustic energy to plane waves in the formation that propagate along the wellbore axis. An incident compressional wave in the wellbore fluid produces critically refracted compressional waves in the formation. Those refracted along the wellbore surface are known as compressional headwaves. The critical incidence angle $\theta_i=\sin^{-1}(V_f/V_c)$, where $V_f$ is the compressional wave speed in the wellbore fluid, and $V_c$ is the compressional wave speed in the formation. As the compressional headwave travels along the interface, it radiates energy back into the fluid that can be detected by hydrophone receivers placed in the fluid-filled wellbore. In fast formations, the shear headwave can be similarly excited by a compressional wave at the critical incidence angle $\theta_i=\sin^{-1}(V_f/V_s)$ where $V_s$ is the shear wave speed in the formation. It is also worth noting that headwaves are excited only when the wavelength of the incident wave is smaller than the wellbore diameter so that the boundary can be effectively treated as a planar interface. In a homogeneous and isotropic model of fast formations, as above noted, compressional and shear headwaves can be generated by a monopole source placed in a fluid-filled wellbore for determining the formation compressional and shear wave speeds. It is known that refracted shear headwaves may not be detected in slow formations (where the shear wave velocity is less than the wellbore-fluid compressional velocity) with receivers placed in the wellbore fluid. In slow formations, formation shear velocities are obtained from the low-frequency asymptote of flexural dispersion.

There are standard processing techniques for the estimation of formation shear velocities in either fast or slow formations from an array of recorded dipole waveforms. Low-frequency asymptotes of wellbore flexural dispersions coincide with the far-field formation shear velocities (or slownesses). The shear and compressional velocities can be readily converted into shear modulus $\mu$, and compressional modulus $(\lambda+2\mu)$ from the following equations:

$$\mu = \rho V_S^2,$$

$$\lambda + 2\mu = \rho V_P^2 \quad (1)$$

where $\rho$ is the formation mass density, and $V_S$ and $V_P$ are respectively the shear and compressional wave velocities obtained from the processing of sonic data. It is noted that low-frequency asymptotes of flexural dispersions are largely independent of the presence of casing and any possible sonic tool effects on dipole data and is also insensitive to mud compressional slowness (DTmud). In addition to compressional and shear headwaves, a double-casing cemented to a surrounding formation supports multiple propagating modes that have varying degrees of sensitivities to cement properties. In one aspect, the present disclosure describes various methods to use modal dispersions to identify certain type of cement imperfections.

Consider as an illustrative example a double-string cased wellbore cemented to a slow formation. The formation, cement, mud, and casing material properties are listed in Table 1, where $v_p$ and $v_s$ are compressional and shear velocities and DTc and DTs are compressional and shear slownesses.

TABLE 1

Summary of formation, cement casing and mud material properties

| | $v_p$ m/s (DTc us/ft) | $v_s$ m/s (DTs us/ft) | $\rho$ (g/cm³) |
|---|---|---|---|
| Formation | 2540 (120) | 1219 (250) | 2.2 |
| Cement | 3629 (84) | 2019 (151) | 1.9 |
| Casing | 5751 (53) | 3110 (98) | 8.0 |
| Mud | 1693 (180) | 0 | 1.4 |

The inner casing has an inner diameter dimension of ID=6.09 inches and an outer diameter dimension of OD=7 inches. The outer casing has an inner diameter dimension of ID=8.6 inches and an outer diameter dimension of OD=9.625 inches. The wellbore diameter is 12 inches. For computational efficiency, a wireline sonic tool is modeled as being concentrically placed inside the wellbore with a transmitter to first receiver spacing of one foot and an inter-receiver spacing of one inch and with a receiver aperture of six feet as is in the case in the SONIC SCANNER tool. Thus, an axial array of total 73 axial receivers is considered as being used to collect synthetic waveform data with recording time of 6 milliseconds. Synthetic waveforms are obtained by firing either a monopole source and/or a dipole source with a center frequency of 6 kHz.

Figure 2A:
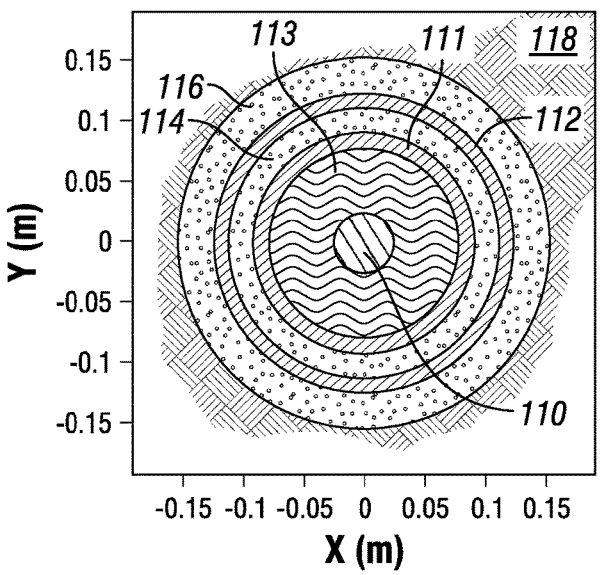
FIGS. 2a and 2b are respectively a cross-sectional diagram of a well-bonded double casing together with cement annuli surrounded by a formation, and synthetic waveforms at an array of receivers generated by a concentrically placed monopole transmitter for that casing scenario.
Figure 2B:
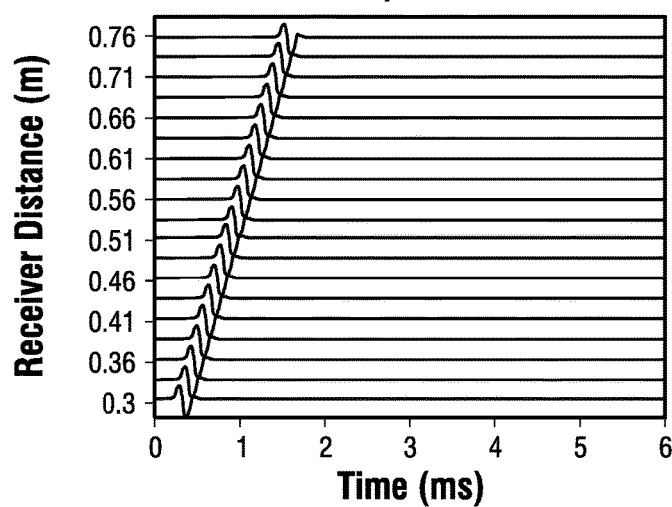
Figure 3A:
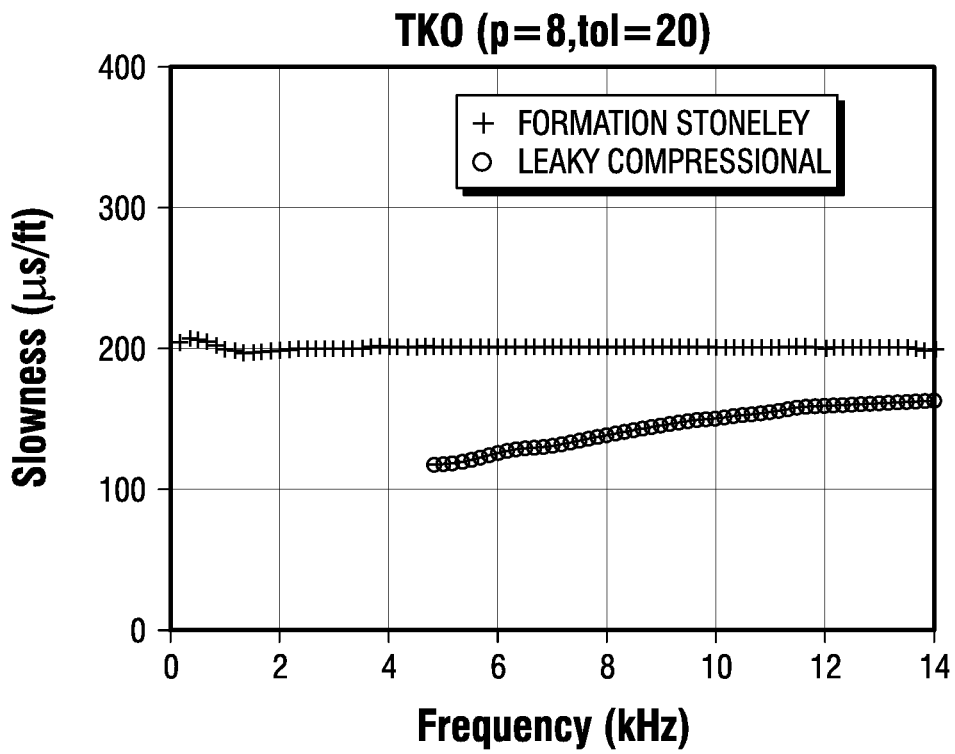
FIGS. 3a and 3b are respectively the slowness and attenuation dispersion plots obtained from the processing of the monopole waveforms of FIG. 2b.
Figure 3B:
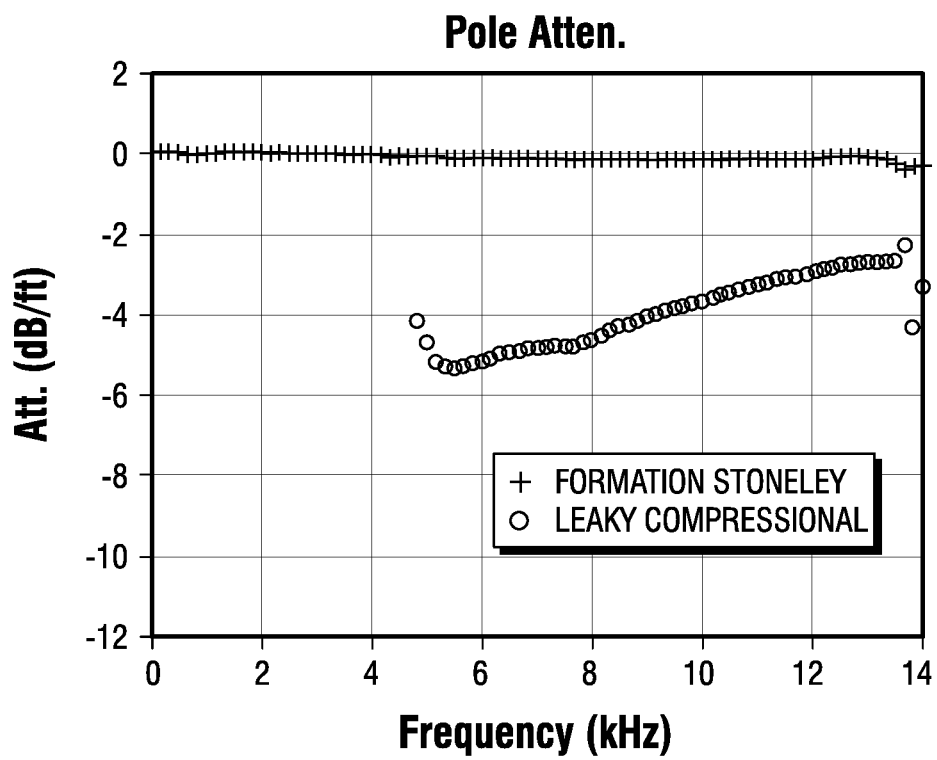

FIG. 2a shows a cross-sectional view of a model sonic tool 110 concentrically placed in an inner casing 111 of OD 7 inches and an outer casing 112 of OD 9.625 inches. The annulus 113 between the sonic tool and the inner surface of the seven inch casing is filled with mud, whereas the first and second annuli 114, 116 are filled with solid cement well bonded to a slow formation 118 with elastic parameters as shown in Table 1. A monopole transmitter mounted on the sonic tool generates an array of waveforms as shown in FIG. 2b. Processing of these waveforms by a modified matrix pencil algorithm isolates both the dispersive and non-dispersive arrivals in the recorded wavetrain. The slowness and attenuation dispersions for the cement-formation Stoneley (hereinafter referred to as the "formation Stoneley") and formation leaky compressional modes are displayed in FIGS. 3a and 3b, respectively, with FIG. 3a showing a plot of slowness as a function of frequency for the two modes and FIG. 3b showing a plot of attenuation as a function of frequency for the two modes. Low frequency leaky-compressional slowness dispersion approaches the formation compressional slowness, whereas high-frequency dispersion approaches the mud compressional slowness. Modeling results confirm that a double-casing well bonded to a slow formation supports a minimum number of coherent arrivals as is typical of a cased wellbore in a slow formation where the two dominant arrivals are a formation Stoneley and leaky-compressional modes.

Figure 4A:
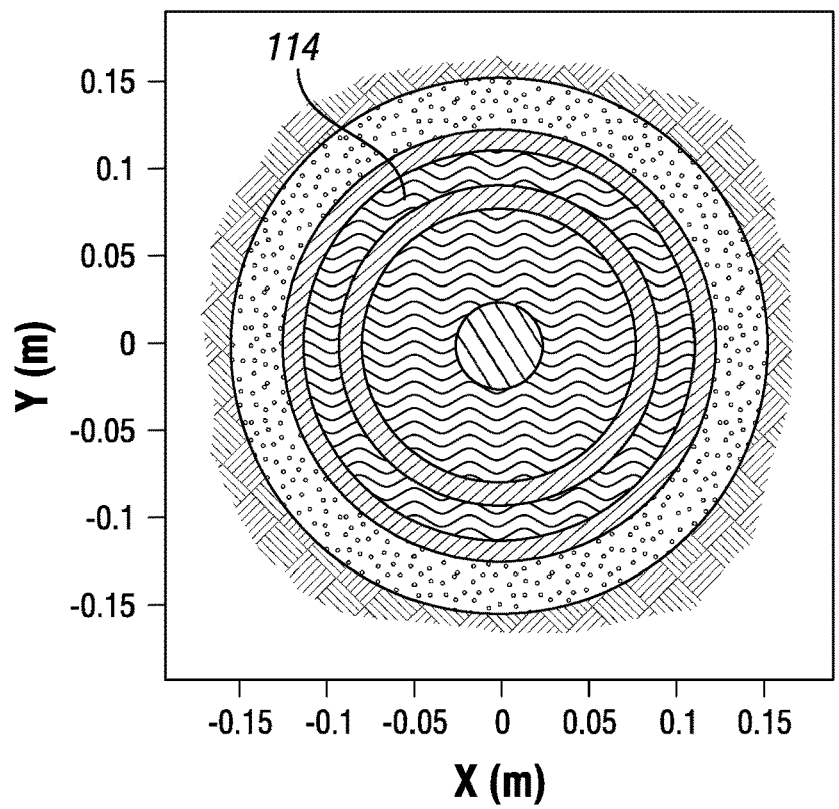
FIGS. 4a and 4b are respectively a cross-sectional diagram of a double-casing geometry with a first annulus filled with mud and a second annulus filled with cement that is well-bonded to the formation, and synthetic waveforms at an array of receivers generated by a concentrically placed monopole transmitter for that casing scenario.
Figure 4B:
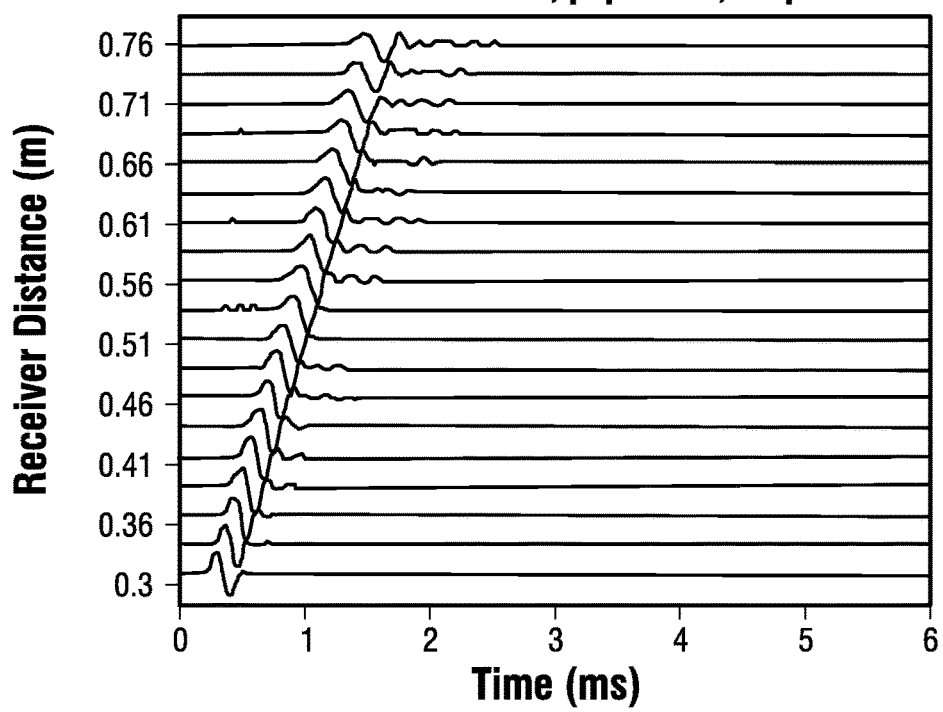
Figure 5A:
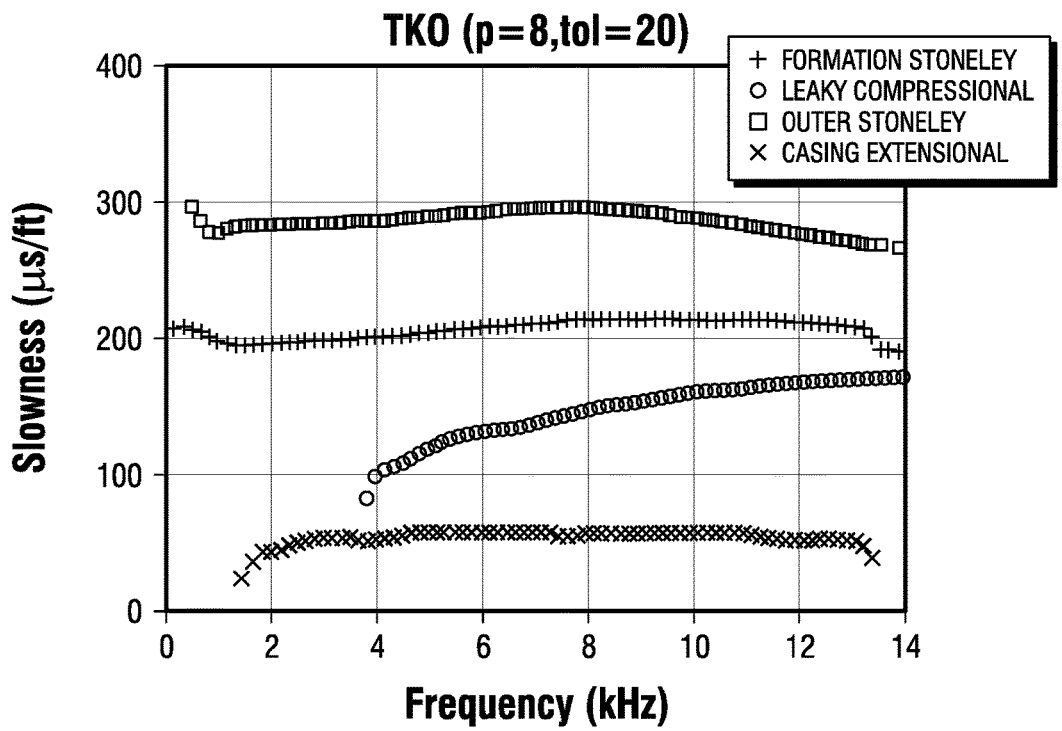
FIGS. 5a and 5b are respectively the slowness and attenuation dispersion plots obtained from the processing of the monopole waveforms of FIG. 4b.
Figure 5B:
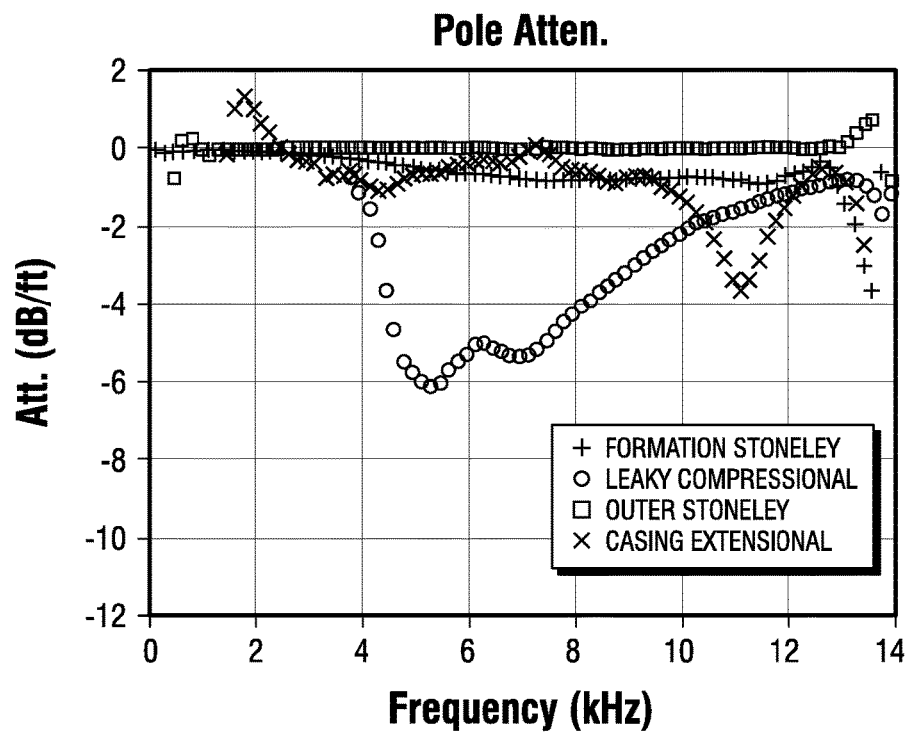
Figure 6A:
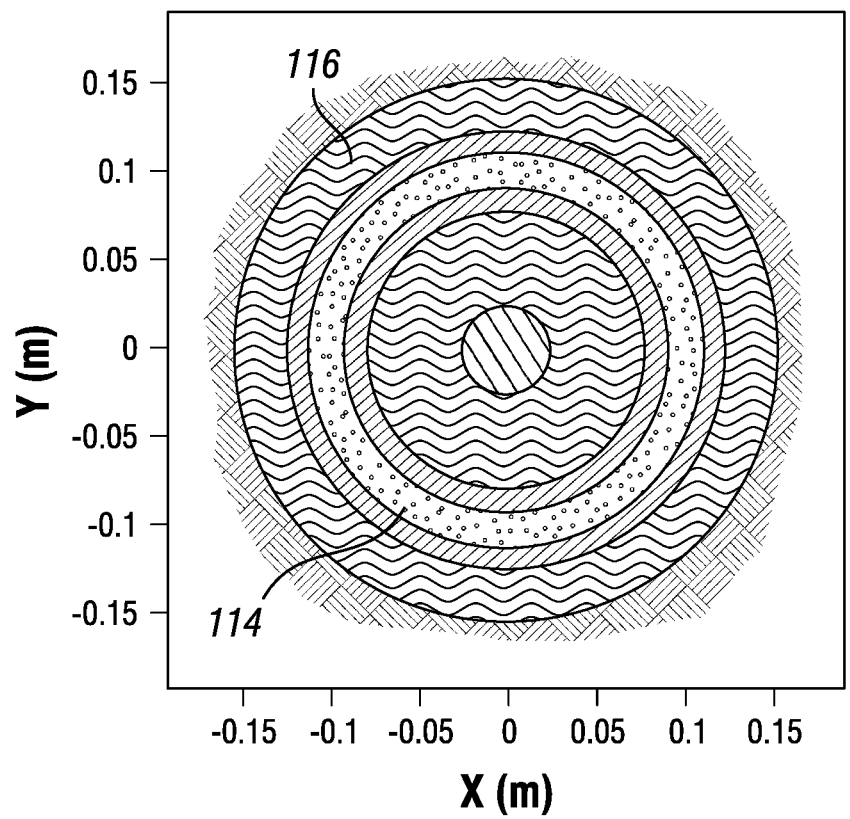
FIGS. 6a and 6b are respectively a cross-sectional diagram of a double-casing geometry with a first annulus filled with cement that is well-bonded to the second casing and a second annulus filled with mud, and synthetic waveforms at an array of receivers generated by a concentrically placed monopole transmitter for that casing scenario.
Figure 6B:
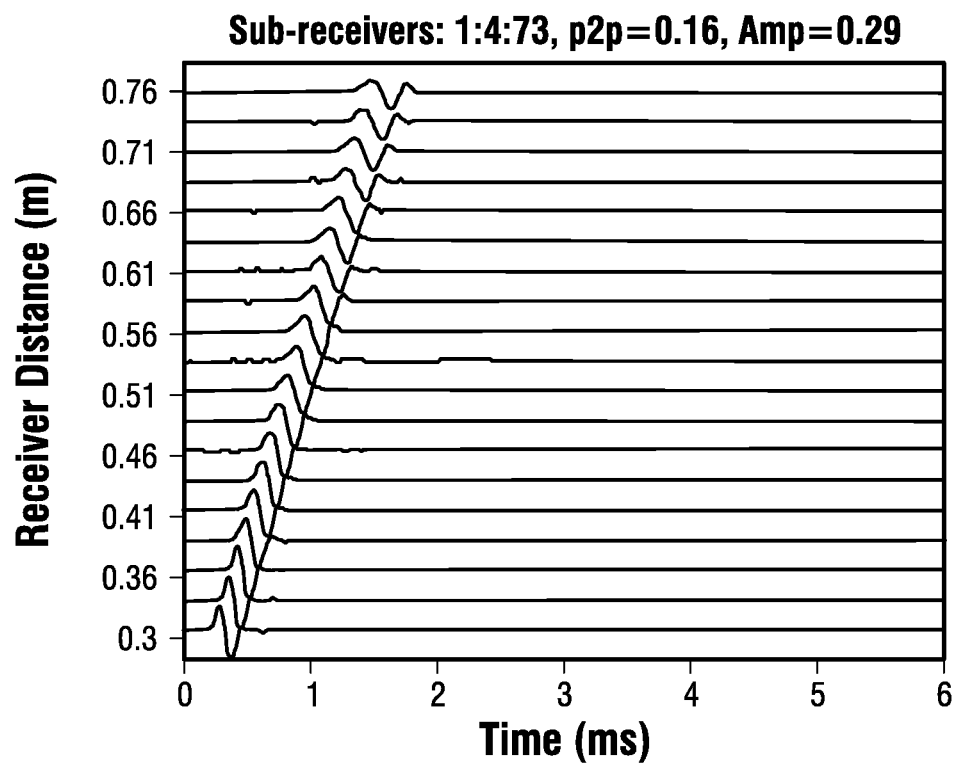
Figure 7A:
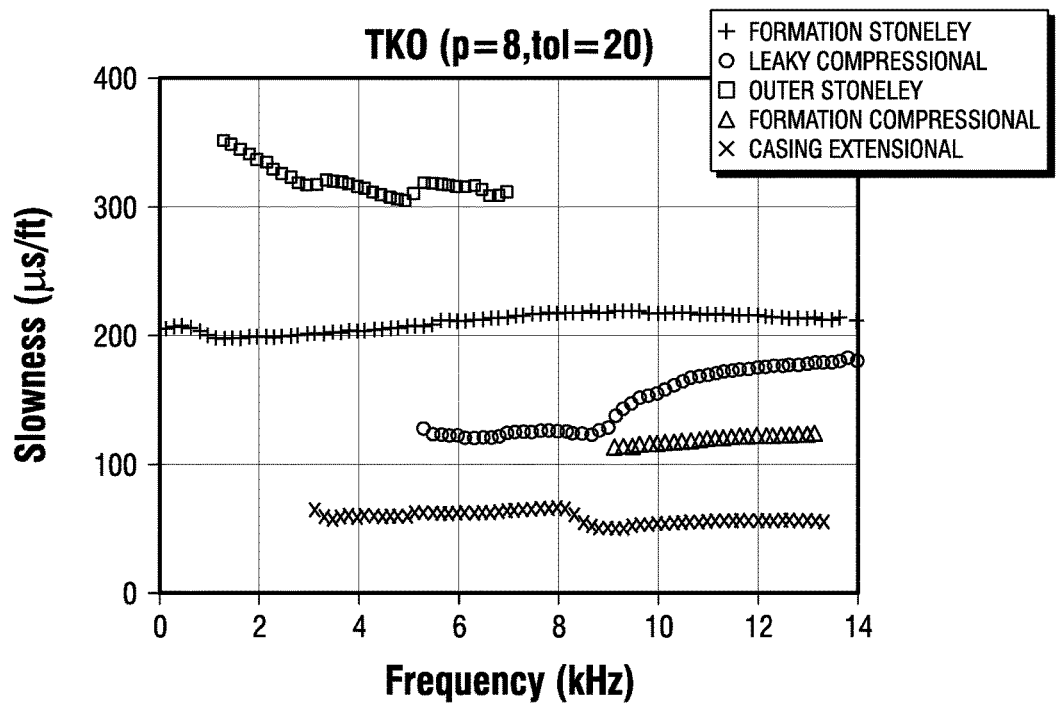
FIGS. 7a and 7b are respectively the slowness and attenuation dispersion plots obtained from the processing of the monopole waveforms of FIG. 6b.
Figure 7B:
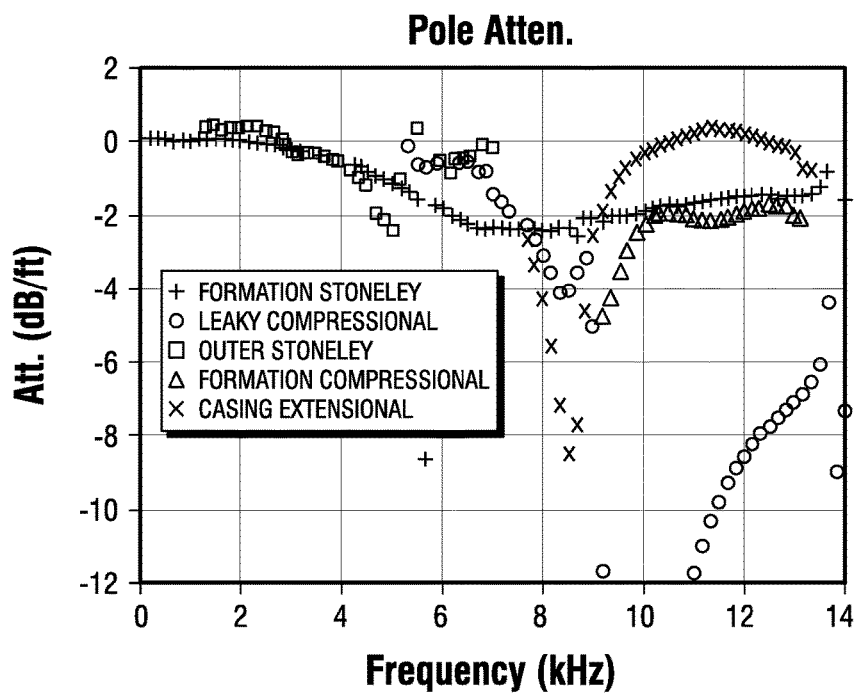

When the first annulus 114 is filled with mud (as seen in FIG. 4a), a processing of the resulting monopole waveforms seen in FIG. 4b yields four coherent modal arrivals in the wavetrain as shown in FIGS. 5a and 5b. They are labeled as the formation Stoneley (also known as the casing-formation Stoneley or inner casing-formation Stoneley), formation leaky compressional, outer Stoneley (also known as the casing-formation outer Stoneley), and casing extensional modes. The presence of mud in the first annulus supports the inner casing extensional mode and an outer Stoneley mode that propagates with acoustic energy in the annulus between the inner and outer casings. Of all these modal arrivals, the leaky compressional mode exhibits the largest amount of attenuation caused by the radiation of energy into the surrounding slow formation.

FIGS. 6a, 6b, 7a, and 7b, depict similar results as FIGS. 4a, 4b, 5a, and 5b for the case of mud-filled second annulus 116 and the first annulus 114 being filled with well-bonded solid cement. Two striking signatures in this case are the presence of an outer Stoneley mode with dominant energy traveling in the second annulus and increased attenuation associated with the (inner) formation Stoneley mode.

Figure 8A:
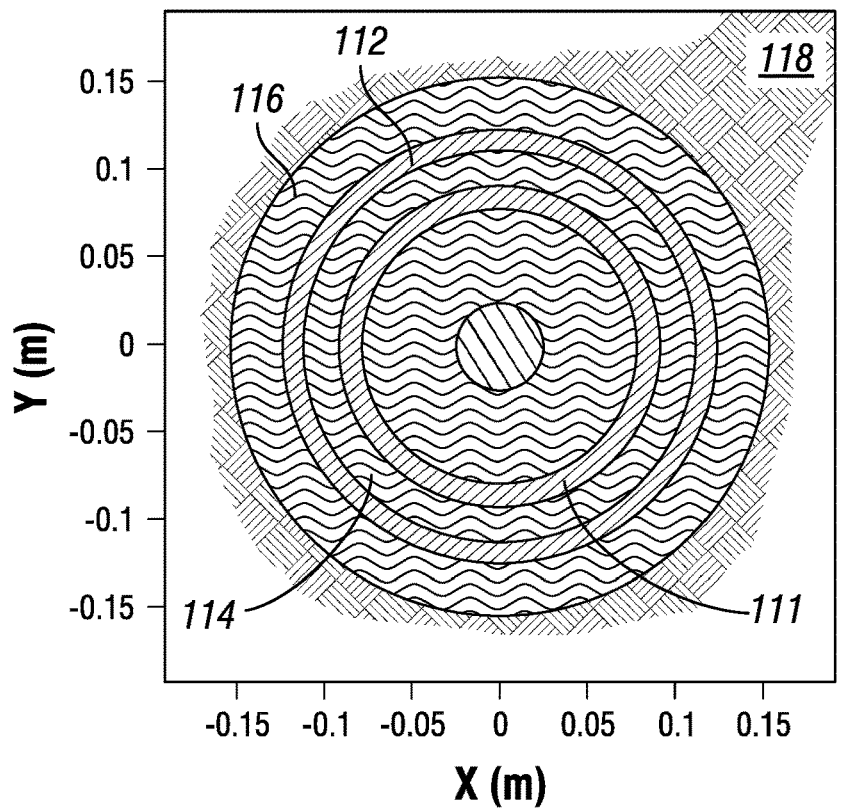
FIGS. 8a and 8b are respectively a cross-sectional diagram of a double-casing geometry with the first and second annuli filled with mud, and synthetic waveforms at an array of receivers generated by a concentrically placed monopole transmitter for that casing scenario.
Figure 8B:
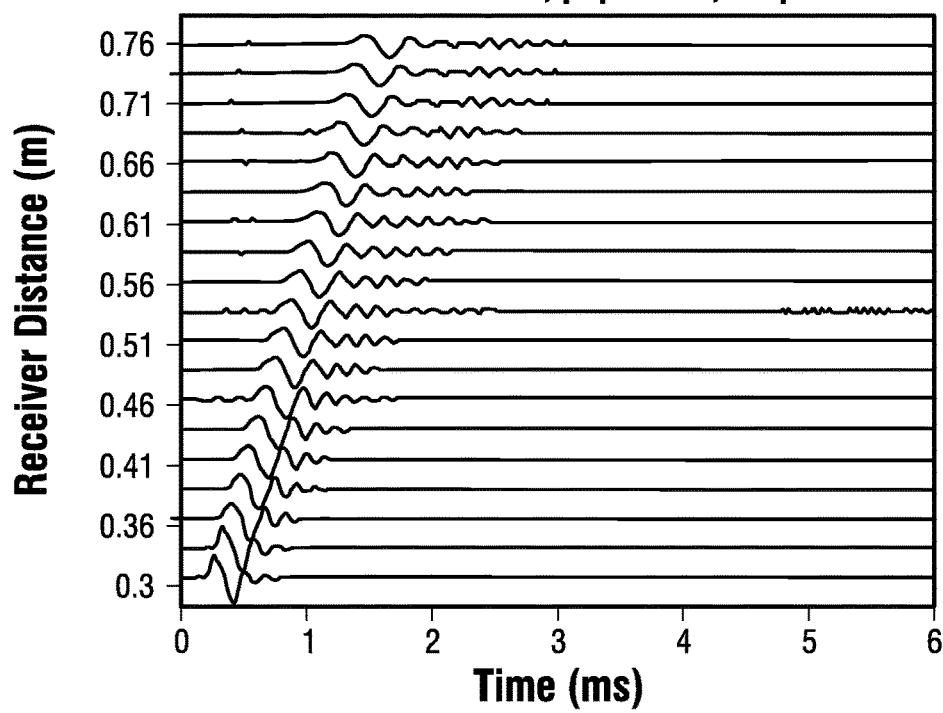
Figure 9A:
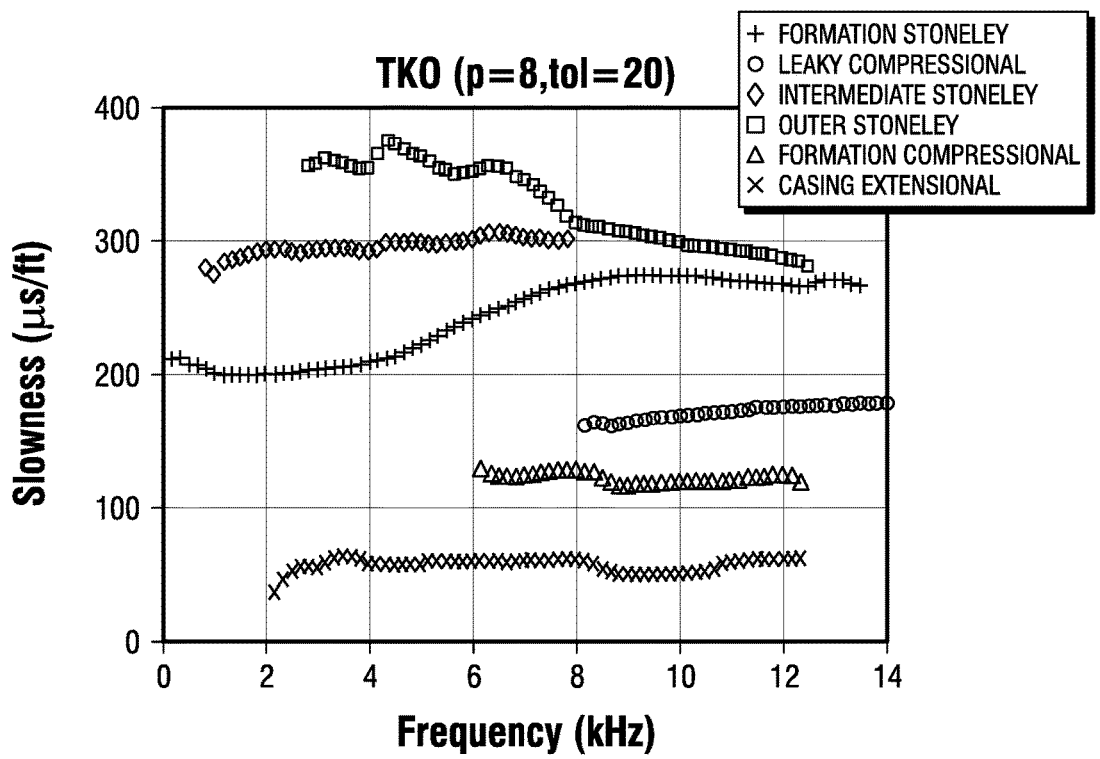
FIGS. 9a and 9b are respectively the slowness and attenuation dispersion plots obtained from the processing of the monopole waveforms of FIG. 8b.
Figure 9B:
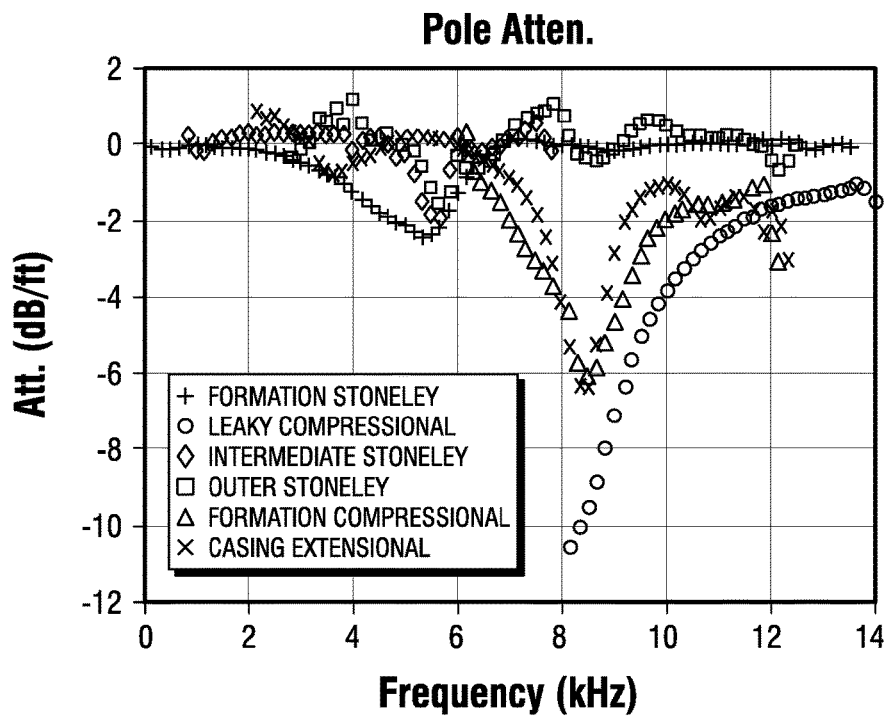

When both the first and second annuli 114, 116 are filled with mud as seen in FIG. 8a (with resulting waveforms seen in FIG. 8b), the composite structure of the double-casing 111, 112 together with a surrounding slow formation 118 supports six different modal arrivals. Computational results for this geometry are shown in FIGS. 9a and 9b. Salient features associated with this geometry are the presence of (inner) formation Stoneley, formation compressional, higher-frequency leaky-compressional, intermediate and outer Stoneley modes with dominant energy propagating respectively in the first and second annuli 114, 116.

Figure 10A:
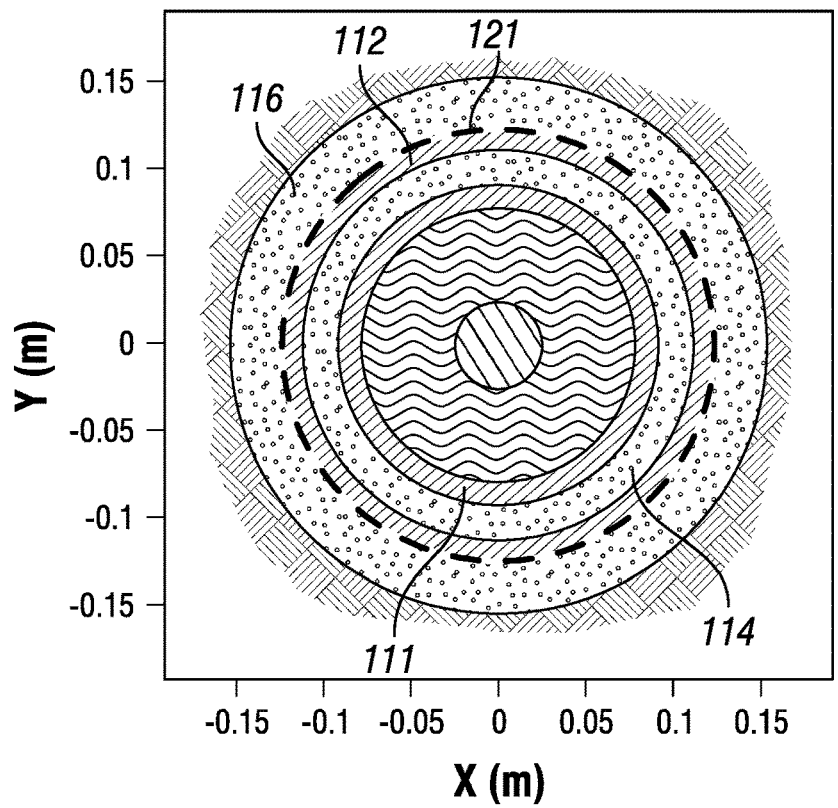
FIGS. 10a and 10b are respectively a cross-sectional diagram of a double-casing geometry with the first annulus filled with cement and well bonded to the inner casing and with a second annulus filled with cement but with a slip at the interface of the outer casing and the cement, and synthetic waveforms at an array of receivers generated by a concentrically placed monopole transmitter for that casing scenario.
Figure 10B:
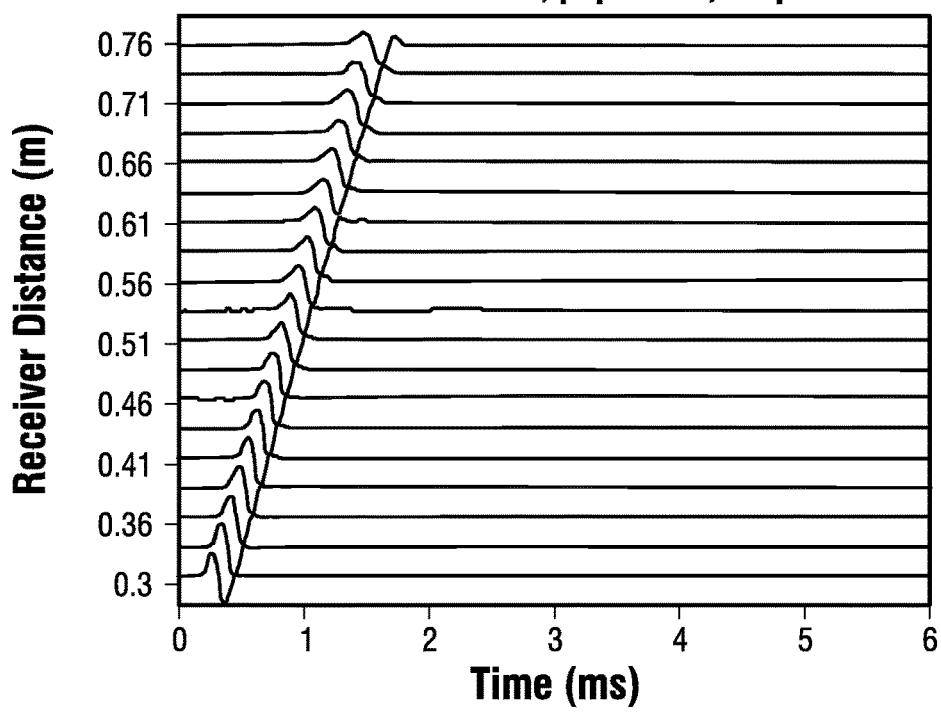
Figure 11A:
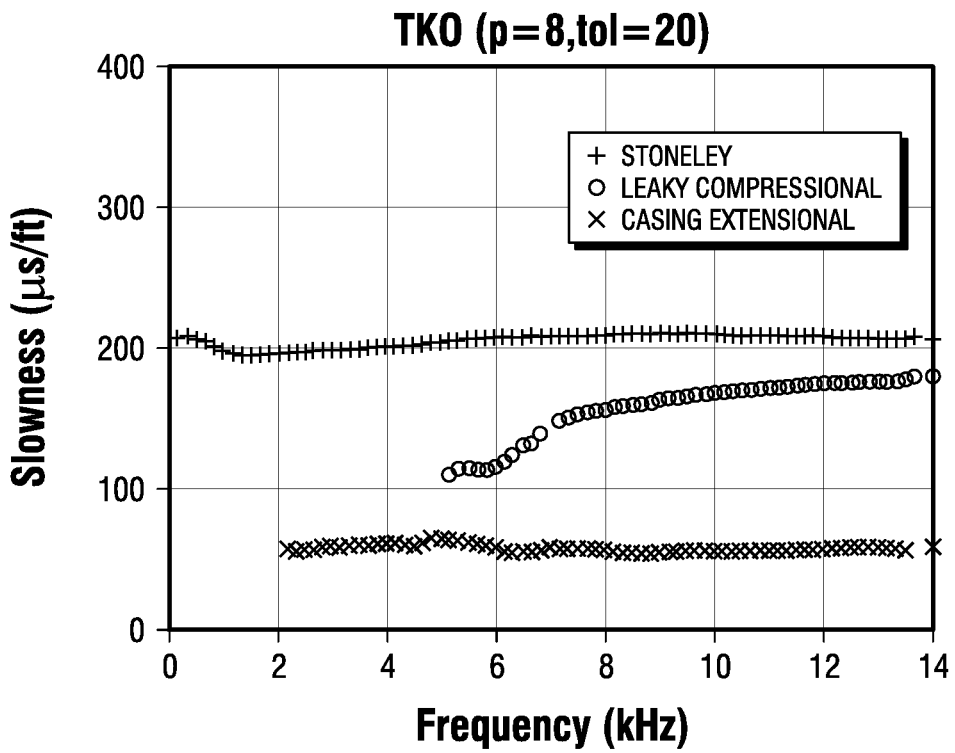
FIGS. 11a and 11b are respectively the slowness and attenuation dispersion plots obtained from the processing of the monopole waveforms of FIG. 10b.
Figure 11B:
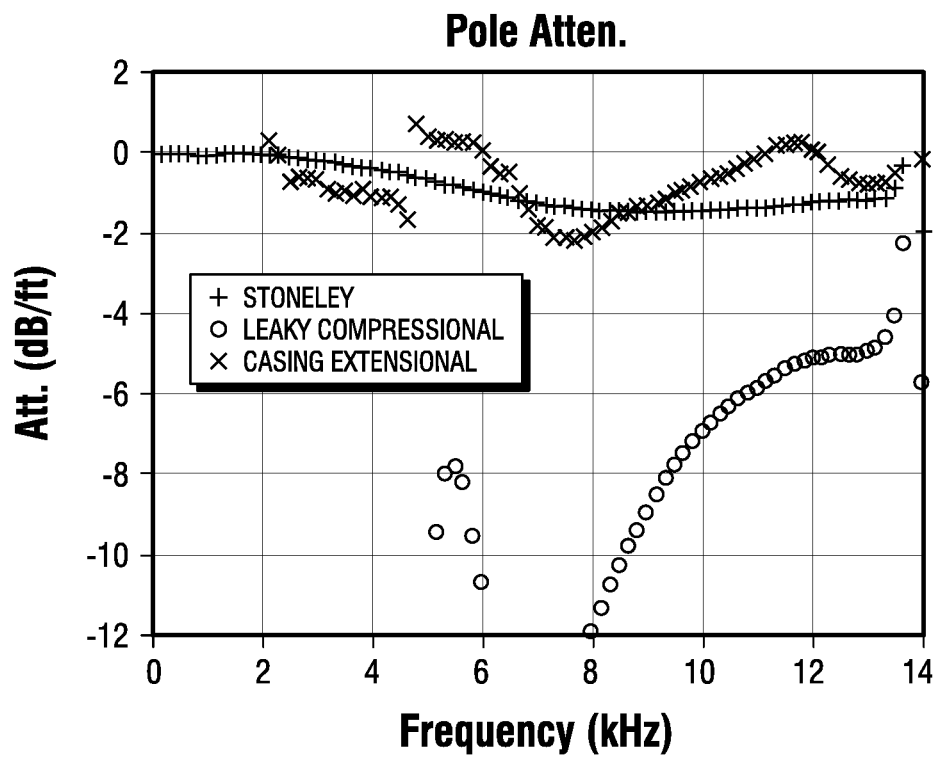

In FIG. 10a, a double-casing geometry is seen with inner and outer casings 111, 112, a well-bonded cement in the first annulus 114, cement in the second annulus 116 and a slip 121 at the interface between the outer casing 112 and cement annulus 116 (also called the "4$^{th}$ interface"). A slip is a debonded condition between the cement and the casing or the formation at an interface. In such cases, the cement can move or "slip" with repect to the casing or formation. Waveforms resulting from a monopole signal are seen in FIG. 10b. Monopole slowness and attenuation dispersion signatures associated with FIGS. 10a and 10b are seen in FIGS. 11a and 11b. Notable slowness and attenuation dispersion characteristics associated with this geometry are the presence of a highly attenuative leaky-compressional mode, a (casing-formation) Stoneley mode with some attenuation at high frequencies, and a casing extensional mode.

Figure 12A:
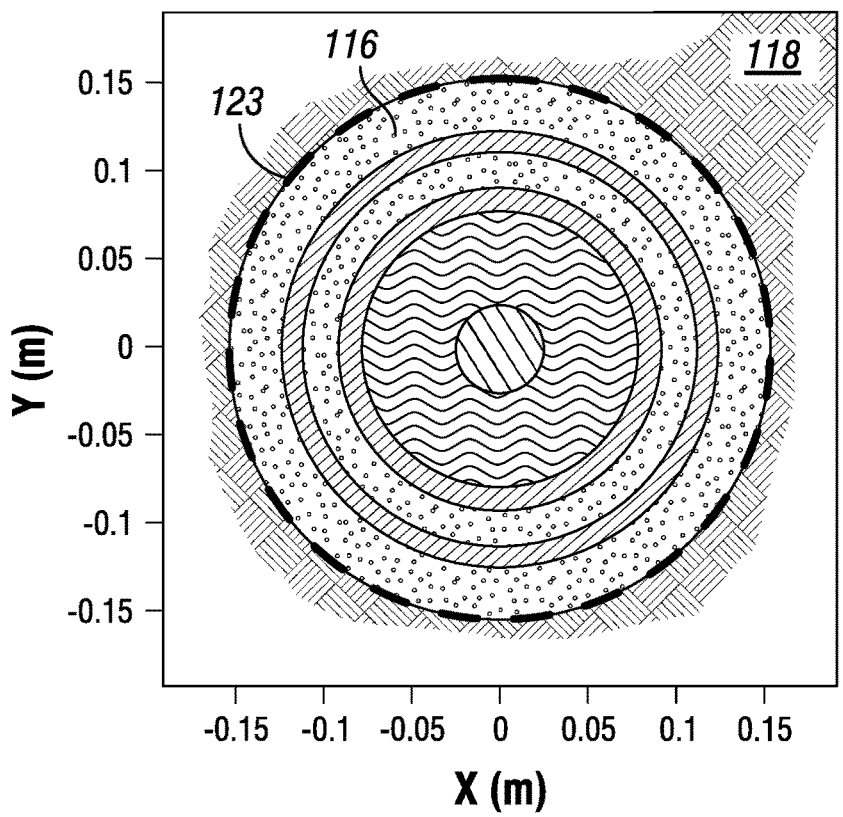
FIGS. 12a and 12b are respectively a cross-sectional diagram of a double-casing geometry with the first annulus filled with cement and well bonded to the inner casing and with a second annulus filled with cement and well bonded to the outer casing but with a slip at the interface of the cement and the formation, and synthetic waveforms at an array of receivers generated by a concentrically placed monopole transmitter for that casing scenario.
Figure 12B:
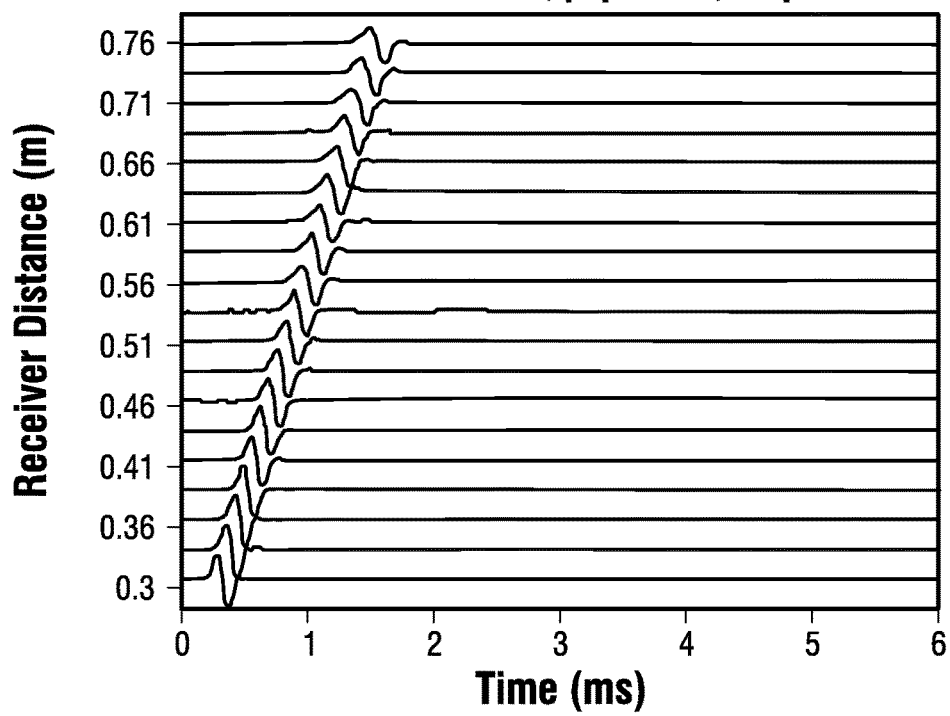
Figure 13A:
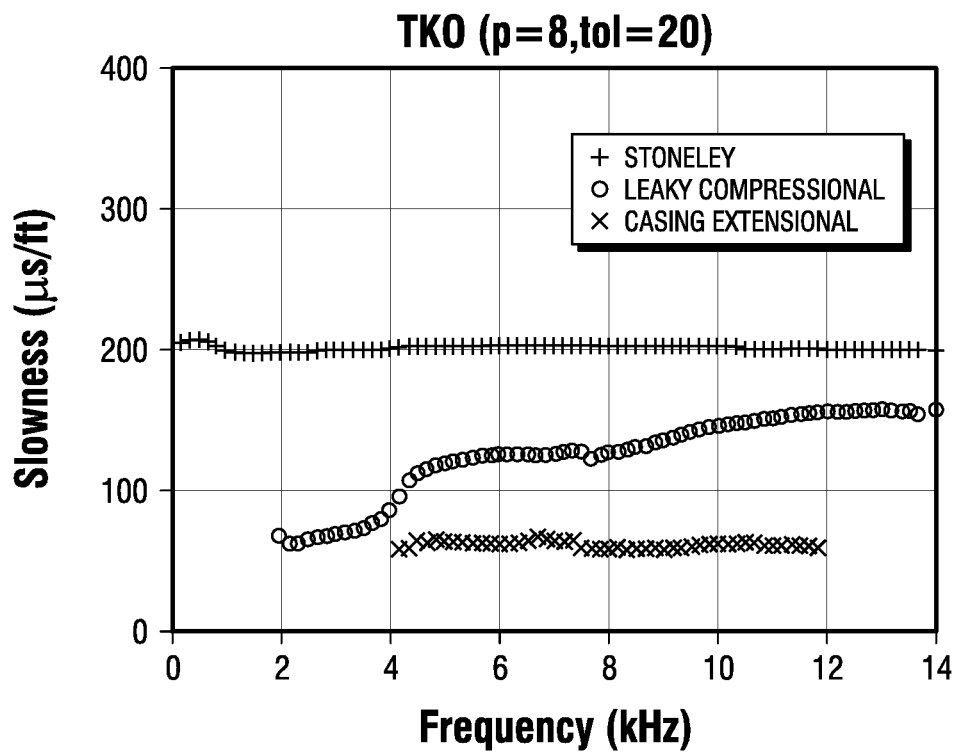
FIGS. 13a and 13b are respectively the slowness and attenuation dispersion plots obtained from the processing of the monopole waveforms of FIG. 12b.
Figure 13B:
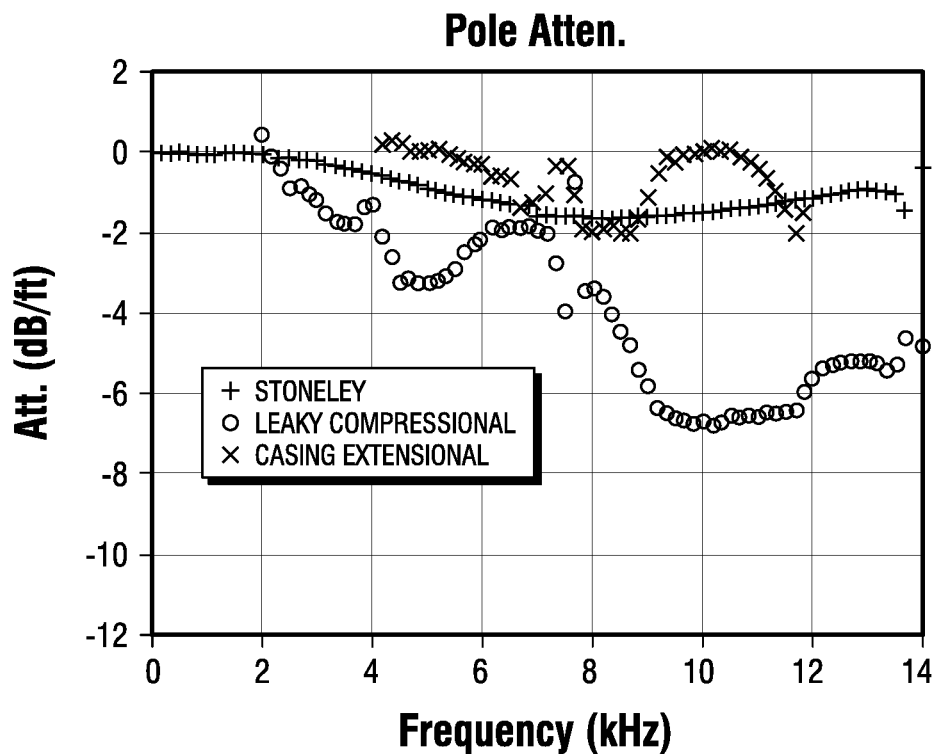

In FIG. 12a, an interfacial slip 123 is shown at the interface between the second cement annulus 116 and formation 118 (also called the "$5^{th}$ interface"). The resulting waveforms are seen in FIG. 12b. Processing of the waveforms produces similar slowness and attenuation dispersions as is the case with an interfacial slip 121 at the second casing—second cement annulus interface, although as seen in FIGS. 13a and 13b, the leaky compressional mode attenuation signature is different.

Figure 14A:
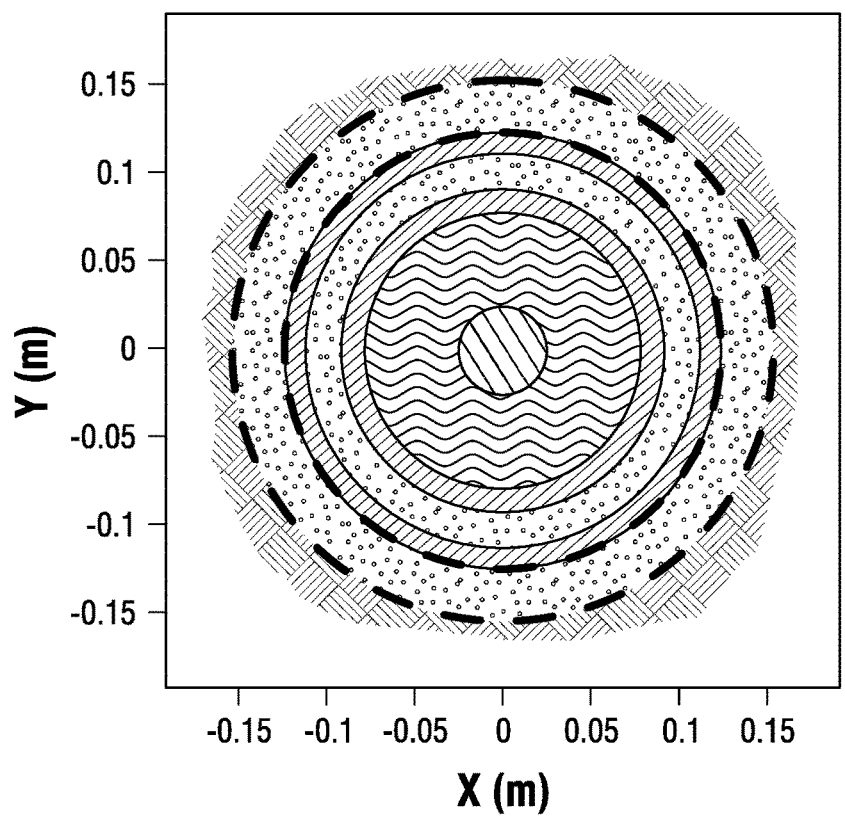
FIGS. 14a and 14b are respectively a cross-sectional diagram of a double-casing geometry with the first annulus filled with cement that is well bonded to the inner casing and with a second annulus filled with cement but with slips at the interface of the cement and the second casing and at the interface of the cement and the formation, and synthetic waveforms at an array of receivers generated by a concentrically placed monopole transmitter for that casing scenario.
Figure 14B:
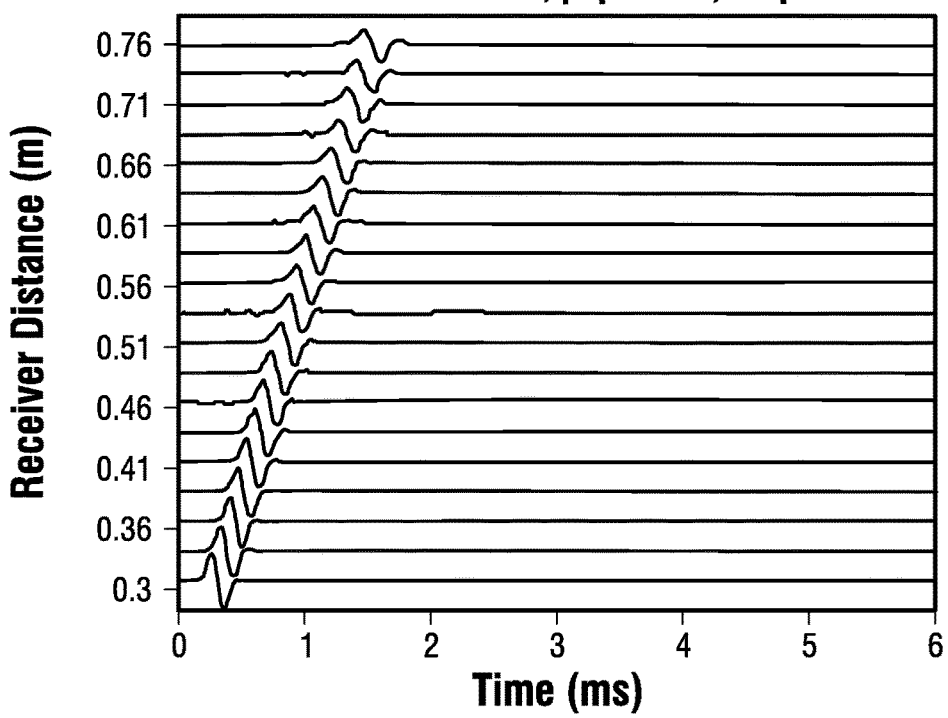
Figure 15A:
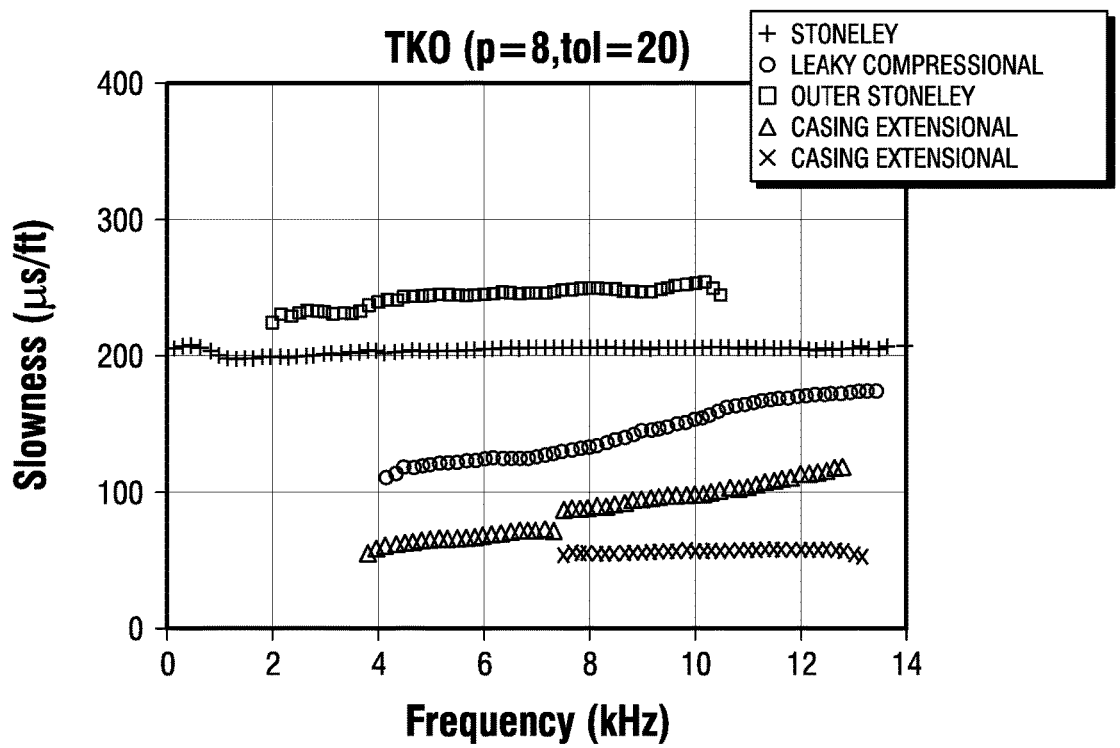
FIGS. 15a and 15b are respectively the slowness and attenuation dispersion plots obtained from the processing of the monopole waveforms of FIG. 14b.
Figure 15B:
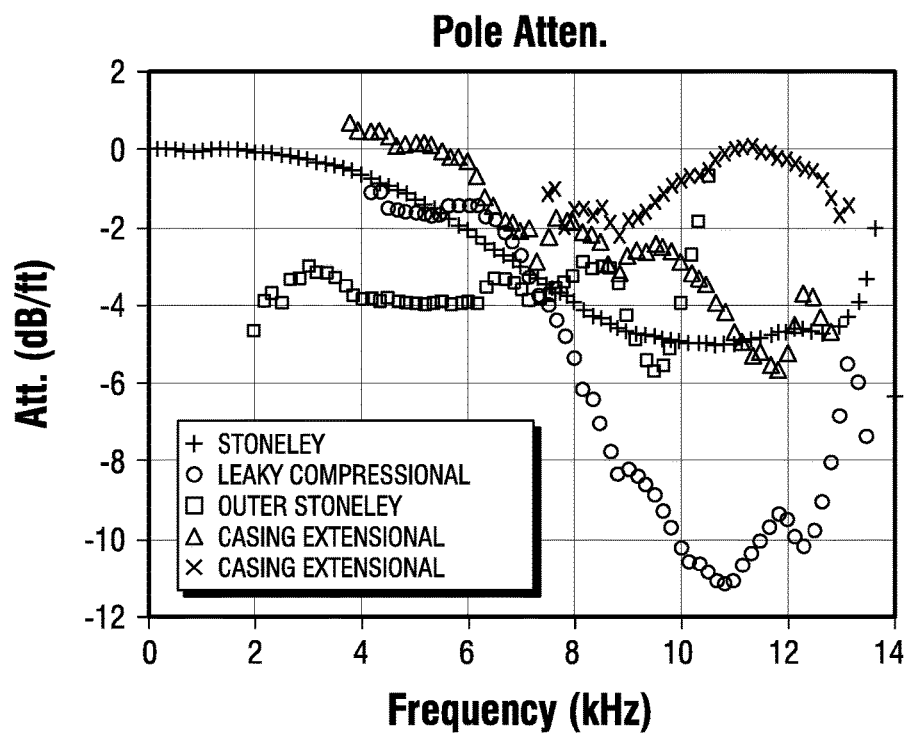

When slips are found at both the $4^{th}$ and $5^{th}$ interfaces, the resulting sonic signatures are not equivalent to the combination of results obtained where the slips are separately found. Instead, with the geometry of FIG. 14a (with resulting waveforms seen in FIG. 14b), the resulting processing yields the presence of both the inner and outer casing extensional modes together with the inner and outer Stoneley modes and a highly attenuative leaky compressional mode as seen in FIGS. 15a and 15b.

Figure 16A:
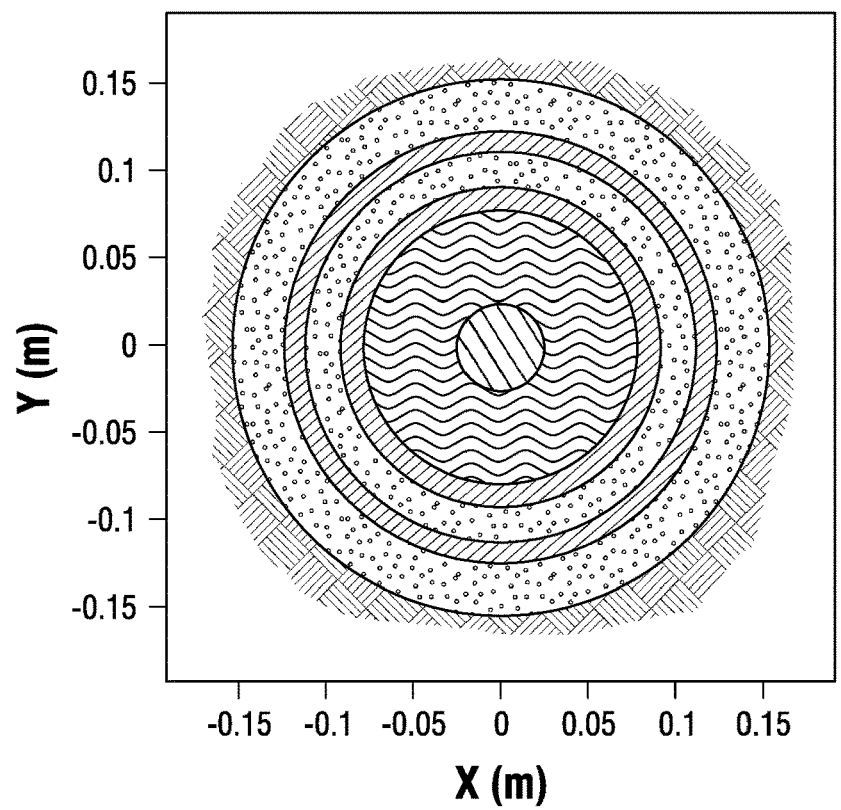
FIGS. 16a and 16b are respectively a cross-sectional diagram of a well-bonded double casing together with cement annuli surrounded by a formation, and synthetic waveforms at an array of receivers generated by a concentrically placed dipole transmitter for that casing scenario.
Figure 16B:
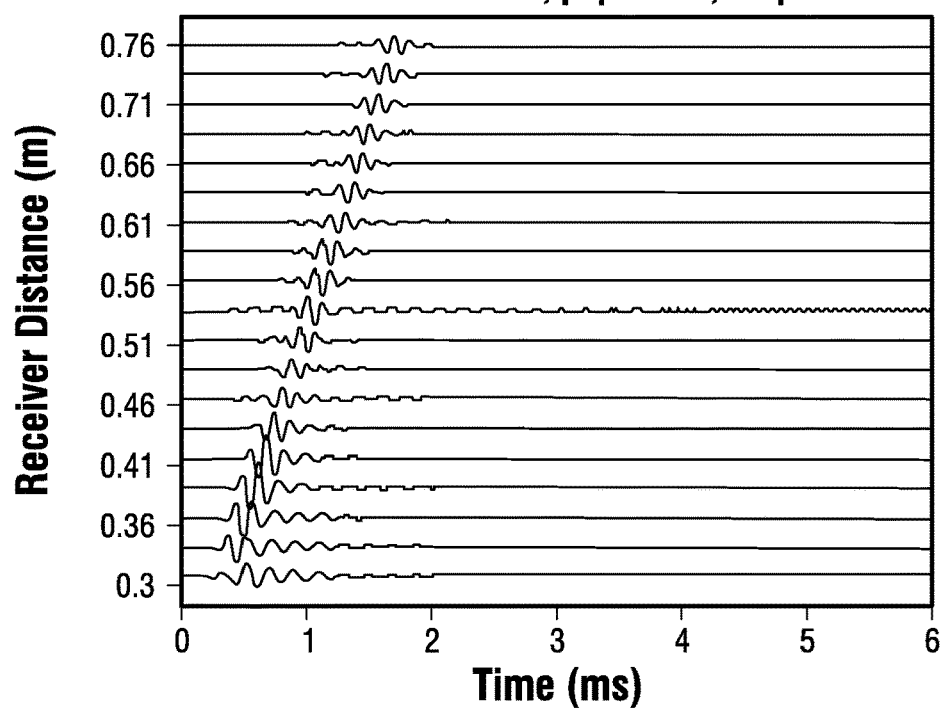
Figure 17A:
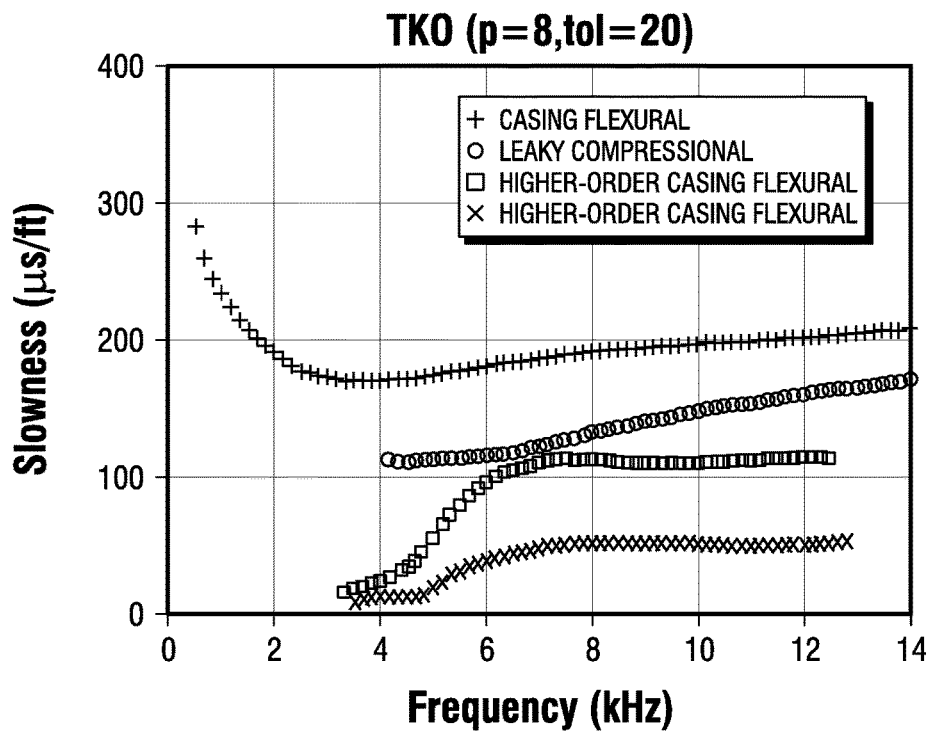
FIGS. 17a and 17b are respectively the slowness and attenuation dispersion plots obtained from the processing of the dipole waveforms of FIG. 16b.
Figure 17B:
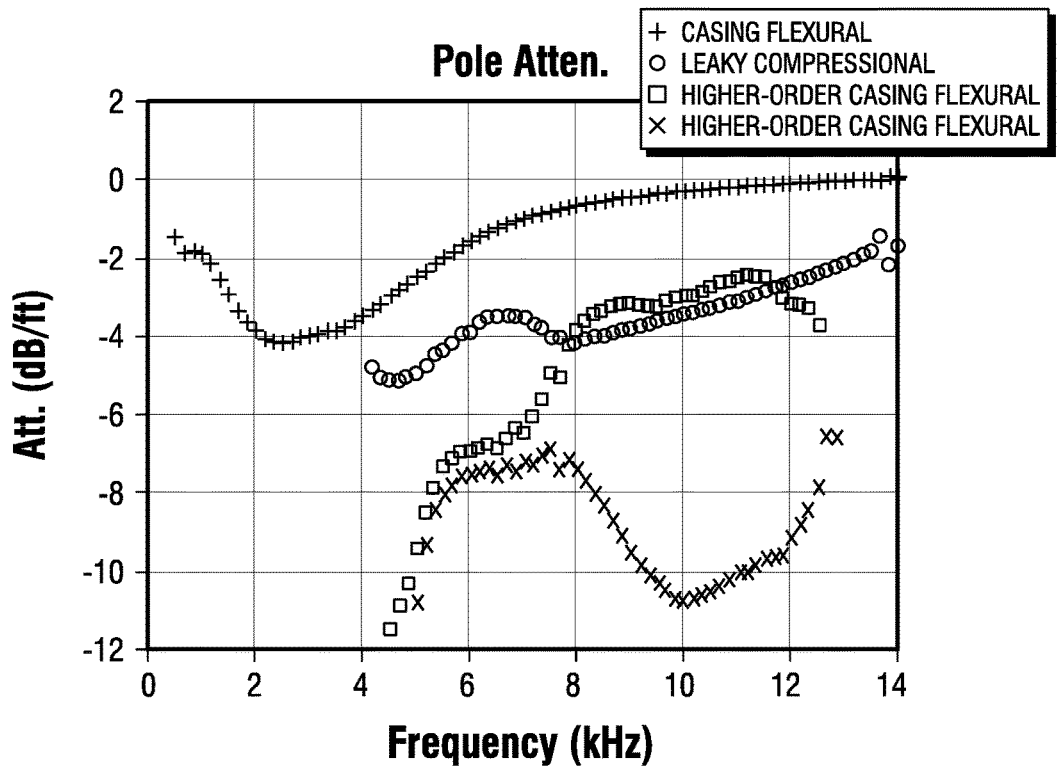

Sonic signatures associated with different types of cement imperfections produced by a dipole transmitter placed on a concentrically placed sonic tool are also described herein. FIG. 16a presents a cross-sectional view of a well-bonded double casing surrounded by a slow formation which is identical to FIG. 2a. FIG. 16b depicts an array of waveforms generated by a dipole transmitter. Processing of these waveforms by a modified matrix pencil algorithm yields slowness and attenuation dispersions associated with modal arrivals as shown in FIGS. 17a and 17b, respectively. In contrast to signatures associated with the processing of monopole waveforms, casing flexural slowness and attenuation dispersions are always present in a double casing well bonded to a surrounding slow formation. Dominant arrivals in the case of a well-bonded double casing surrounded by a slow formation include a casing flexural, dipole-leaky compressional, and two higher-order casing flexural modes.

Figure 18A:
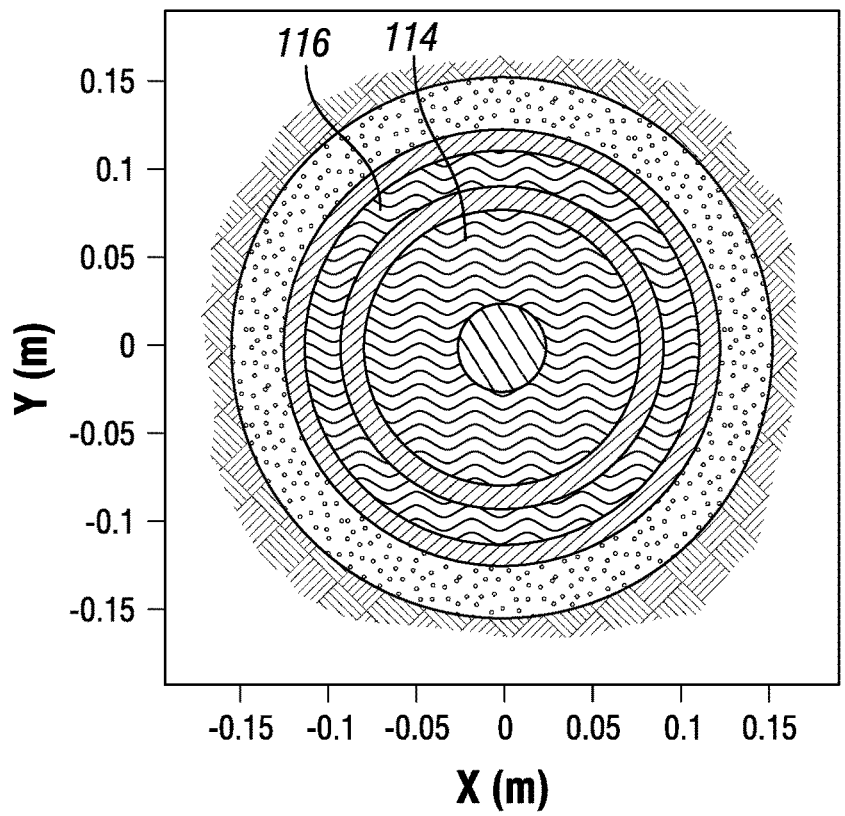
FIGS. 18a and 18b are respectively a cross-sectional diagram of a double-casing geometry with a first annulus filled with mud and a second annulus filled with cement that is well-bonded to the formation, and synthetic waveforms at an array of receivers generated by a concentrically placed dipole transmitter for that casing scenario.
Figure 18B:
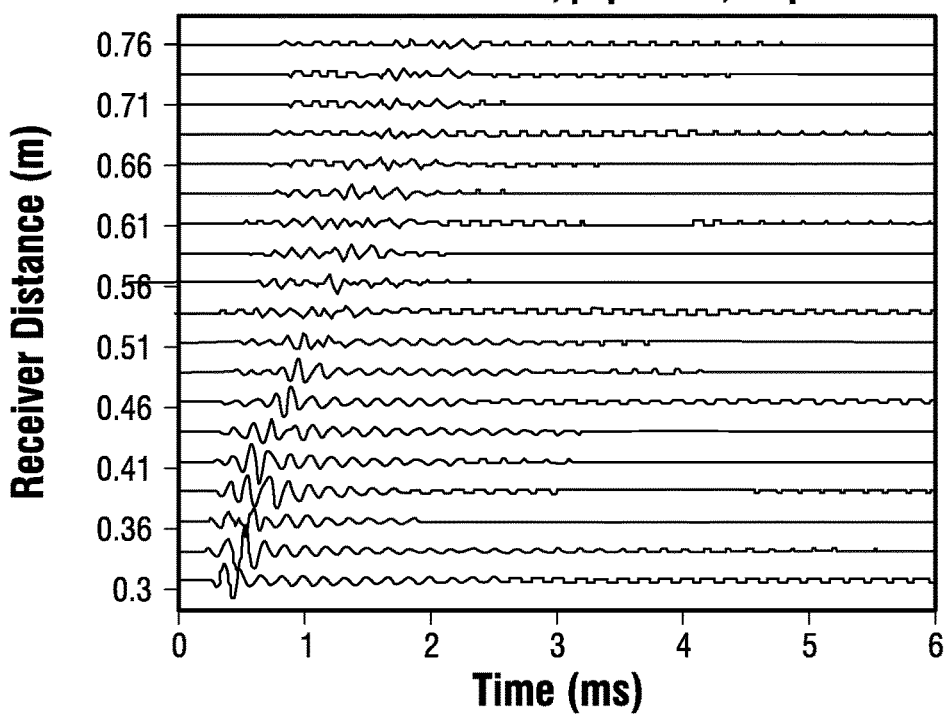
Figure 19A:
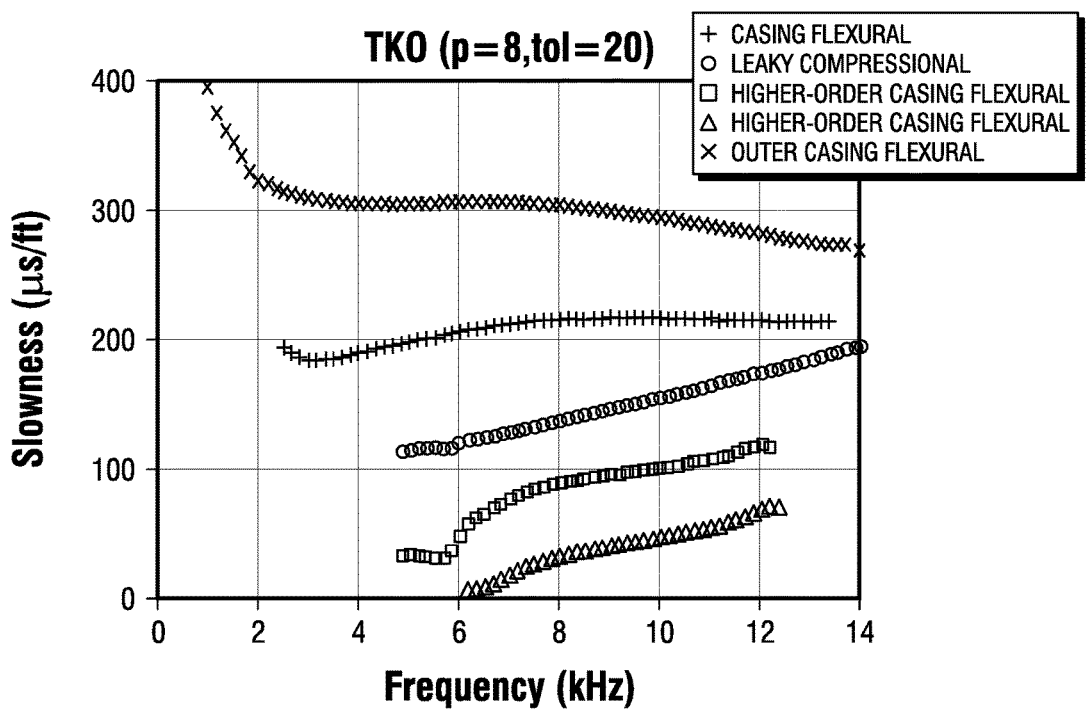
FIGS. 19a and 19b are respectively the slowness and attenuation dispersion plots obtained from the processing of the dipole waveforms of FIG. 18b.
Figure 19B:
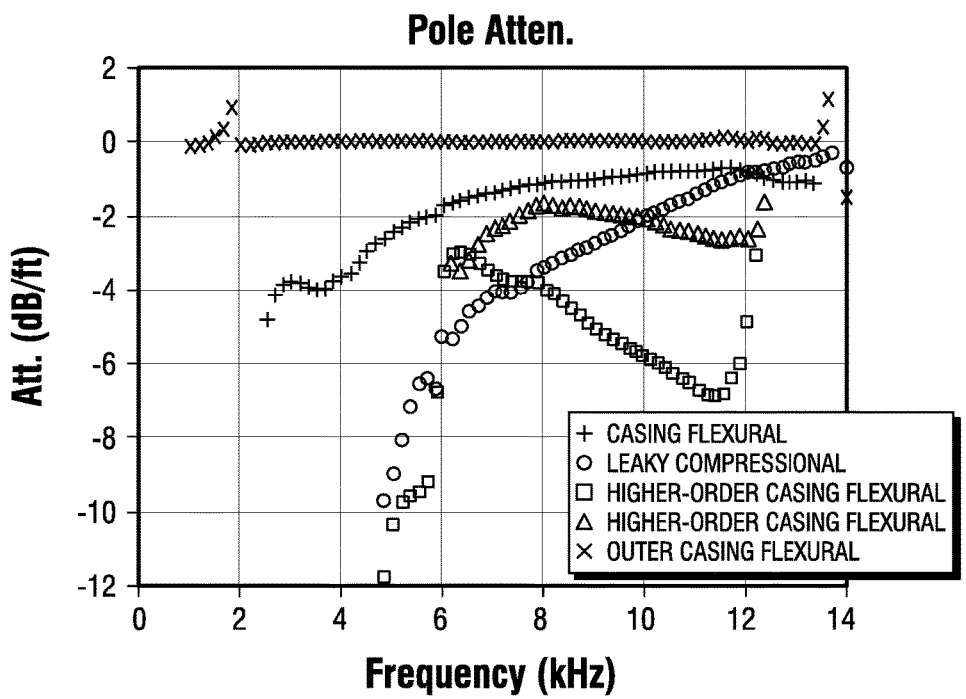

FIG. 18a shows a cross-sectional view of the geometry described above with respect to FIG. 4a (first annulus 114 filled with mud; second annulus 116 well-cemented), and FIG. 18b shows the detected waveforms resulting from the use of a dipole transmitter. Computational results for the slowness and attenuation dispersions are seen in FIGS. 19a and 19b with the presence of an an inner casing flexural mode, an outer casing flexural mode, a dipole leaky compressional mode, and two higher-order casing flexural modes with cut-off frequencies.

Figure 20A:
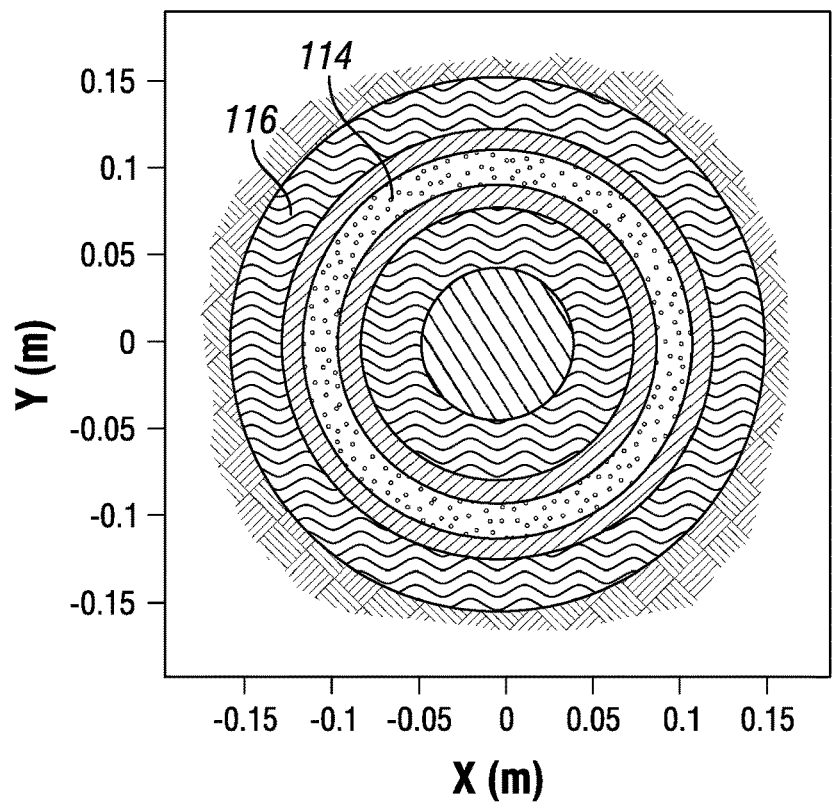
FIGS. 20a and 20b are respectively a cross-sectional diagram of a double-casing geometry with a first annulus filled with cement that is well-bonded to the second casing and a second annulus filled with mud, and synthetic waveforms at an array of receivers generated by a concentrically placed dipole transmitter for that casing scenario.
Figure 20B:
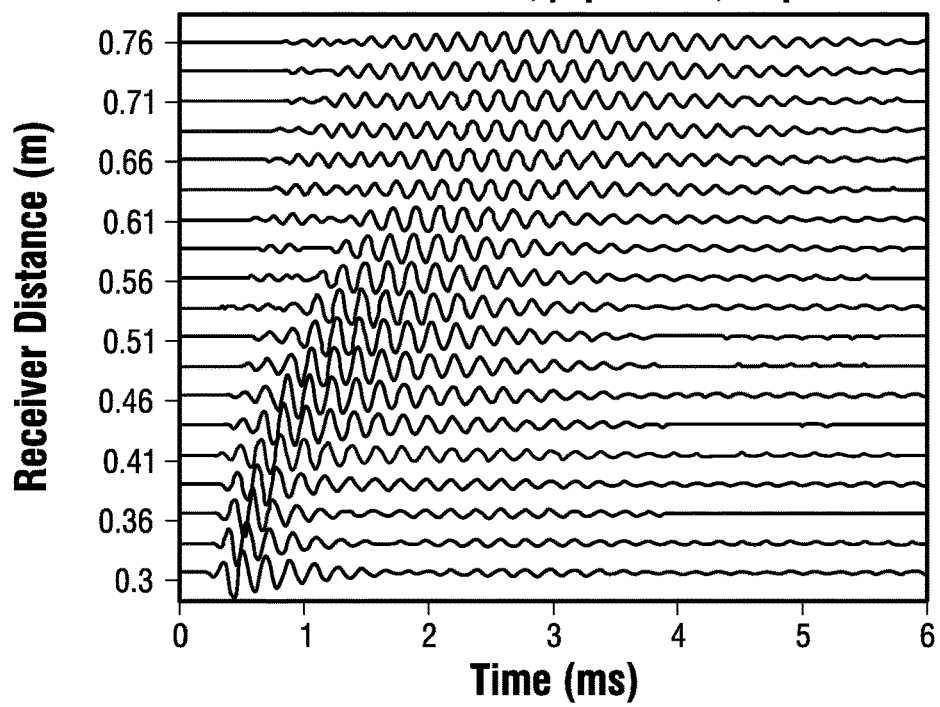
Figure 21A:
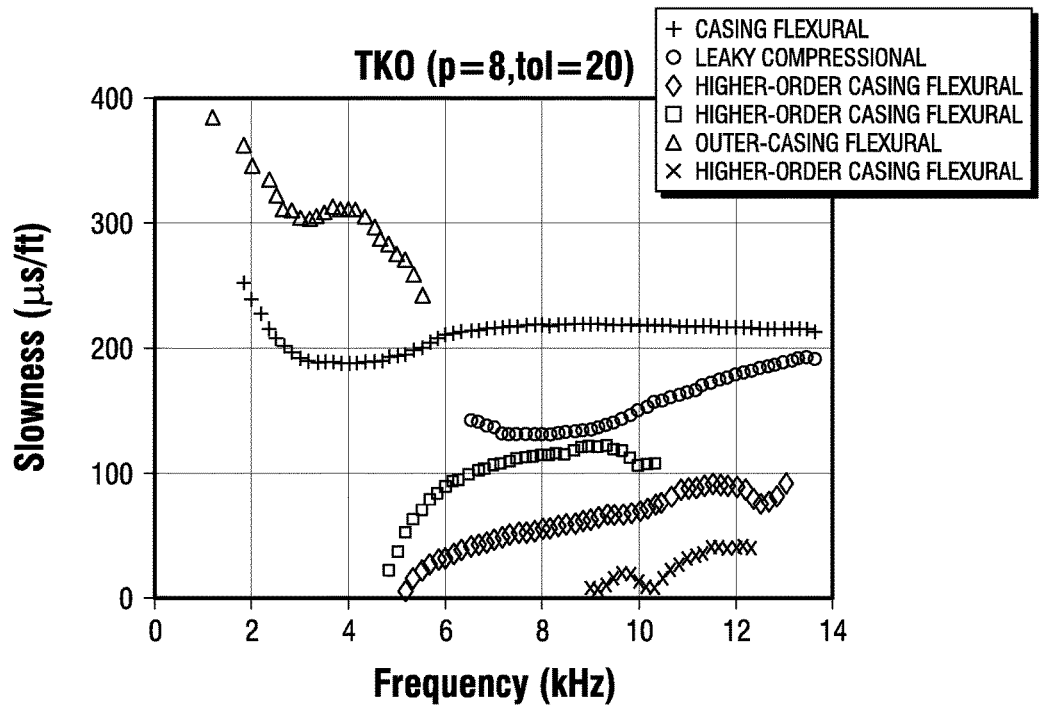
FIGS. 21a and 21b are respectively the slowness and attenuation dispersion plots obtained from the processing of the dipole waveforms of FIG. 20b.
Figure 21B:
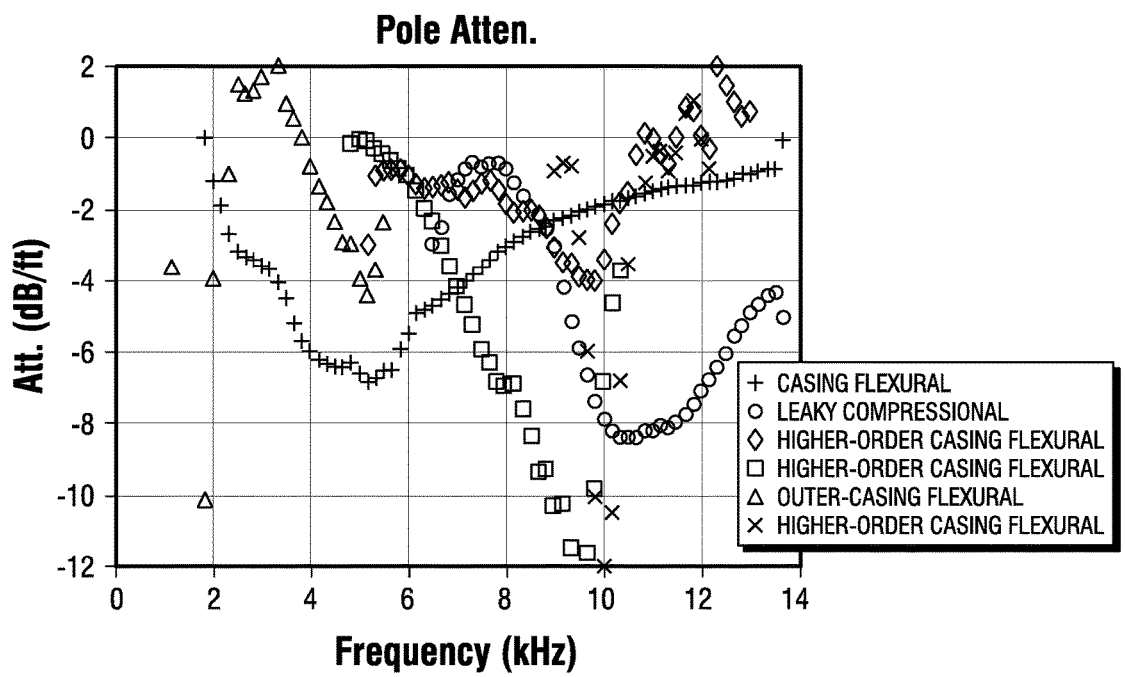

FIG. 20a shows the geometry described above with respect to FIG. 6a where the second annulus 116 is filled with mud and the first annulus 114 is well bonded with solid cement. FIG. 20b shows the detected waveforms resulting from the use of a dipole transmitter. Computational results for the slowness and attenuation dispersions are seen in FIGS. 21a and 21b. The slowness and attenuation dispersions for the modal arrivals in this case are somewhat similar to those observed with the geometry of FIG. 18a having the first annulus filled with mud and the second annulus filled with solid cement, except that a sixth mode (an extra higher-order casing flexural) is present, and the outer casing flexural mode is limited to lower frequencies.

Figure 22A:
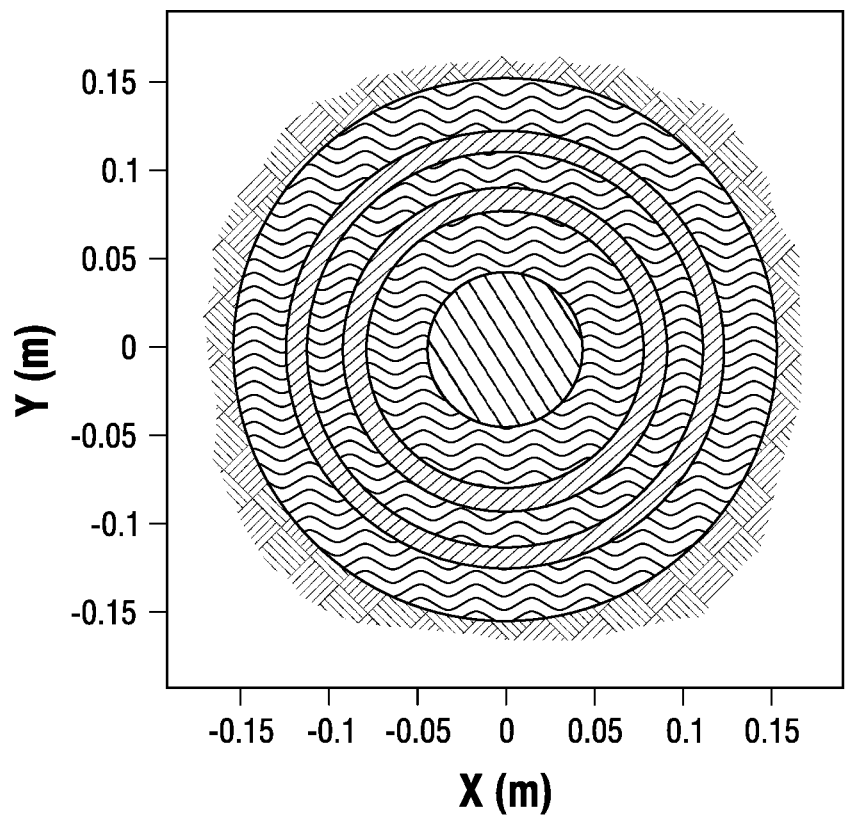
FIGS. 22a and 22b are respectively a cross-sectional diagram of a double-casing geometry with the first and second annuli filled with mud, and synthetic waveforms at an array of receivers generated by a concentrically placed dipole transmitter for that casing scenario.
Figure 22B:
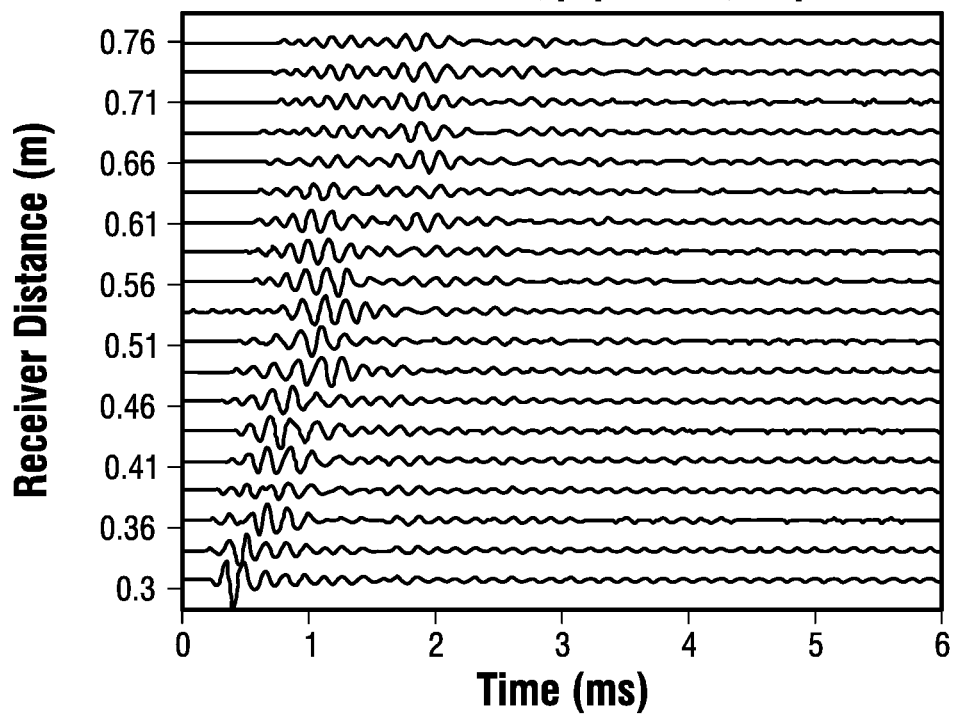
Figure 23A:
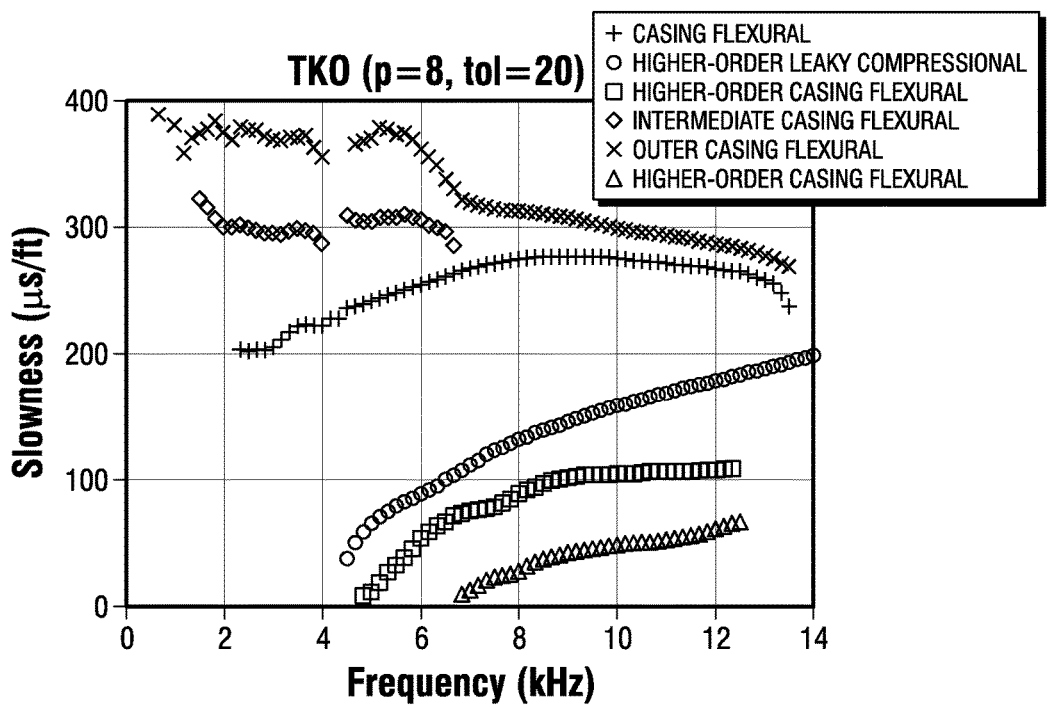
FIGS. 23a and 23b are respectively the slowness and attenuation dispersion plots obtained from the processing of the dipole waveforms of FIG. 22b.
Figure 23B:
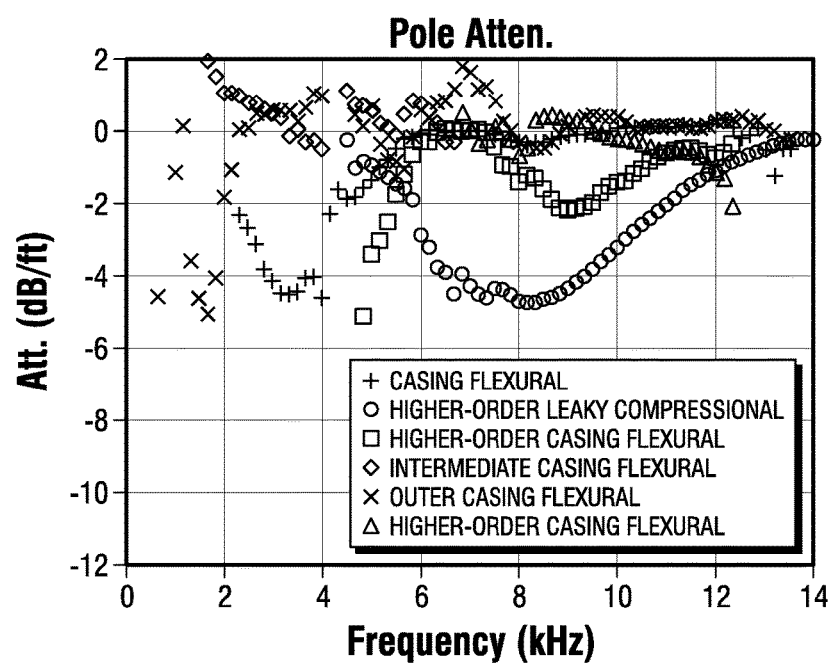

FIG. 22a shows the geometry described above with respect to FIG. 8a where both the first and second annuli are filled with mud. Dipole waveforms recorded at an array of receivers are shown in FIG. 22b. The presence of inner casing flexural, intermediate casing flexural, outer casing flexural, a higher-order dipole leaky compressional mode, and two higher-order casing flexural modes are shown in FIGS. 23a and 23b. In this geometry, the presence of lowest-order dipole leaky compressional mode that approaches the formation compressional slowness at low frequencies is not seen.

Figure 24A:
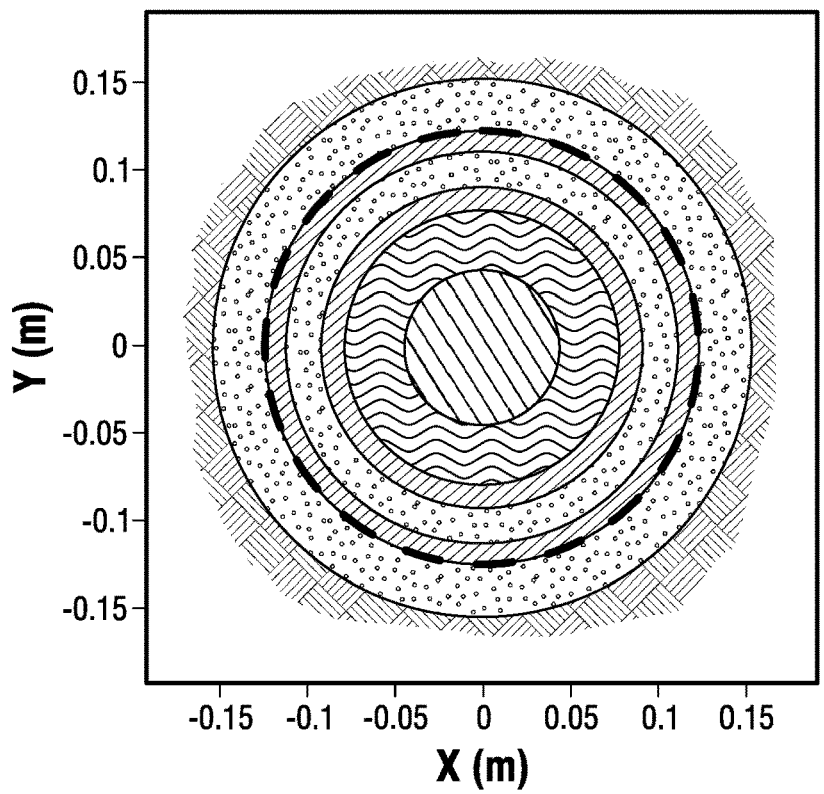
FIGS. 24a and 24b are respectively a cross-sectional diagram of a double-casing geometry with the first annulus filled with cement that is well bonded to the inner casing and with a second annulus filled with cement but with a slip at the interface of the outer casing and the cement, and synthetic waveforms at an array of receivers generated by a concentrically placed dipole transmitter for that casing scenario.
Figure 24B:
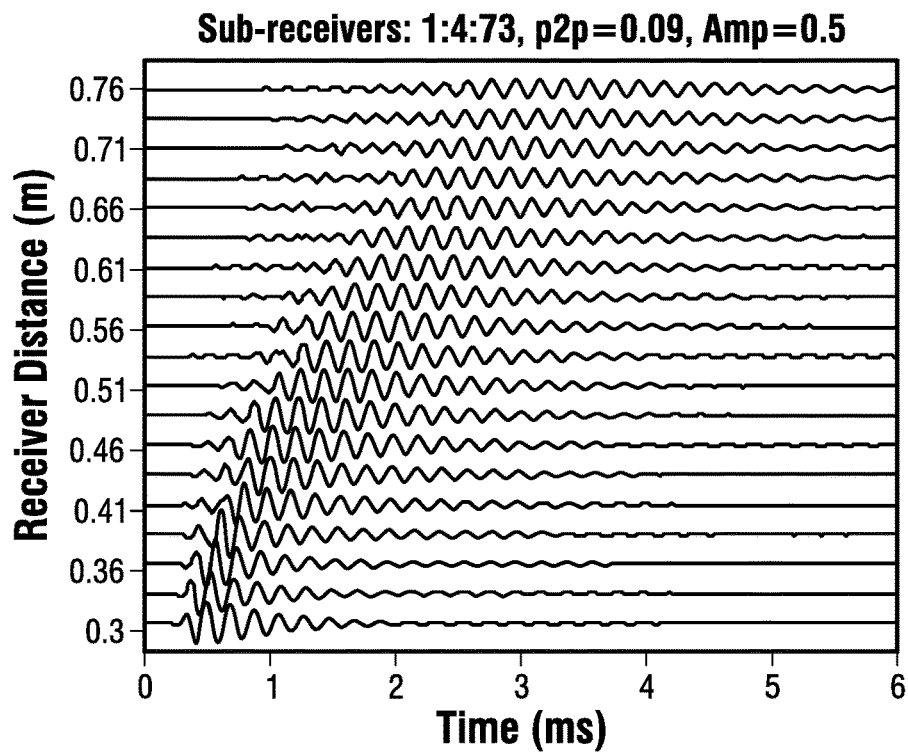
Figure 25A:
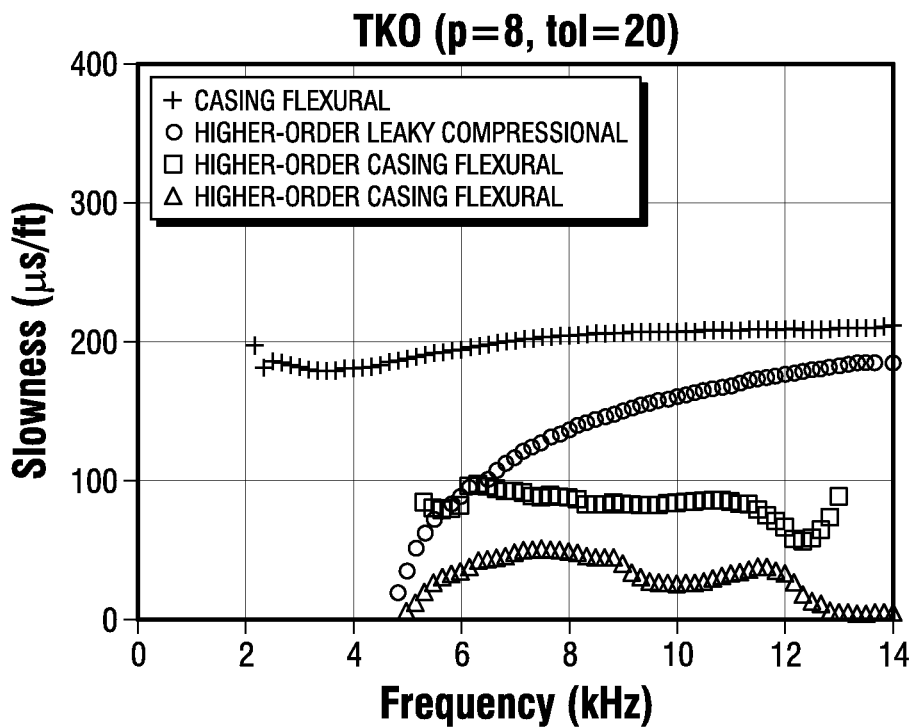
FIGS. 25a and 25b are respectively the slowness and attenuation dispersion plots obtained from the processing of the dipole waveforms of FIG. 24b.
Figure 25B:
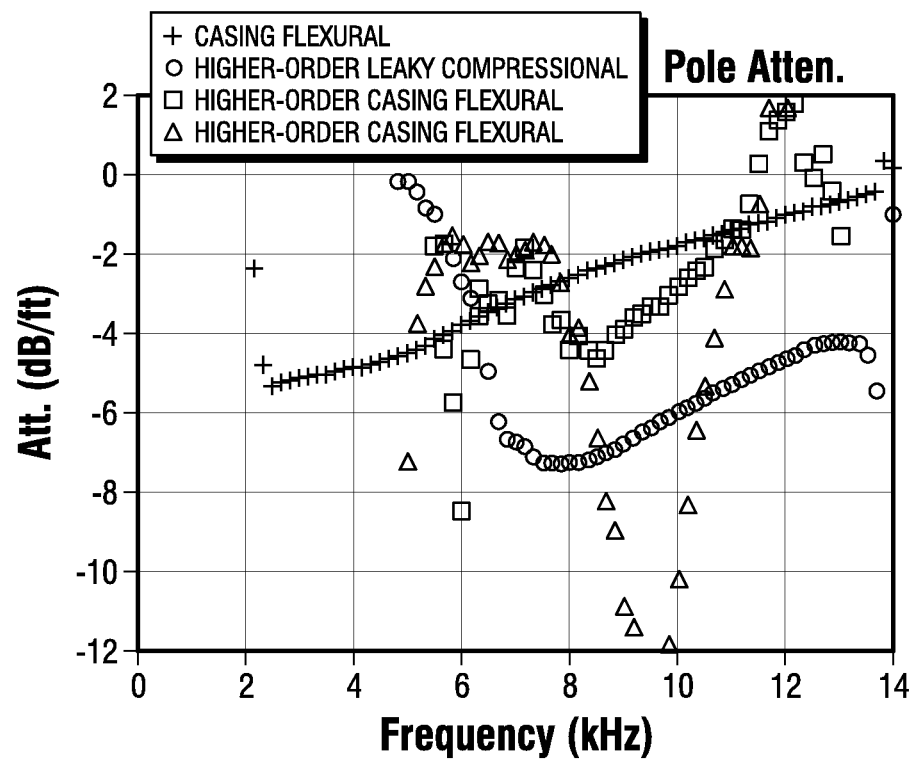

FIG. 24a shows the geometry described above with respect to FIG. 10a with a double-casing surrounded by a slow formation and with a slip at the outer casing—outer annulus (cement) interface. Synthetic recorded dipole waveforms at an array of receivers are shown in FIG. 24b. Processing of these waveforms outputs slowness and attenuation dispersions as shown in FIGS. 25a and 25b, respectively. This configuration is characterized by the presence of a casing flexural mode, a higher-order dipole leaky-compressional mode with a low cutoff frequency of about 5 kHz, and two higher-order casing flexural modes. Both the casing flexural and leaky compressional modes exhibit significant amount of attenuation as shown in FIG. 25b.

Figure 26A:
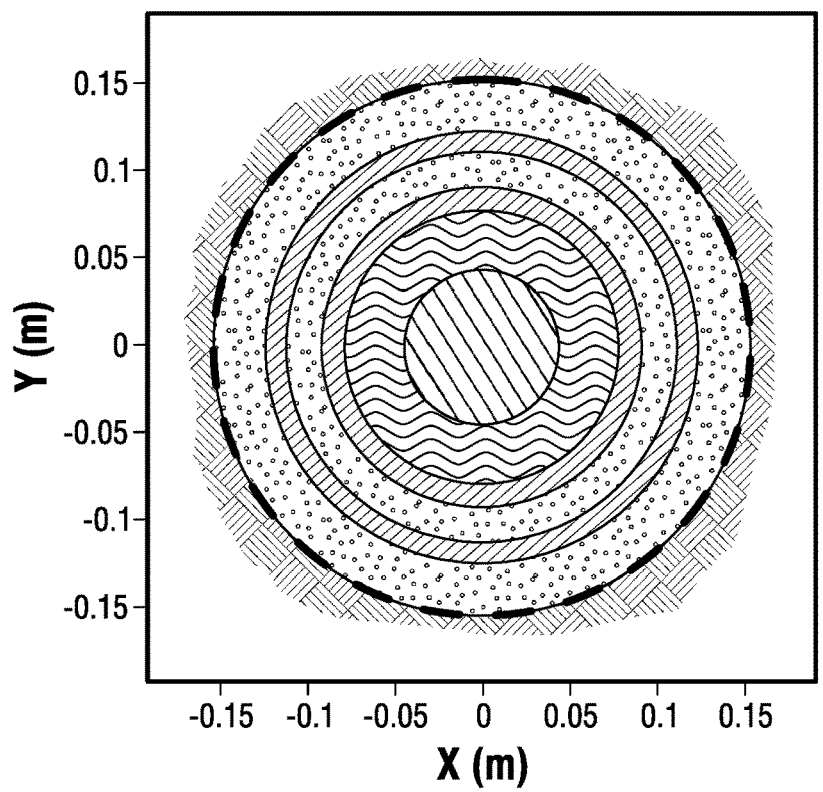
FIGS. 26a and 26b are respectively a cross-sectional diagram of a double-casing geometry with the first annulus filled with cement that is well bonded to the inner casing and with a second annulus filled with cement and well bonded to the outer casing but with a slip at the interface of the cement and the formation, and synthetic waveforms at an array of receivers generated by a concentrically placed dipole transmitter for that casing scenario.
Figure 26B:
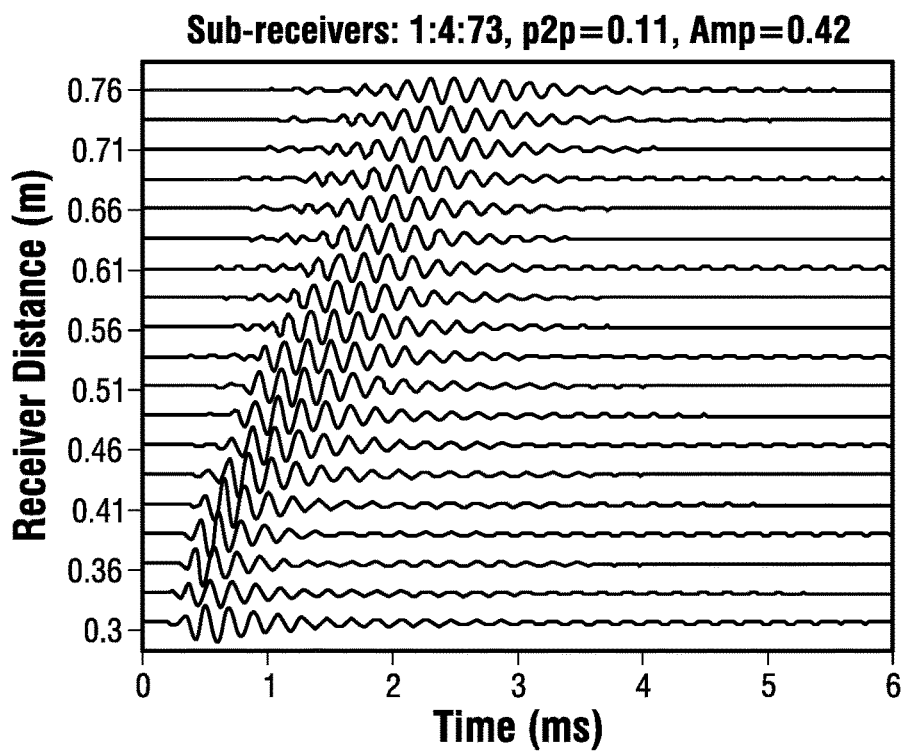
Figure 27A:
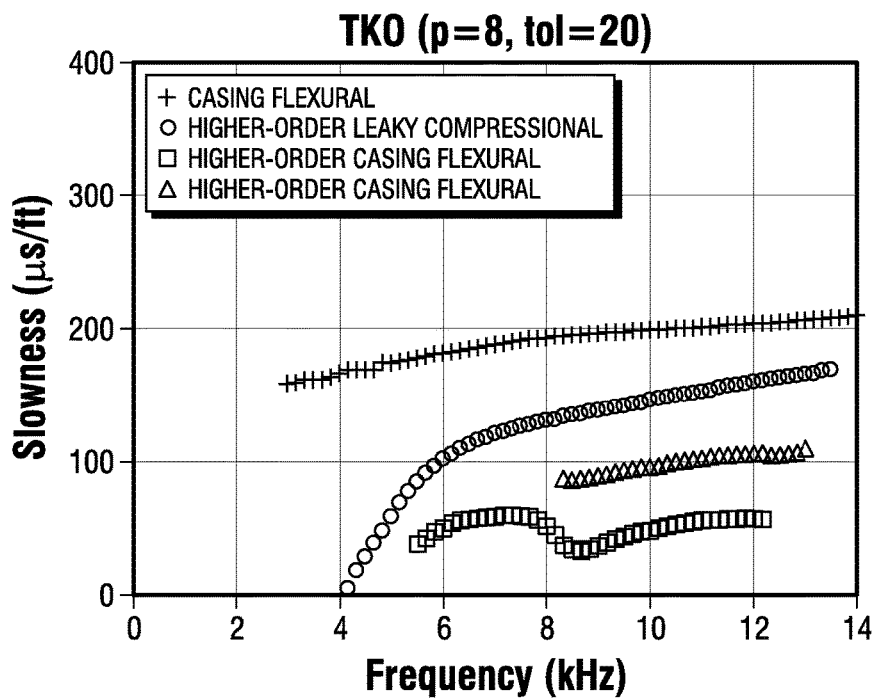
FIGS. 27a and 27b are respectively the slowness and attenuation dispersion plots obtained from the processing of the dipole waveforms of FIG. 26b.
Figure 27B:
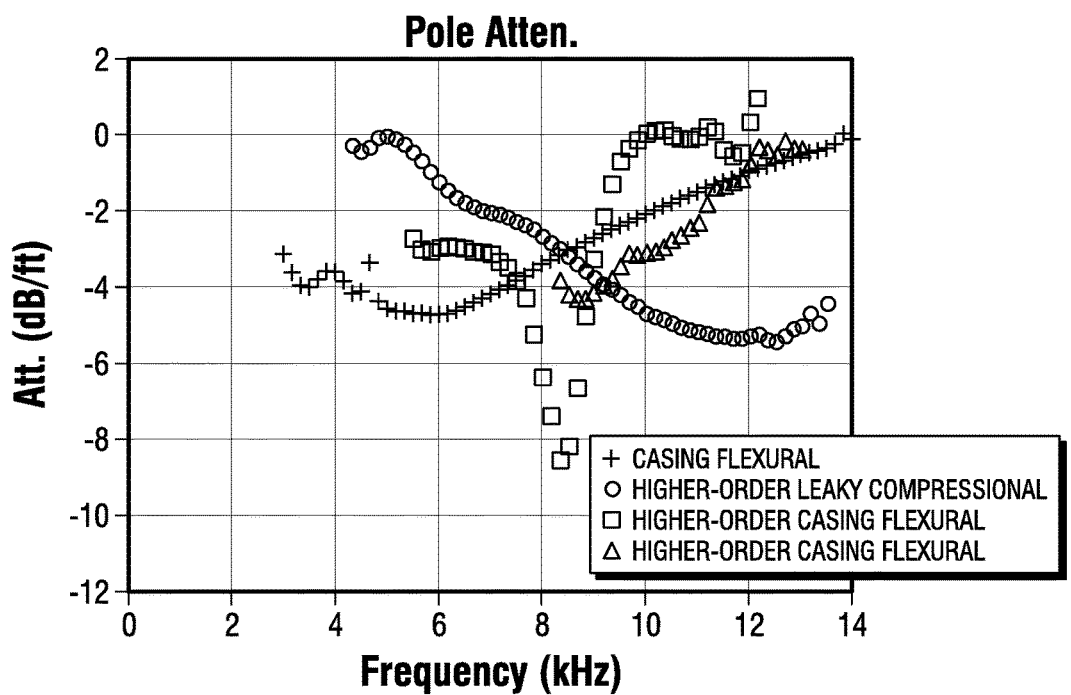

FIG. 26a shows a cross-sectional view of a double-casing surrounded by a slow formation with slip at the cement—formation interface. Synthetic recorded waveforms at an array of receivers generated by a dipole source are shown in FIG. 26b. Processing of these waveforms yields the slowness and attenuation dispersions shown in FIGS. 27a and 27b, respectively. Features associated with this geometry are similar to those obtained for the case of slip at the outer casing—outer cement annulus interface.

Figure 28A:
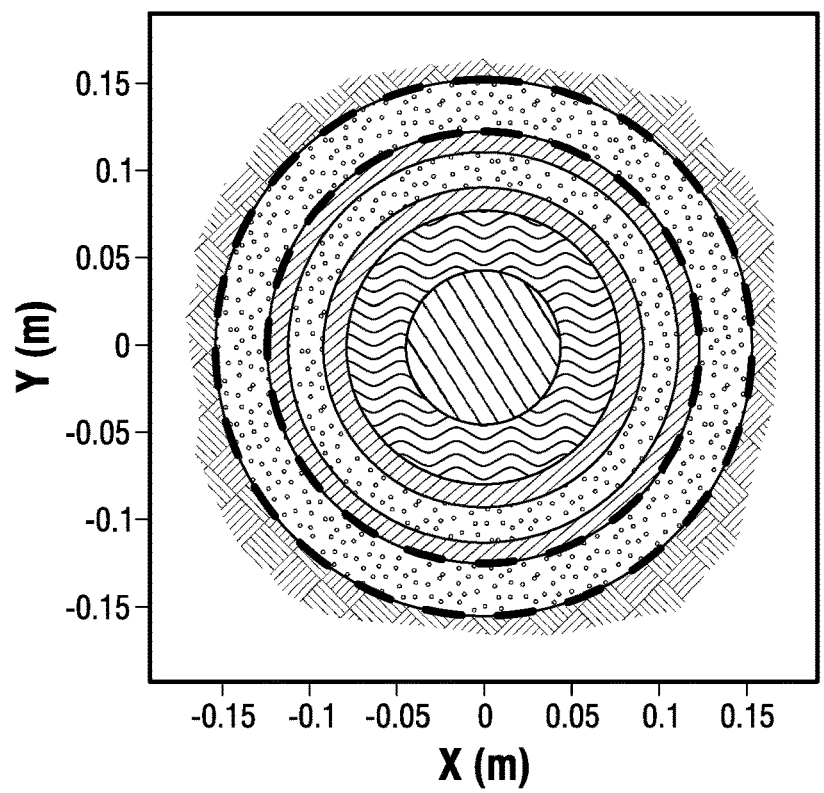
FIGS. 28a and 28b are respectively a cross-sectional diagram of a double-casing geometry with the first annulus filled with cement that is well bonded to the inner casing and with a second annulus filled with cement but with slips at the interface of the cement and the second casing and at the interface of the cement and the formation, and synthetic waveforms at an array of receivers generated by a concentrically placed dipole transmitter for that casing scenario.
Figure 28B:
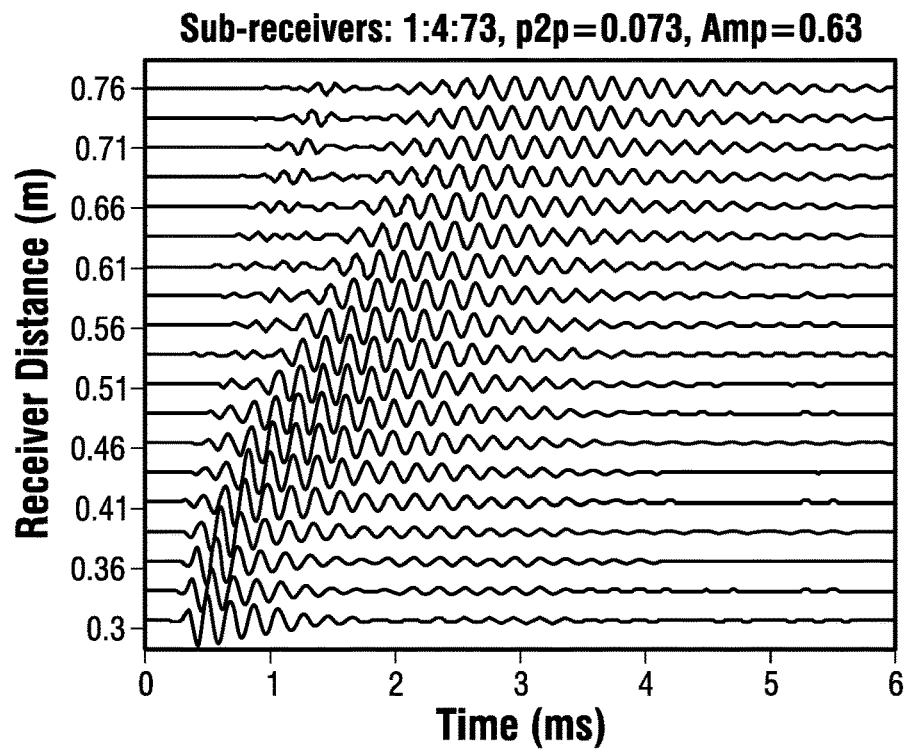
Figure 29A:
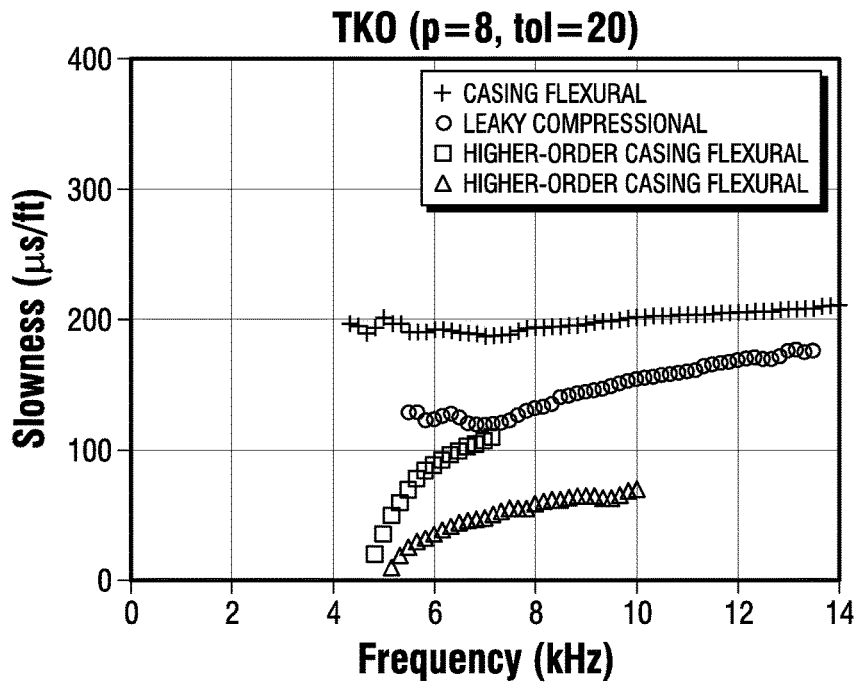
FIGS. 29a and 29b are respectively the slowness and attenuation dispersion plots obtained from the processing of the dipole waveforms of FIG. 28b.
Figure 29B:
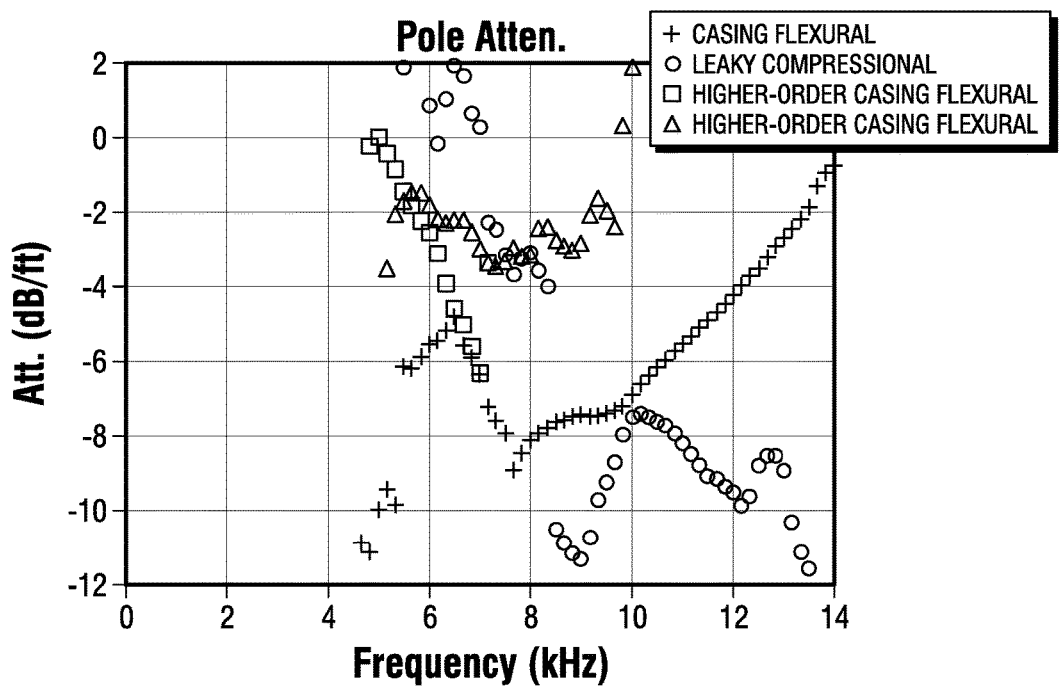

FIG. 28a displays a cross-sectional view of a double-casing surrounded by a slow formation with slip at both the $4^{th}$ and $5^{th}$ interfaces. FIG. 28b depicts synthetic waveforms at an array of receivers produced by a dipole source. FIGS. 29a and 29b, respectively, show the slowness and attenuation dispersions obtained from the processing of waveforms shown in FIG. 28b. Salient features associated with this geometry include the presence of a casing flexural, dipole leaky-compressional, and two higher-order casing flexural modes with cut-off frequencies around 4.5 and 5 kHz.

As seen from FIG. 3a-FIG. 29b, different types of imperfections in the cement annuli in a double-casing surrounded by a slow formation support a variety of propagating modes generated by a monopole and dipole sources. The associated modes exhibit different amount of dispersion over their excitation bandwidths.

According to one aspect, a "slowness dispersion magnitude" is defined as the difference (or spread) between the slownesses at low and high frequencies within the excitation bandwidth of a particular modal propagation. Likewise, an "attenuation dispersion magnitude" is defined as the difference (or spread) between attenuations at low and high frequencies within the excitation bandwidth of a particular modal propagation. A slowness dispersion magnitude of a particular mode may be determined by projecting the slowness dispersion (slowness-frequency plot) of that particular mode onto the slowness axis. Similarly, an attenuation dispersion magnitude of a particular mode may be determined by projecting the attenuation dispersion (attenuation-frequency plot) of that particular mode.

Figure 30B:
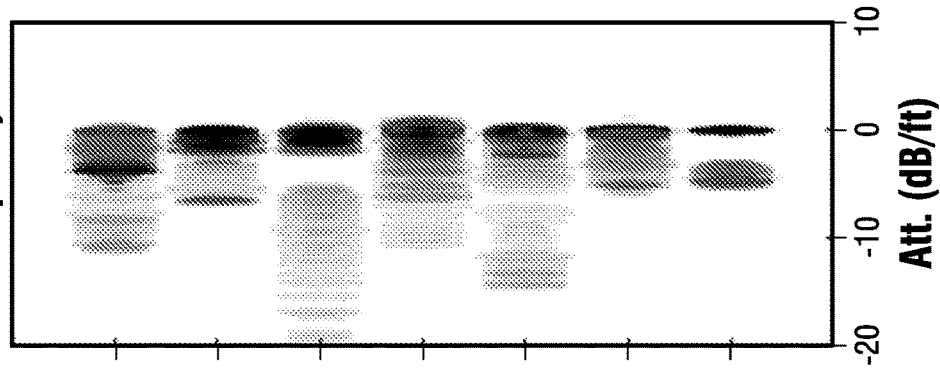
Figure 30A:
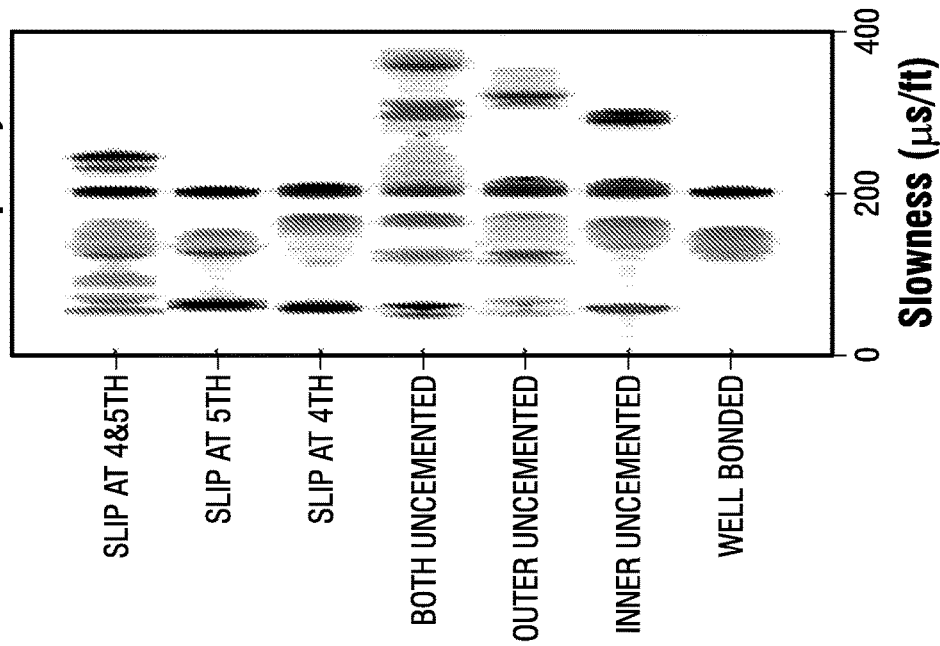

FIGS. 30a and 30b, respectively show slowness and attenuation dispersion data sets (in chart form) for the different cementation scenarios previously discussed with respect to FIGS. 2a, 4a, 6a, 8a, 10a, 12a and 14a. The slowness and attenuation dispersions are obtained at a given depth, and where the cementation scenario over a depth interval is expected to remain the same, the process may be repeated multiple times over that depth interval and accumulated. These data sets are obtained (i) by processing the waveforms generated by a monopole source in a double casing surrounded by a slow formation shown in FIGS. 2b, 4b, 6b, 8b, 10b, 12b and 14b to obtain the slowness dispersions of FIGS. 3a, 5a, 7a, 9a, 11a, 13a and 15a and the attenuation dispersions of FIGS. 3b, 5b, 7b, 9b, 11b, 13b and 15b and (ii) by projecting the slowness dispersions onto the slowness axis and the attenuation dispersions onto the attenuation axis. In FIG. 30a, seven slowness dispersion data sets are placed in a single chart, one above the other for comparison purposes and the slowness dispersion magnitudes of different modes are clearly seen, while in FIG. 30b, seven attenuation dispersion data sets are placed in a single chart, one above the other for comparison purposes. The attenuation dispersion magnitudes of different modes are clearly seen. If desired, each modal arrival may be provided with a different color for ease of visual comparison. Particularly with respect to the attenuation data values, where modes tend to overlap, the use of color can be particularly useful. For the data sets of FIGS. 30a and 30b, the horizontal spread along the slowness or attenuation axis represents the associated dispersion magnitude. The data set associated with each scenario can be said to be a "signature" which distinguishes one scenario from the others. As discussed in more detail hereinafter, the signatures may be distinguished by the number of modes represented, the location of the modes, and the dispersion magnitudes found. Also, the data set associated with each signaure can include numeric values for the number of modes represented for each signature, the location of the modes for each signature (e.g., along the slowness and attenuation axes), and the dispersion magnitudes for each signature.

As used herein, a "data set" can include one or more data sets or data subsets. For example, a "data set" can include data associated with one mode or signature or data associated with a plurality of modes or signatures.

It is clear from FIGS. 30a and 30b that the signature of a well bonded double casing is characterized by two arrivals denoted by the lighter and darker patches. The arrival associated with the darker patches (denoting the formation Stoneley in a cased wellbore) at slowness of approximately 200 microseconds/ft and at approximately 0 dB/ft is approximately non-dispersive, whereas the lighter patches associated with the monopole leaky compressional mode (at a slowness extending from about 120-160 microseconds/ft and an attenuation extending from about −3 dB to −5 dB) is far more dispersive than the Stoneley mode. All other signatures in FIGS. 30a and 30b which result from different type of imperfections in the cement in the casings exhibit the presence of additional casing modes with varying amounts of slowness and attenuation dispersions. Thus, for example, the slowness signature for the wellbore having mud in the inner annulus and cement in the outer annulus shows four well-defined modes, while the slowness signature for the wellbore having mud in the outer annulus and cement in the inner annulus shows five well-defined modes. The signature for the wellbore having mud in both the inner and outer annuli shows six well-defined modes. The signature for the wellbore having cement in both annuli but with a slip at the 4$^{th}$ interface and the signature for the wellbore having cement in both annuli but with a slip at the 5$^{th}$ interface both show three well-defined modes. The signatures may be distinguished by the location of the leaky compressional mode, with the former having a higher slowness value centered at about 165 microseconds/ft, and the latter having a lower slowness value centered at about 140 microseconds/ft. These wellbores are also easily distinguished by the attenuation signautres as seen in FIG. 30b with the leaky compressional mode of the wellbore having a slip at the 4$^{th}$ interface having a differently located and much larger attenuation dispersion magnitude (extending from about −5 dB to well beyond −15 dB) than the wellbore having the slip at the 5$^{th}$ interface whose attenuation dispersion magnitude extends only from about −3 dB to −6 dB.

In one aspect, it will be appreciated that each of the seven scenarios in the data sets (e.g., charts) of FIGS. 30a and 30b may be distinguished solely by their particular slowness signatures, or by their particular attenuation signatures, or by the use of both their slowness and attenuation signatures. It will also be appreciated, that data sets representing other scenarios may be represented on the charts of FIGS. 30a and 30b and may be likewise distinguished from the charted scenarios.

In one embodiment, a tool such as shown in FIG. 1 is run in a wellbore. At desired depths, the signals (from the monopole source) received at the receivers of the tool are processed, and a slowness signature and/or an attenuation signature is obtained at each depth of interest. The slowness signature and/or attenuation signature at any particular depth are then compared to the data sets (e.g., charts) of FIG. 30a and/or FIG. 30b in order to identify the cementation scenario of the wellbore at that depth. Where signals are processed for multiple depths in the wellbore, the results at each depth may be compared to the data sets or where the cementation is expected to be the same over an interval, the results may be overlaid on each other prior to comparison. In some situations, the cemenation scenario may change for different locations, and in those situations, the results are not overlaid on each other.

In some embodiments, the comparison may be quickly and easily accomplished visually by a human operator (e.g., using a chart). In one embodiment, the slowness chart of FIG. 30a and the attenuation chart of FIG. 30b are placed side by side and the slowness and attenuation results from processing signals at a particular location in the wellbore are placed side by side for comparison.

In some embodiments, the comparison is done by a processing system using a quantitative algorithm. In particular, the signatures for the monopole signals are stored as a data set. The data set includes a series of slowness dispersion magnitudes and/or slowness averages (e.g., the midpoint slowness value) for each mode, and/or a series of attenuation dispersion magnitudes and/or attenuation average (e.g., the midpoint attenuation value) for each mode. The slowness and/or attenuation of the processed monopole signals is similarly analyzed quantitatively to generate a series of slowness and/or attenuation dispersion magnitudes and/or averages which are then compared to the data set to find a best fit.

Figure 31B:
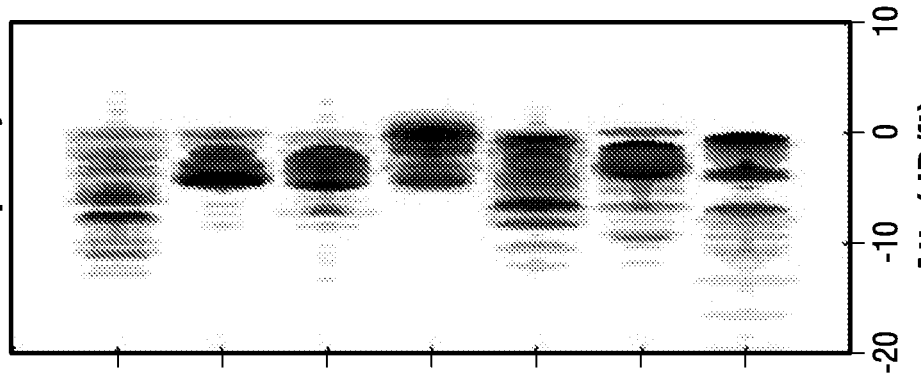
Figure 31A:
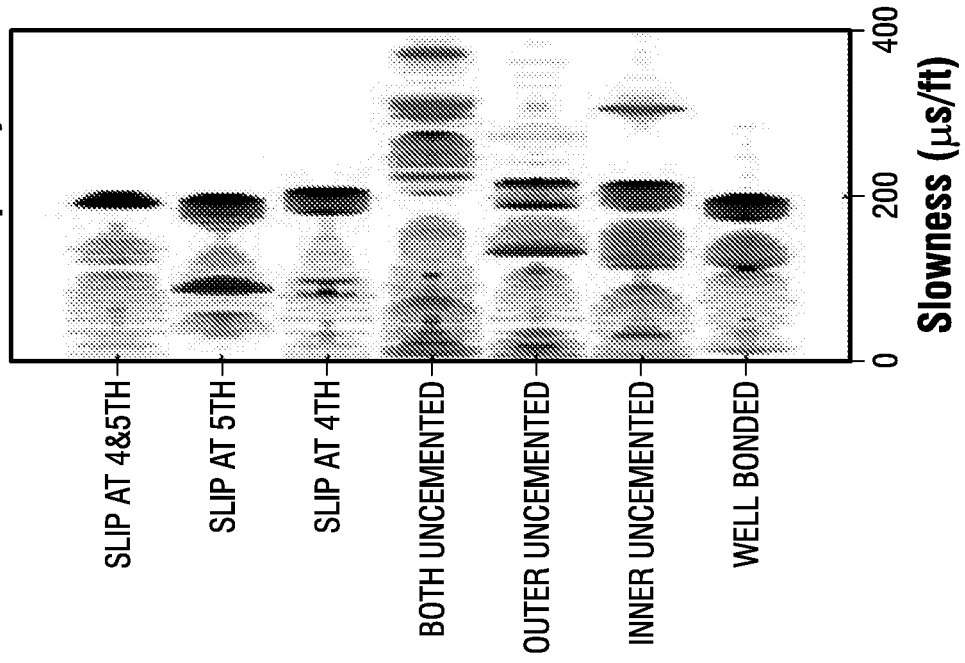

FIGS. 31a and 31b, respectively, display the slowness and attenuation dispersion data sets (in chart form) for the different cementation scenarios previously discussed with respect to FIGS. 16a, 18a, 20a, 22a, 24a, 26a and 28a. These data sets are obtained (i) by processing the waveforms generated by a dipole source in a double casing surrounded by a slow formation shown in FIGS. 16b, 18b, 20b, 22b, 24b, 26b and 28b to obtain the slowness dispersions of FIGS. 17a, 19a, 21a, 23a, 25a, 27a and 29a and the attenuation dispersions of FIGS. 17b, 19b, 21b, 23b, 25b, 27b and 29b and (ii) by projecting the slowness dispersions onto the slowness axis and the attenuation dispersions onto the attenuation axis. In FIG. 31a, seven slowness dispersions are placed in a single chart, one above the other for comparison purposes and the slowness dispersion magnitudes of different modes are clearly seen, while in FIG. 31b, seven attenuation dispersions are placed in a single chart, one above the other for comparison purposes. If desired, each modal arrival may be provided with a different color for ease of comparison. Particularly with respect to the attenuation signautures, where modes tend to overlap, the use of color can be particularly useful. In any event, the dipole slowness and attenuation data sets have different signatures associated with different types of imperfections in the cement annuli in a double casing surrounded by a slow formation.

In one embodiment, a tool such as shown in FIG. 1 is run in a wellbore. At desired depths, the signals (from the dipole source(s)) received at the receivers of the tool are processed, and a slowness signature and/or an attenuation signature is obtained at each depth of interest. The slowness signature and/or attenuation signature at any particular depth is then compared to the data sets of FIG. 31a and/or FIG. 31b in order to identify the cementation scenario of the wellbore at that depth. Where signals are processed for multiple depths in the wellbore, the results at each depth may be compared to the chart(s) or where the cementation is expected to be the same over an interval, the results may be overlaid on each other prior to comparison. In some situations, the cementation scenario may change for different locations, and in those situations, the results are not overlaid on each other.

In some embodiments, the comparison may be quickly and easily accomplished visually by a human operator. In one embodiment, the slowness data set (in chart form) of FIG. 31a and the attenuation data set (in chart form) of FIG. 31b are placed side by side and the slowness and attenuation results from processing signals at a particular location in the wellbore are placed side by side for comparison.

In some embodiments, the comparison is done by a processing system using a quantitative algorithm. In particular, the signatures for the dipole signals are stored as a data set. The data set includes a series of slowness dispersion magnitudes and/or slowness averages (e.g., the midpoint slowness value) for each mode, and/or a series of attenuation dispersion magnitudes and/or attenuation average (e.g., the midpoint attenuation value) for each mode. The slowness signature and/or attenuation signature of the processed dipole signals is similarly analyzed quantitatively to generate a series of slowness and/or attenuation dispersion magnitudes and/or averages which are then compared to the data set to find a best fit.

In one embodiment, by running a tool in a wellbore having both monopole and dipole sources, and by processing results from that tool, the slowness and/or attenuation signatures representing both the monopole and dipole signal processing may be compared to the slowness data sets of the charts of FIG. 30a and FIG. 31a and/or FIG. 30b and FIG. 31b in order to identify the cementation scenarios at particular depths in the wellbore.

Figure 32A:
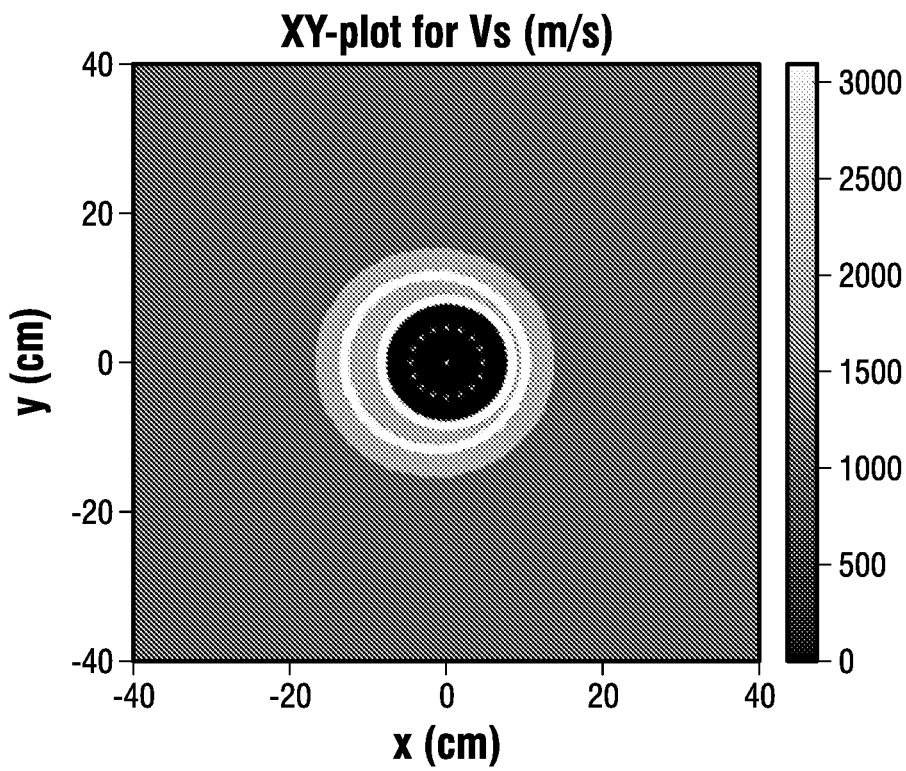
FIGS. 32a and 32b are respectively a cross-sectional diagram of an inner casing eccentered inside an outer casing concentrically placed in a wellbore surrounded by a slow formation where the annuli contain well-bonded cement, and a monopole slowness dispersion plot obtained for that casing scenario and the identical scenario except that the inner casing is centered.
Figure 32B:
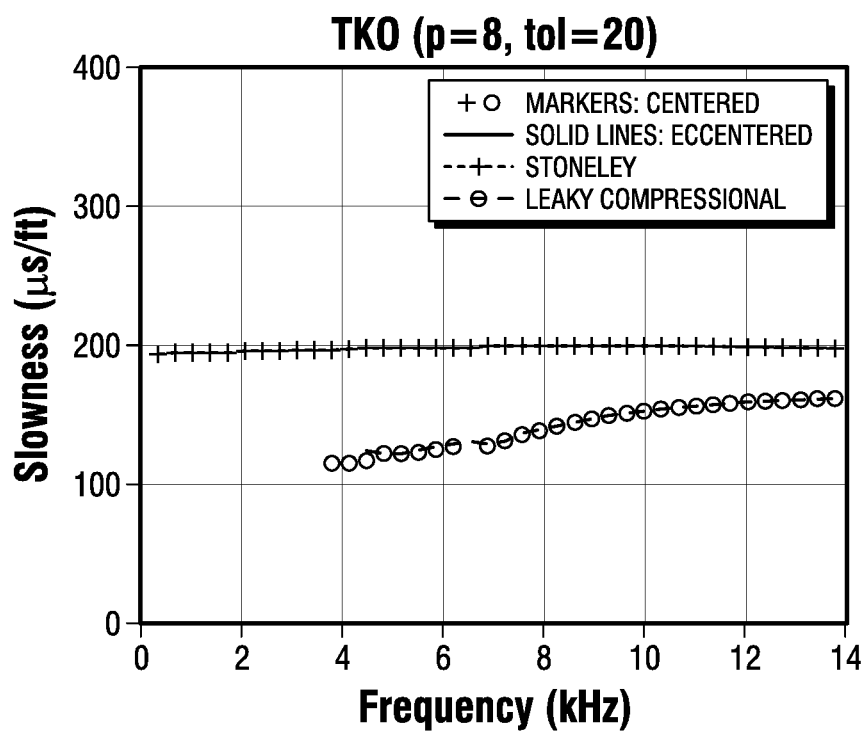

According to another embodiment, data sets of slowness and attenuation may be generated in order to identify eccentering of a casing in a wellbore. In particular, FIG. 32a is a cross-sectional diagram of an inner casing eccentered inside an outer casing concentrically placed in a wellbore surrounded by a slow formation where the annuli contain well-bonded cement. FIG. 32b provides a monopole slowness dispersion plot obtained for the casing scenario of FIG. 32a (shown in solid lines) and for the identical scenario except that the inner casing is centered (plotted with + signs). Both the Stoneley and leaky-compressional dispersions essentially coincide with each other over an operating bandwidth of about 1 to 14 kHz. This observation suggests that the modal propagation is largely controlled by the inner steel pipe dimensions and properties of the surrounding slow formation. Azimuthal heterogeneity caused by eccentered inner casing and solid cement annuli produce near-wellbore alterations that are detected by small perturbations of modal dispersions at high-frequencies.

Figure 33A:
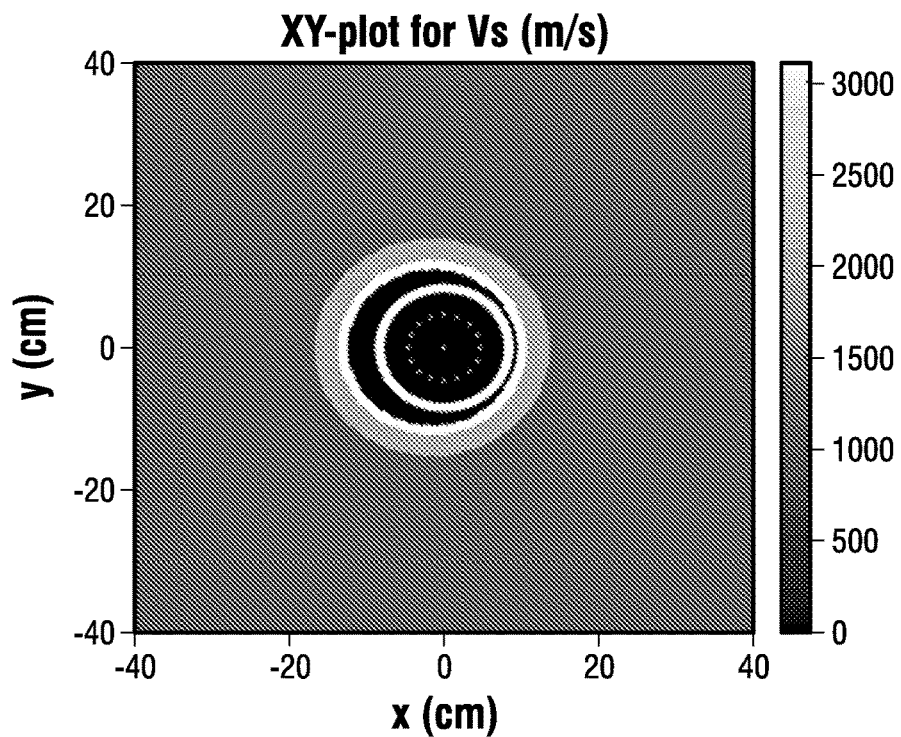
FIGS. 33a and 33b are respectively a cross-sectional diagram of an inner casing eccentered inside an outer casing concentrically placed in a wellbore surrounded by a slow formation where the inner annulus contains water and the outer annulus contains well-bonded cement, and a monopole slowness dispersion plot obtained for that casing scenario and for the identical scenario except that the inner casing is centered.
Figure 33B:
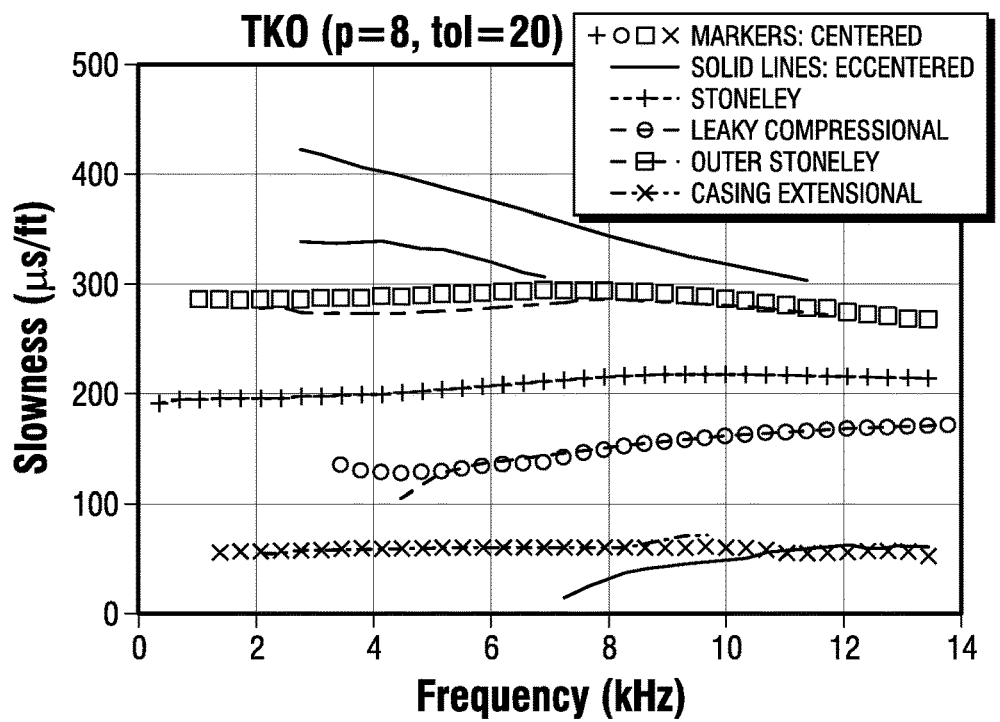

FIG. 33a is a cross-sectional diagram of an inner casing eccentered inside an outer casing concentrically placed in a wellbore surrounded by a slow formation where the inner annulus contains water and the outer annulus contains well-bonded cement. FIG. 33b provides a monopole slowness dispersion plot obtained for that casing scenario (shown in solid lines) and for the identical scenario except that the inner casing is centered (plotted with + signs). In FIG. 33b, monopole Stoneley, leaky compressional, outer Stoneley, and inner casing extensional dispersions are seen for both scenarios, but even though the formation Stoneley, leaky-compressional, and casing extensional dispersions show minimal differences, there are discernible differences in the outer Stoneley dispersion caused by irregular width of the water annulus. In addition, eccentering of the inner casing produces certain coherent monopole arrivals that are not observed in case of the centered casings. One such mode has a slowness of about 450 microseconds/ft at 3 kHz decreasing to about 300 microseconds/ft at 12 kHz, and another such mode has a slowness of about 350 microseconds/ft at about 3 kHz decreasing to about 300 microseconds/ft at 7 kHz.

Figure 34A:
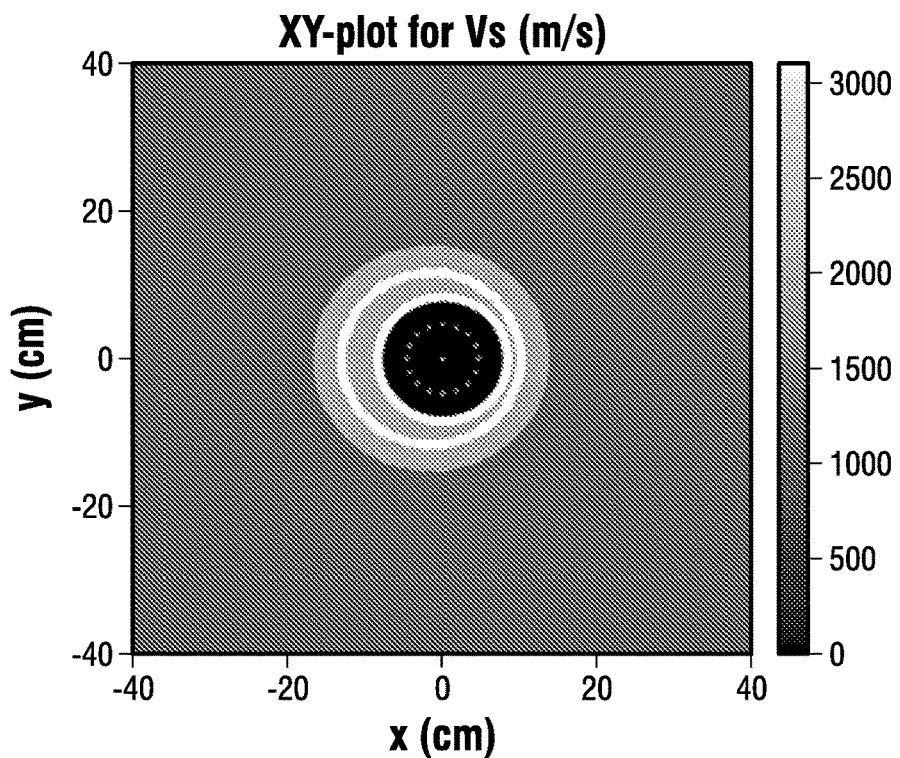
FIGS. 34a and 34b are respectively a cross-sectional diagram of an inner casing eccentered inside an outer casing concentrically placed in a wellbore surrounded by a slow formation where both the inner and outer annuli contain well-bonded cement, and a dipole slowness dispersion plot obtained for that casing scenario and for the identical scenario except that the inner casing is centered.
Figure 34B:
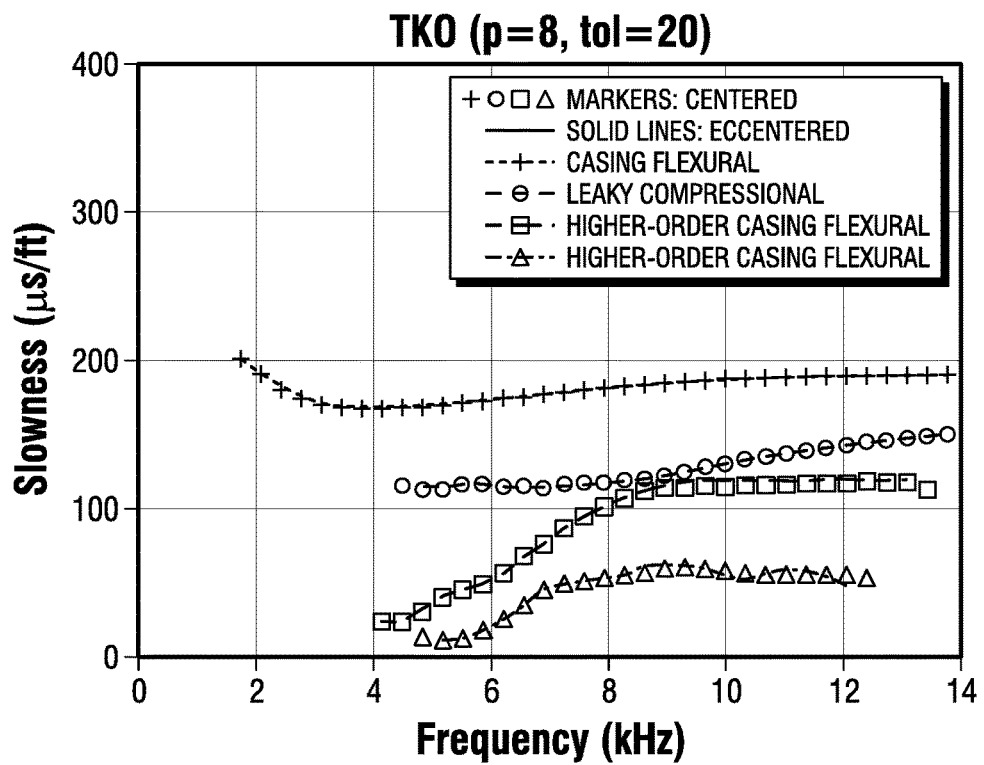

FIG. 34a is a cross-sectional diagram of an inner casing eccentered inside an outer casing concentrically placed in a wellbore surrounded by a slow formation where both the inner and outer annuli contain well-bonded cement. FIG. 34b provides a dipole slowness dispersion plot obtained for the casing scenario of FIG. 34a (shown in solid lines) and for the identical scenario except that the inner casing is centered (plotted with + signs). As seen in FIG. 34b, the dipole dispersions obtained in the case of centered and eccentered configurations overlay each other when both the annuli A and B are well-bonded with cement. Again, a good overlay of both the set of dipole dispersions (identified as the casing flexural, leaky-compressional, and two higher-order casing flexurals) indicates that near-wellbore alteration caused by azimuthal variation in the cement annuli produces minimal differences in the presence of well bonded solid cement.

Figure 35A:
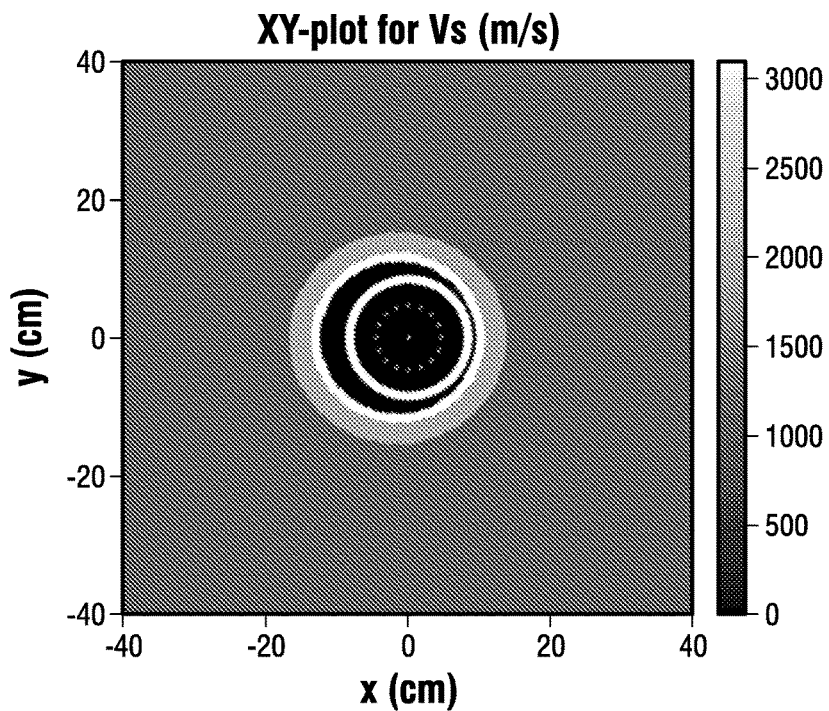
FIGS. 35a and 35b are respectively a cross-sectional diagram of an inner casing eccentered inside an outer casing concentrically placed in a wellbore surrounded by a slow formation where the inner annulus contains water and the outer annulus contains well-bonded cement, and a dipole slowness dispersion plot obtained for that casing scenario and for the identical scenario except that the inner casing is centered.
Figure 35B:
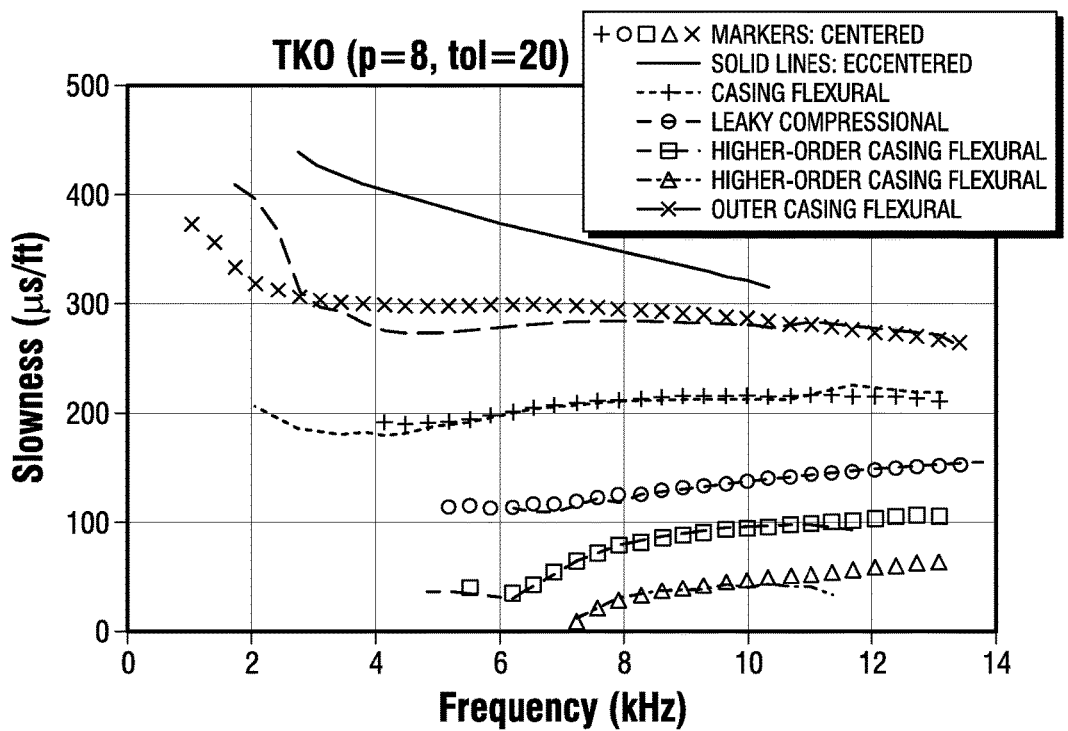

FIG. 35a is a cross-sectional diagram of an inner casing eccentered inside an outer casing concentrically placed in a wellbore surrounded by a slow formation where the inner annulus contains water and the outer annulus contains well-bonded cement. FIG. 35b provides a dipole slowness dispersion plot obtained for the casing scenario of FIG. 35a (shown in solid lines) and for the identical scenario except that the inner casing is centered (plotted with + signs). It will be appreciated that in FIG. 35b, the differences in the dipole slowness dispersion plots for the cases of the eccentered and the well-centered scanerios are minimal for the inner casing flexural, leaky compressional, and the higher-order casing flexural dispersions. However, the outer casing flexural dispersions are different for the centered and eccentered casings, and there is at least one additional coherent arrival for the eccentered case that are not observed in the centered case.

Figure 36A:
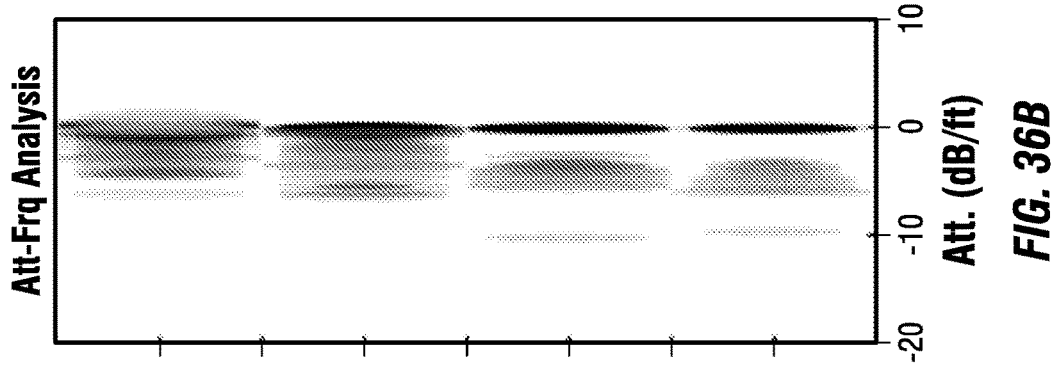
Figure 36B:
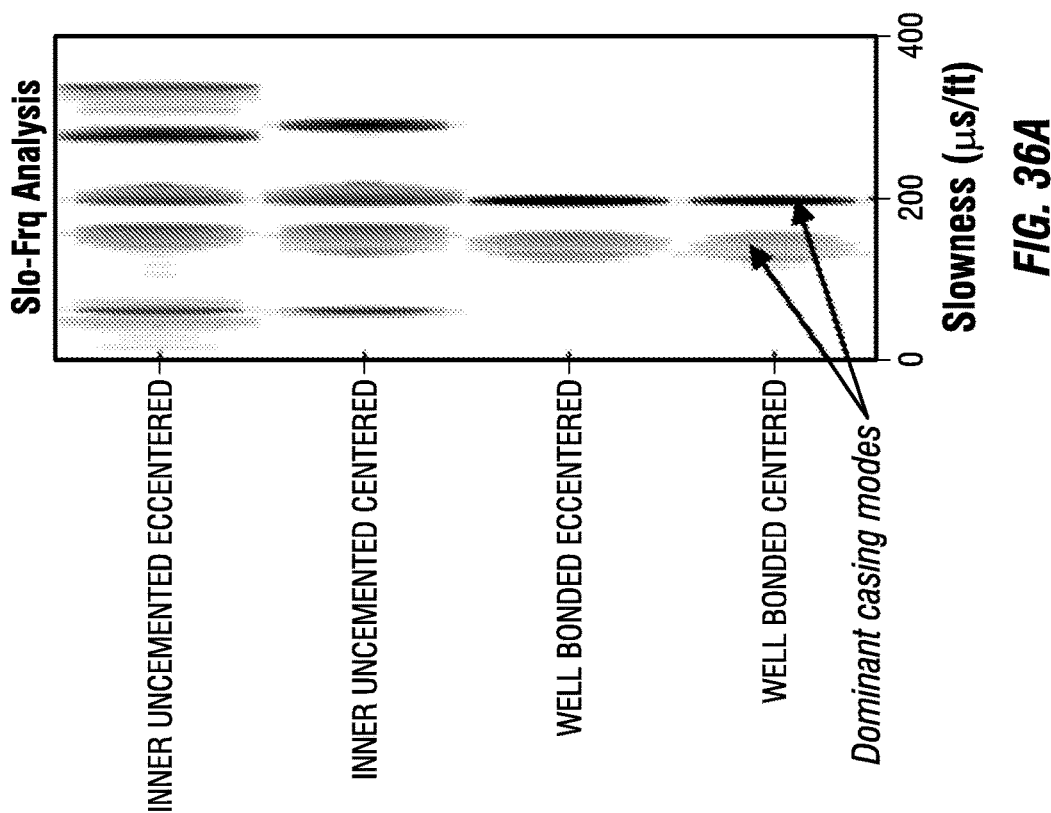

FIG. 36a is a data set (in chart form) generated by projecting the monopole slowness dispersions of FIGS. 32b and 33b onto the slowness axis. FIG. 36b is a data set (in chart form) generated by projecting the monopole attenuation dispersions for the scenerios of FIGS. 32*a* and 33*a* onto an attenuation axis. In FIG. 36*a*, four slowness dispersion signatures are placed in a single chart, one above the other for comparison purposes, while in FIG. 36*b*, four attenuation dispersion signatures are placed in a single chart, one above the other for comparison purposes. If desired, each modal arrival may be provided with a different color for ease of comparison. Particularly with respect to the attenuation signatures, where modes tend to overlap, the use of color can be particularly useful. In certain embodiments, additional slowness dispersion signatures representing other scenarios may be added to the chart of FIG. 36*a* and additional attenuation dispersion signatures representing other scenarios may be added to the chart of FIG. 36*b*.

From FIGS. 36*a* and 36*b*, it will be appreciated that the signature of the slowness where the inner casing is uncemented and eccentered is readily distinguished from the scenarios where the inner casing is uncemented and centered and where the inner casing is cemented and eccentered. On the other hand, FIGS. 36*a* and 36*b* do not reveal significantly different signatures for well bonded centered and well bonded eccentered inner casings.

Figures 37A, 37B:
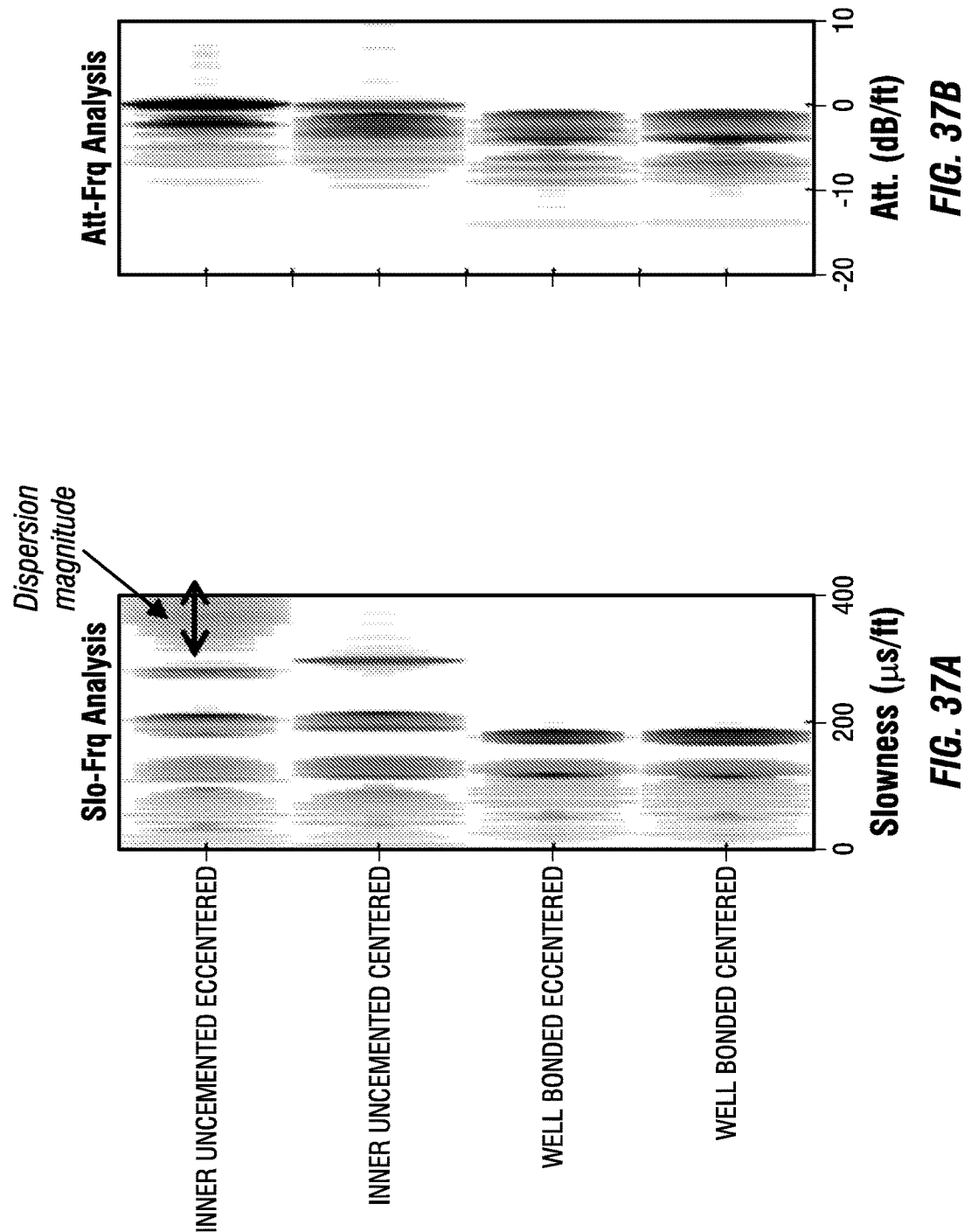

FIG. 37*a* is a data set (in chart form) generated by projecting the dipole slowness dispersions of FIGS. 34*b* and 35*b* obtained through processing of data relating to a dipole source onto the slowness axis. FIG. 37*b* is a data set (in chart form) generated by projecting the dipole attenuation dispersions for the scenerios of FIGS. 34*a* and 35*a* onto an attenuation axis. In FIG. 37*a* four slowness dispersion signatures are placed in a single chart, one above the other for comparison purposes, while in FIG. 37*b*, four attenuation dispersion signatures are placed in a single chart, one above the other for comparison purposes. If desired, each modal arrival may be provided with a different color for ease of comparison. Particularly with respect to the attenuation signatures, where modes tend to overlap, the use of color can be particularly useful.

From FIGS. 37*a* and 37*b*, it will be appreciated that the signature of the slowness where the inner casing is uncemented and eccentered is readily distinguished from the scenarios where the inner casing is uncemented and centered and where the inner casing is cemented and eccentered. FIG. 37*a* does not reveal significantly different signatures for well bonded centered and well bonded eccentered inner casings. On the other hand, FIG. 37*b* reveals small differences in the signatures for those two cases when the intensity of the signals at about −4.5 dB are compared.

In one embodiment, a tool such as shown in FIG. 1 is run in a wellbore. At desired depths, the signals (from the monopole and/or dipole source(s)) received at the receivers of the tool are processed, and one or more slowness signatures and/or attenuation signatures are obtained at each depth of interest. The slowness signatures and/or attenuation signatures at any particular depth are then compared to one or more of the data sets in FIGS. 36*a*, FIG. 36*b*, FIG. 37*a* and FIG. 37*b* in order to quickly and easily determine whether the inner casing is eccentered at that depth. Where signals are processed for multiple depths in the wellbore, the results at each depth may be compared to the chart(s). In one embodiment, the comparison may be quickly and easily accomplished by a human operator. In one embodiment, the slowness data set (in chart form) of FIG. 36*a* and the attenuation data set (in chart form) of FIG. 36*b* are placed side by side and the slowness and attenuation results from processing signals at a particular location in the wellbore are placed side by side for comparison. Similarly, the slowness data set (in chart form) of FIG. 37*a* and the attenuation data set (in chart form) of FIG. 37*b* may be placed side by side and the slowness and attenuation results from processing signals at a particular location in the wellbore are placed side by side for comparison.

In one embodiment, the tool of FIG. 1, or an additional tool, such as the ISOLATION SCANNER of Schlumberger Technology Corporation of Sugar Land, Tex., may be equipped with a high frequency ultrasound source, and the signals detected by receivers adapted to record high frequency ultrasound signals are processed in order to estimate eccentering of the inner casing according to Van Kuijk et al., "A Novel Ultrasonic Cased-Hole Imager for Enhanced Cement Evaluation," paper presented at the International Petroleum Technology Conference, Doha, Qatar, 21-23 Nov., 2005. The information from the high frequency ultrasound probing may be used in conjunction with the information obtained using the monopole and dipole data processing to determine whether or not an inner casing is eccentered.

Figure 38:
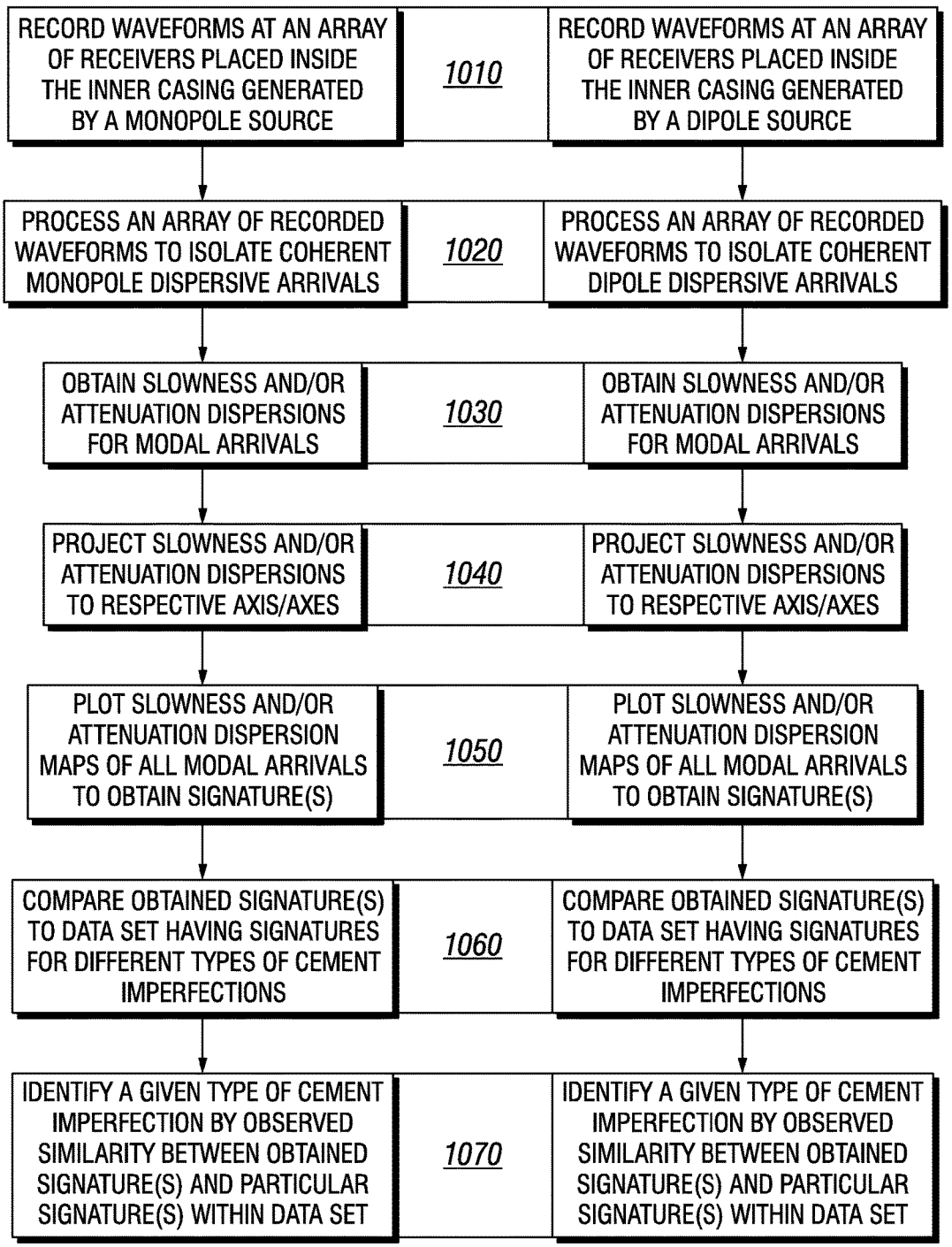
FIG. 38 is a flow chart of a method of identifying cement integrity in annuli surrounding casings of a double-cased wellbore.

Turning now to FIG. 38, a flow chart of a method of identifying cementation srtatus (e.g., integrity) in annuli surrounding casings of a mult-string case wellbore is seen. At 1010, a tool having monopole and/or dipole sources and an array of receivers is run in a wellbore having at least an inner and an outer casing, and waveforms generated by monopole and/or dipole sources are recorded at an array of receivers located inside the inner casing for one or more depths in the wellbore. For each depth, the waveforms (sonic data) are processed at 1020 to isolate coherent monopole and/or dipole dispersive arrivals, and are further processed at 1030 to obtain slowness and/or attenuation dispersions for the modal arrivals. At 1040, the slowness and/or attenuation dispersions for the monopole and/or dipole generated signals are projected onto the slowness and/or attenuation axes to obtain a slowness signature and/or an attenuation signature. In some embodiments, the signatures are plotted for visual comparison (1050). If desired, the plots may be done in color. At 1060, the slowness signature for that location in the wellbore is compared (visually or quantitatively) to a slowness signature data set and/or an attenuation signature data set. In some embodiments, the data sets are shown in chart form for visual comparison by a machine or a human. In other embodiments, the comparison is performed quantitatively using a processing system. At 1070, the cement scenario is identified by the similarity between the generated slowness and/or attenuation signature and the slowness signature data set and/or the attenuation signature data. It will be appreciated that the method may include repeating steps 1010-1070 for multiple locations in the wellbore.

Figure 39:
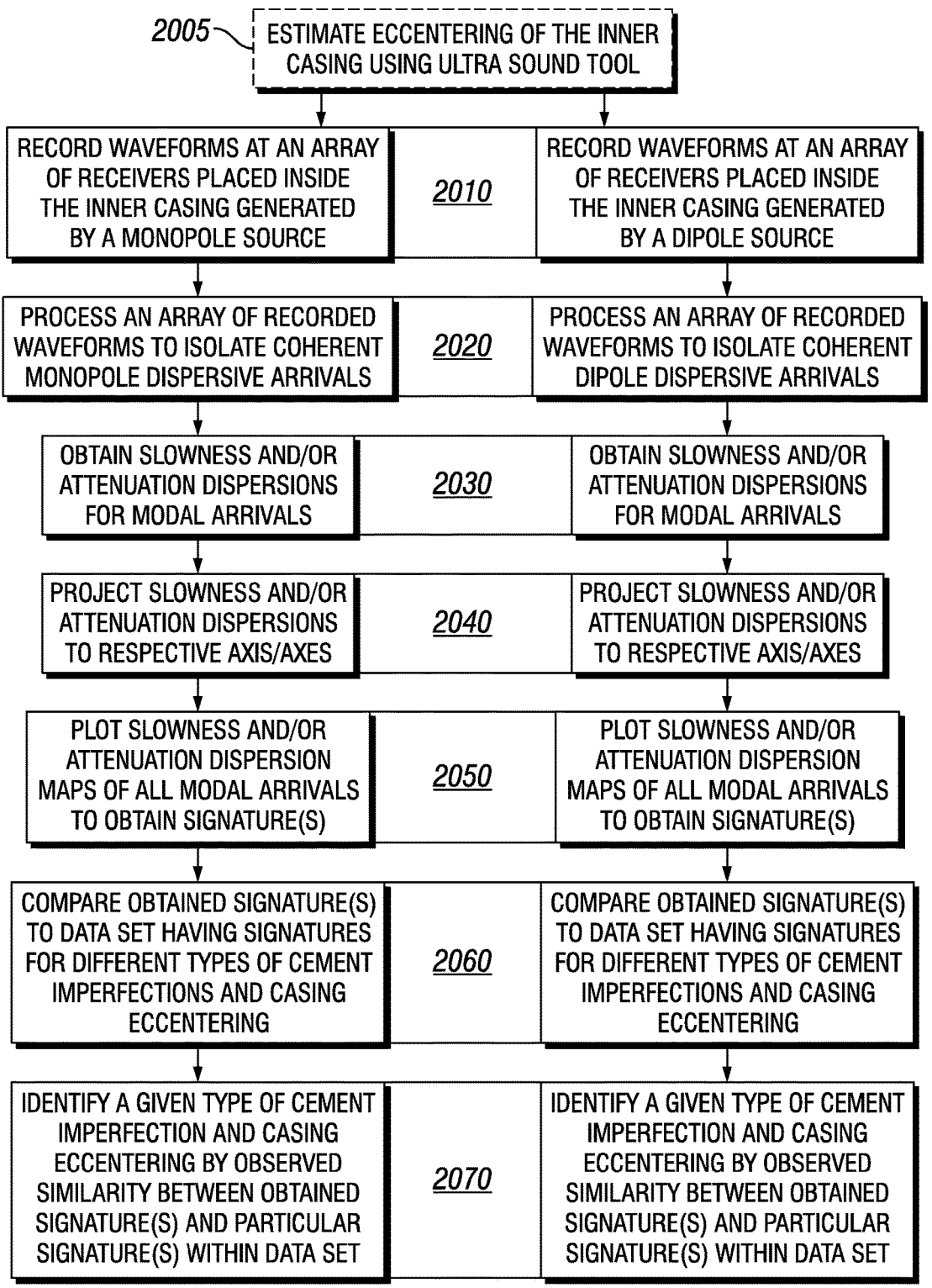
FIG. 39 is a flow chart of a method of identifying eccentering of an inner casing of a double-cased wellbore.

FIG. 39 is a flow chart of a method of identifying eccentering of an inner casing of a multi-string cased wellbore. At 2005, the eccentering of the inner casing is optionally estimated using a high frequency ultrasound tool. At 2010, a tool having monopole and/or dipole sources and an array of receivers is run in a wellbore having at least an inner and an outer casing, and waveforms generated by monopole and/or dipole sources are recorded at an array of receivers located inside the inner casing for one or more depths in the wellbore. For each depth, the waveforms are processed at 2020 to isolate coherent monopole and/or dipole dispersive arrivals, and are further processed at 2030 to obtain slowness and/or attenuation dispersions for the modal arrivals. At 2040, the slowness and/or attenuation dispersions for the monopole and/or dipole generated signals are projected onto the slowness and/or attenuation axes to obtain a slowness signature and/or an attenuation signature. In some embodiments, the signatures are plotted for visual comparison (2050). If desired, the plots may be done in color. At 2060, the slowness signature for that location in the wellbore is compared (visually or quantitatively) to a slowness signature data set for scenarios containing a slowness signature where at least one of the casings is eccentered and a slowness signature where the casings are centered, and/or the attenuation signature is compared (visually or quantitatively) to an attenuation signature data set containing an attenuation signature where at least one of the casings is eccentered and an attenuation signature where the casings are centered. In some embodiments, the data sets are shown in chart form for visual comparison by a machine or a human. In other embodiments, the comparison is performed quantitatively using a processing system. At 2070, the presence or lack of eccentering is identified by the similarity between the slowness and/or attenuation signature generated by processing the signals and the slowness signature data set and/or the attenuation signature data set. It will be appreciated that the method may include repeating steps 2010-2070 (and optionally step 2005) for multiple locations in the wellbore.

In one embodiment, the data sets of FIGS. 30 and 36 may be combined so that both the cementation status of the annuli and the presence or lack of eccentering of the casing may be determined by comparing the slowness and/or attenuation signatures obtained by processing signals resulting from the monopole source to a single data set. Similarly, in one embodiment, the charts of FIGS. 31 and 37 may be combined so that both the cementation status of the annuli and the presence or lack of eccentering of the casing may be determined by comparing the slowness and/or attenuation signatures obtained by processing signals resulting from the dipole source to a single data set.

It will be appreciated that the sonic data used in the methods described herein can be collected using a wellbore logging tool, such as a wireline sonic logging tool. Other wellbore tools and wellbore tool configurations can also be used to acquire the sonic data. For example, the wireline logging tool can be conveyed by other means, such as coiled tubing. Furthermore, the sonic data can be acquired using other wellbore logging tools, such as logging-while-drilling (LWD) tools.

The methods described herein for analyzing cement integrity and casing eccentering in a cased-well can be performed by a processing system. The processing system is not limited to any particular device type or system. The processing system may be a computer, such as a laptop computer, a desktop computer, or a mainframe computer. The processing system may include a graphical user interface (GUI) so that a user can interact with the processing system. The processing system may also include one or more processors (e.g., microprocessors, microcontrollers, digital signal processors, or general purpose computers) for executing any of the methods and processes described above.

The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Any of the methods and processes described above can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although several example embodiments have been described in detail above, those skilled in the art will readily appreciate that many modifications are possible in the example embodiments without materially departing from the scope of this disclosure. For example, rather than limiting charts to scenarios where the multistring cased wellbore has two casings, charts can be generated for scenarios where three (or more) casings may be present in order to analyze the cement quality in three annuli. In such situations, the slowness and attenuation dispersions may present more complex signatures, and as a result, a quantitative comparison might be particularly desirable. Accordingly, all such modifications are intended to be included within the scope of this disclosure.

What is claimed is:

1. A method for identifying a cementation status of a multi-string cased wellbore traversing a formation, wherein the multi-string cased wellbore comprises at least an inner casing and an outer casing, at least one first annulus between the inner casing and the outer casing, and a second annulus between the outer casing and the formation, the method comprising:

placing a sonic tool comprising at least one transmitter and a plurality of receivers within the cased wellbore;
generating waveforms that travel into at least the inner casing and the outer casing using the at least one transmitter;
recording the waveforms at the array of receivers to obtain sonic data;
processing the sonic data to generate at least one of a slowness dispersion and an attenuation dispersion;
projecting the at least one of the slowness dispersion and the attenuation dispersion onto a respective slowness axis and attenuation axis to obtain at least one of a slowness signature and an attenuation signature;
comparing the at least one of the slowness signature and the attenuation signature to at least one respective data set of projected slowness dispersions and data set of projected attenuation dispersions representing a plurality of different multi-string cased wellbore cementation status scenarios in order to select a scenario of the plurality of scenarios most closely associated with the signature; and
identifying the cementation status of the wellbore based on the comparing.

2. The method of claim 1,
wherein the at least one data set of projected slowness dispersions and projected attenuation dispersions representing a plurality of different multi-string cased wellbore cementation status scenarios also represents a plurality of scenarios relating to the presence or lack of eccentering of at least one of the casings, wherein the comparing further comprises selecting a scenario of the plurality of scenarios relating to the presence or lack of eccentering, and wherein the method of claim 1 further comprises determining whether at least one of the inner casing and outer casing is eccentered based on the comparing.

3. The method of claim 1, wherein the comparing comprises quantitatively comparing magnitudes of a plurality of modes of at least one of a slowness signature and an attenuation signature to respective magnitudes of the data set.

4. The method of claim 3, wherein the comparing further comprises quantitatively comparing averages of the plurality of modes of at least one of a slowness signature and an attenuation signature to respective averages of the data set.

5. The method of claim 1, wherein the data set of projected slowness dispersions representing the plurality of different multi-string cased wellbore cementation status scenarios includes:

a first scenario where both the first and second annuli contain cement well bonded to the inner and outer casings, a second scenario where the first annulus is uncemented and the second annulus contains cement, a third scenario where the second annulus is uncemented and the first annulus contains cement, and a fourth scenario where both the first second annuli are uncemented.

6. The method of claim 5, wherein the data set of projected slowness dispersions includes:

a fifth scenario where both the first and second annuli contain cement and a slip is present at an interface between the second casing and cement in the second annulus, a sixth scenario where both the first and second annuli contain cement and a slip is present at an interface between cement in the second annulus and the formation, and a seventh scenario where both the first and second annuli contain cement and slips are present at the interface between the second casing and cement in the second annulus and at the interface between cement in the second annulus and the formation.

7. The method of claim 1, wherein the data set of projected attenuation dispersions representing a plurality of different multi-string cased wellbore cementation status scenarios includes:

a first scenario where both the first and second annuli contain cement well bonded to the inner and outer casings, a second scenario where the first annulus is uncemented and the second annulus contains cement, a third scenario where the second annulus is uncemented and the first annulus contains cement, and a fourth scenario where both the first and second annuli are uncemented.

8. The method of claim 7, wherein the data set of projected attenuation dispersions includes:

a fifth scenario where both the first and second annuli contain cement and a slip is present at an interface between the second casing and cement in the second annulus, a sixth scenario where both the first and second annuli contain cement and a slip is present at an interface between cement in the second annulus and the formation, and a seventh scenario where both the first and second annuli contain cement and slips are present at the interface between the second casing and cement in the second annulus and at the interface between cement in the second annulus and the formation.

9. The method of claim 7, wherein the data set of projected attenuation dispersions are displayed in chart form using different colors for different modes.

10. The method of claim 1, wherein the processing comprises processing the waveforms to generate both slowness dispersions and attenuation dispersions, wherein the projecting comprises projecting both the slowness dispersions and attenuation dispersions to obtain both a slowness signature and an attenuation signature, and wherein the comparing comprises comparing the slowness signature to a data set of projected slowness dispersions and comparing the attenuation signature to a data set of projected attenuation dispersions.

11. The method of claim 10, wherein the at least one transmitter comprises a monopole transmitter, wherein the waveforms are generated by the monopole transmitter, and wherein the data set of projected slowness dispersions and the data set of projected attenuation dispersions includes a data set of projected slowness dispersions based on waveforms from a monopole transmitter and a data set of projected attenuation dispersions based on waveforms from a monopole transmitter.

12. The method of claim 10, wherein the at least one transmitter comprises a dipole transmitter, wherein the waveforms are generated by the dipole transmitter, and wherein the data set of projected slowness dispersions and the data set of projected attenuation dispersions includes a data set of projected slowness dispersions based on waveforms from a dipole transmitter and a data set of projected attenuation dispersions based on waveforms from a dipole transmitter.

13. The method of claim 10, wherein the at least one transmitter comprises a monopole transmitter and a dipole transmitter, wherein the waveforms are generated by the monopole transmitter and the dipole transmitter, and wherein the data set of projected slowness dispersions and the data set of projected attenuation dispersions includes a data set of projected slowness dispersions based on waveforms from a monopole transmitter, a data set of projected slowness dispersions based on waveforms from a dipole transmitter, a data set of projected attenuation dispersions based on waveforms from a monopole transmitter, and a data set of projected attenuation dispersions based on waveforms from a dipole transmitter.

14. A system for identifying a cementation status of a multi-string cased wellbore traversing a formation, the system comprising:

a sonic tool comprising (i) at least one transmitter configured to generate waveforms that travel into an inner casing and an outer casing of the multi-string cased wellbore and (ii) a plurality of receivers configured to record the waveforms to obtain sonic data;
a processing system configured to:
process the sonic data to generate at least one of a slowness dispersion and an attenuation dispersion;
project the at least one of the slowness dispersion and the attenuation dispersion onto a respective slowness axis and attenuation axis to obtain at least one of a slowness signature and an attenuation signature;
compare the at least one of the slowness signature and the attenuation signature to at least one respective data set of projected slowness dispersions and data set of projected attenuation dispersions representing a plurality of different multi-string cased wellbore cementation status scenarios in order to select a scenario of the plurality of scenarios most closely associated with the signature; and
identify the cementation status of the wellbore based on the comparison.

15. A method for identifying whether a casing of a multi-string cased wellbore is eccentered, wherein the multi-string cased wellbore comprises at least an inner casing and an outer casing, at least one first annulus between the inner casing and the outer casing, and a second annulus between the outer casing and the formation, the method comprising:
placing a sonic tool comprising at least one transmitter and an array of receivers within the cased wellbore;
generating waveforms that travel into at least the inner casing and the outer casing using the at least one transmitter;
recording the waveforms at the array of receivers to obtain sonic data;
processing the sonic data to generate at least one of a slowness dispersion and an attenuation dispersion;
projecting the at least one of the slowness dispersion and the attenuation dispersion onto a respective slowness axis and attenuation axis to obtain at least one of a slowness signature and an attenuation signature;
comparing the at least one of the slowness signature and the attenuation signature to at least one respective data set of projected slowness dispersions and projected attenuation dispersions representing a plurality of different multi-string cased wellbore eccentering scenarios in order to select a scenario of the plurality of scenarios most closely associated with the signature; and
determining whether at least one of the inner casing and outer casing is eccentered in the wellbore based on the comparing.

16. The method of claim 15, wherein the comparing comprises quantitatively comparing magnitudes of a plurality of modes of at least one of a slowness signature and attenuation signature to respective magnitudes of the data set.

17. The method of claim 16, wherein the comparing further comprises quantitatively comparing averages of the plurality of modes of at least one of a slowness signature and attenuation signature to respective averages of the data set.

18. A method of claim 15,
wherein the processing comprises processing the waveforms to generate both slowness dispersions and attenuation dispersions,
wherein the projecting comprises projecting both the slowness dispersions and attenuation dispersions to obtain both a slowness signature and an attenuation signature, and
wherein the comparing comprises comparing the slowness signature to the data set of projected slowness dispersions and comparing the attenuation signature to the data set of projected attenuation dispersions.

19. The method of claim 18, wherein the data set of projected slowness dispersions representing a plurality of different eccentering scenarios includes:
a first scenario where the first annulus is uncemented and the second annulus contains cement and the inner casing is centered, and
a second scenario where the first annulus is uncemented and the second annulus contains cement and the inner casing is eccentered.

20. The method of claim 18,
wherein the at least one transmitter comprises a monopole transmitter,
wherein the waveforms are generated by the monopole transmitter, and
wherein the data set of projected slowness dispersions and the data set of projected attenuation dispersions includes a data set of projected slowness dispersions based on waveforms from a monopole transmitter and a data set of projected attenuation dispersions based on waveforms from a monopole transmitter.

21. The method of claim 20,
wherein the at least one transmitter comprises a dipole transmitter,
wherein the waveforms are generated by the dipole transmitter, and
wherein the data set of projected slowness dispersions and the data set of projected attenuation dispersions includes a data set of projected slowness dispersions based on waveforms from a dipole transmitter and a data set of projected attenuation dispersions based on waveforms from a dipole transmitter.

22. The method of claim 20,
wherein the at least one transmitter comprises a monopole transmitter and a dipole transmitter,
wherein the waveforms are generated by the monopole transmitter and the dipole transmitter, and
wherein the data set of projected slowness dispersions and the data set of projected attenuation dispersions includes a data set of projected slowness dispersions based on waveforms from a monopole transmitter, a data set of projected slowness dispersions based on waveforms from a dipole transmitter, a data set of projected attenuation dispersions based on waveforms from a monopole transmitter, and a data set of projected attenuation dispersions based on waveforms from a dipole transmitter.

23. The method of claim 18, wherein the data set of projected attenuation dispersions representing a plurality of different eccentering scenarios includes:
a first scenario where the first annulus is uncemented and the second annulus contains cement and the inner casing is centered, and
a second scenario where the first annulus is uncemented and the second annulus contains cement and the inner casing is eccentered.

24. The method of claim 23, wherein the data set of projected slowness dispersions representing a plurality of different eccentering scenarios further includes:
a third scenario where both the first and second annuli contain cement and the inner casing is eccentered, and
a fourth scenario where both the first and second annuli contain cement and the inner casing is centered.

25. The method of claim 24, wherein the data set of projected attenuation dispersions are displayed in chart form using different colors for different modes.

\* \* \* \* \*